United States Patent
Laleg et al.

(10) Patent No.: US 11,364,468 B2
(45) Date of Patent: Jun. 21, 2022

(54) SOFT SENSING OF SYSTEM PARAMETERS IN MEMBRANE DISTILLATION

(71) Applicant: King Abdullah University of Science and Technology, Thuwal (SA)

(72) Inventors: Taous Meriem Laleg, Thuwal (SA); Fadi Eleiwi, Thuwal (SA); Ayman Mustafa Karam, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 66 days.

(21) Appl. No.: 15/760,032

(22) PCT Filed: Sep. 14, 2016

(86) PCT No.: PCT/IB2016/055467
§ 371 (c)(1),
(2) Date: Mar. 14, 2018

(87) PCT Pub. No.: WO2017/046712
PCT Pub. Date: Mar. 23, 2017

(65) Prior Publication Data
US 2019/0046926 A1    Feb. 14, 2019

Related U.S. Application Data

(60) Provisional application No. 62/218,765, filed on Sep. 15, 2015.

(51) Int. Cl.
*B01D 61/12* (2006.01)
*B01D 61/36* (2006.01)
(Continued)

(52) U.S. Cl.
CPC ........... *B01D 61/368* (2013.01); *B01D 61/12* (2013.01); *B01D 61/364* (2013.01); *C02F 1/008* (2013.01);
(Continued)

(58) Field of Classification Search
CPC ................ B01D 61/364; B01D 61/366; B01D 2311/10; B01D 2311/06; B01D 2311/04;
(Continued)

(56) References Cited

U.S. PATENT DOCUMENTS 3,302,701 A * 2/1967 Thomas .................. F28F 13/06
165/109.1
3,419,144 A * 12/1968 Huntington ............ B01D 63/16
210/637
(Continued)

FOREIGN PATENT DOCUMENTS

WO    2014/111889    7/2014

OTHER PUBLICATIONS

V.M. Castillo and Wm. G. Hoover, "Entropy production Lyapunov instability at the onset of turbulent convection", Dec. 1998, The American Physical Society, vol. 58, No. 6, pp. 7350-7354. (Year: 1998).*

(Continued)

*Primary Examiner* — Joseph W Drodge
(74) *Attorney, Agent, or Firm* — Patent Portfolio Builders PLLC

(57) ABSTRACT

Various examples of methods and systems are provided for soft sensing of system parameters in membrane distillation (MD). In one example, a system includes a MD module comprising a feed side and a permeate side separated by a membrane boundary layer; and processing circuitry configured to estimate feed solution temperatures and permeate solution temperatures of the MD module using monitored (Continued)

outlet temperatures of the feed side and the permeate side. In another example, a method includes monitoring outlet temperatures of a feed side and a permeate side of a MD module to determine a current feed outlet temperature and a current permeate outlet temperature; and determining a plurality of estimated temperature states of a membrane boundary layer separating the feed side and the permeate side of the MD module using the current feed outlet temperature and the current permeate outlet temperature.

16 Claims, 27 Drawing Sheets

(51) Int. Cl.
  *C02F 1/44*     (2006.01)
  *C02F 1/00*     (2006.01)
  *C02F 103/08*   (2006.01)

(52) U.S. Cl.
  CPC .......... *C02F 1/447* (2013.01); *B01D 2311/10* (2013.01); *C02F 2103/08* (2013.01); *C02F 2209/005* (2013.01); *C02F 2209/02* (2013.01); *Y02W 10/37* (2015.05)

(58) Field of Classification Search
  CPC .. B01D 2311/16; B01D 65/10; B01D 61/368; B01D 61/10; B01D 61/12; B01D 61/20; B01D 61/22; B01D 61/36; B01D 65/08; B01D 2313/65; B01D 61/32; B01D 2325/021; B01D 2313/345; G05B 17/02; G05B 13/045; G16C 99/00; G06F 17/13; G01N 17/008; Y02A 20/131; C02F 1/447; C02F 2103/08; C02F 2209/005; C02F 2209/02; C02F 2209/006; C02F 2209/03; C02F 2209/40; C02F 1/008; Y02W 10/37
  USPC ... 210/640, 649, 650, 739, 741, 742, 85, 87, 210/90, 96.2, 143, 149; 203/1, 2
  See application file for complete search history.

(56) References Cited

U.S. PATENT DOCUMENTS

| | | | | |
|---|---|---|---|---|
| 4,781,837 | A * | 11/1988 | Lefebvre | A23C 9/1427 210/640 |
| 5,217,581 | A * | 6/1993 | Ewing | B01D 1/0082 203/1 |
| 5,801,969 | A * | 9/1998 | Nagahama | G06F 17/13 703/9 |
| 6,365,051 | B1 * | 4/2002 | Bader | B01D 61/147 210/640 |
| 6,396,285 | B1 * | 5/2002 | Blackham | G01R 27/32 324/601 |
| 9,568,258 | B1 * | 2/2017 | Colas | F28F 13/00 |
| 2004/0104171 | A1 * | 6/2004 | Zeiher | B01D 61/12 210/652 |
| 2004/0144112 | A1 * | 7/2004 | He | G05B 11/42 62/225 |
| 2006/0076294 | A1 | 4/2006 | Kamalesh et al. | |
| 2006/0184254 | A1 * | 8/2006 | Carpency | F25J 3/0219 700/30 |
| 2009/0114594 | A1 * | 5/2009 | Sirkar | B01D 61/38 210/640 |
| 2009/0150088 | A1 * | 6/2009 | Seo | E02B 1/02 702/25 |
| 2009/0204234 | A1 * | 8/2009 | Sustaeta | G05B 13/024 700/29 |
| 2009/0294122 | A1 * | 12/2009 | Hansen | E21B 43/00 166/250.01 |
| 2010/0044310 | A1 * | 2/2010 | Wan | B01D 61/145 210/637 |
| 2010/0170776 | A1 * | 7/2010 | Ehrenberg | B01D 61/364 202/168 |
| 2011/0031100 | A1 * | 2/2011 | Qtaishat | B01D 61/364 202/205 |
| 2012/0059865 | A1 * | 3/2012 | Shao | G06F 30/23 708/270 |
| 2013/0213885 | A1 * | 8/2013 | Duan | B01D 61/002 210/636 |
| 2013/0240434 | A1 * | 9/2013 | Yaeger | B01D 63/10 210/321.77 |
| 2014/0076728 | A1 * | 3/2014 | Prakash | C02F 1/44 204/518 |
| 2014/0225002 | A1 * | 8/2014 | Blatchley, III | C02F 1/325 703/2 |
| 2014/0324380 | A1 * | 10/2014 | Otsuka | G01M 99/002 702/136 |
| 2015/0090647 | A1 * | 4/2015 | Duke | B01D 61/368 210/181 |
| 2015/0276209 | A1 * | 10/2015 | Barenbrugge | F22B 35/104 122/449 |
| 2016/0074812 | A1 * | 3/2016 | Lienhard | B01D 61/364 210/640 |
| 2016/0107121 | A1 * | 4/2016 | Lienhard | B01D 69/02 210/640 |
| 2018/0297867 | A1 * | 10/2018 | Fleckner | C02F 1/008 |

OTHER PUBLICATIONS

Abdelkader Mojtabi and Michel Deville, "One-dimensional linear advection-diffusion equation: Analytical and finite element solutions", Mar. 2015, Computers and Fluids, vol. 107, pp. 189-195. (Year: 2015).*
Search Report and Written Opinion for PCT/IB2016/055467 dated Nov. 23, 2016.
First Examination Report in corresponding/related GCC Application No. GC 2016-32035, dated Nov. 15, 2018 (Documents D1 and D2 were cited in the IDS dated Mar. 14, 2018).
Second Examination Report in corresponding/related GCC Application No. GC 2016-32035, dated Oct. 16, 2019 (Documents D1 and D2 were cited in the IDS dated Mar. 14, 2018).
Third Examination Report and Rejection Decision for corresponding/related GCC Application No. GC 2016-32035, dated Jun. 7, 2020. (Document D1 was cited in the IDS dated Mar. 14, 2018; Document D2 was in the Office Action dated Nov. 22, 2019; and Document D3 was in the Office Action dated Aug. 2, 2019.).

* cited by examiner

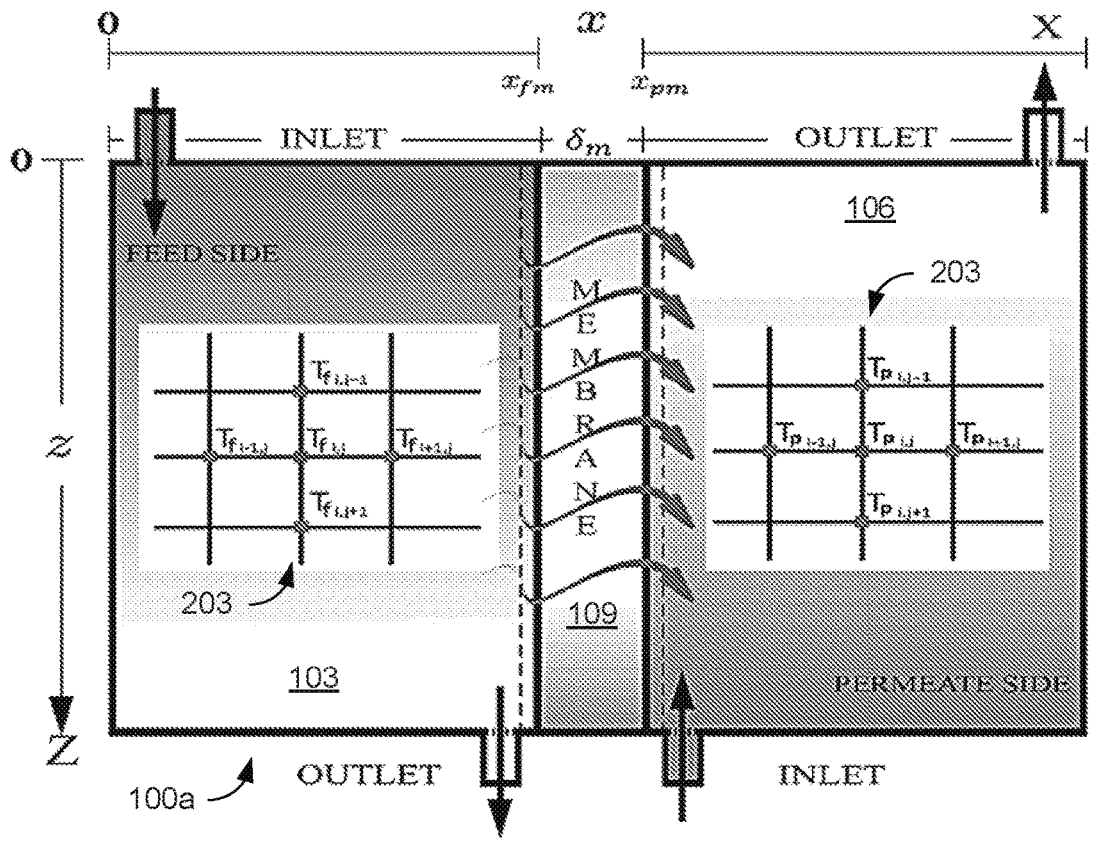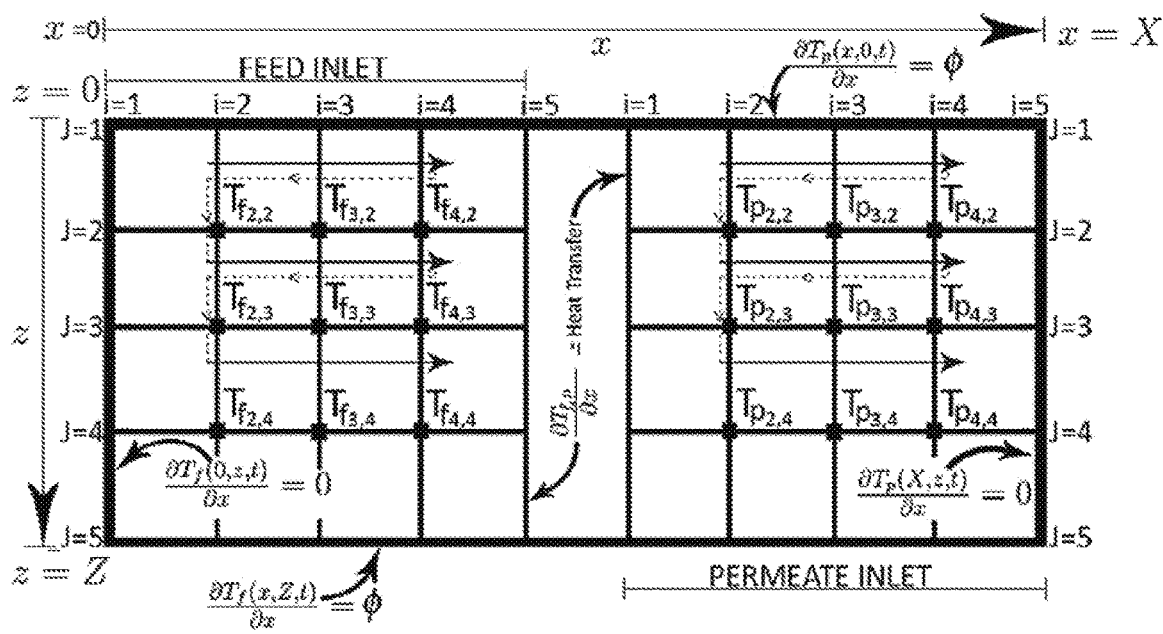
FIG. 2

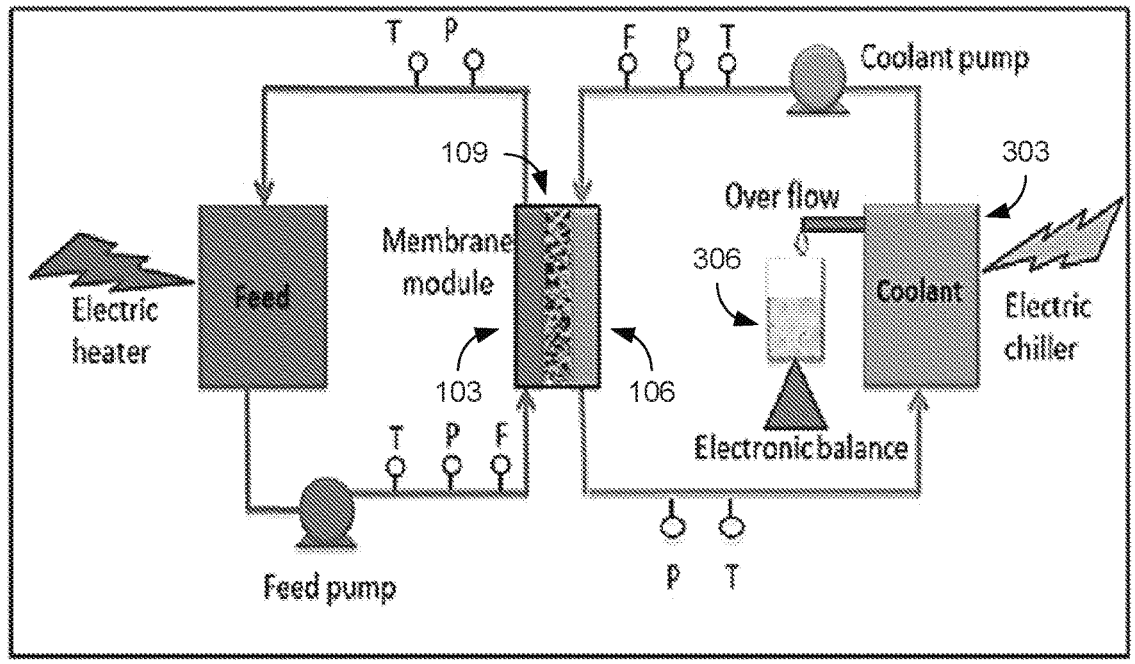

FIG. 3A

Table 1: Characteristics of the membrane.

| Parameter | Value |
|---|---|
| Membrane type | PTFE |
| Liquid Entry Pressure (PSI) | 15 |
| Thickness ($\mu m$) | 170 ±3 |
| Tortuosity | 1.35 |
| Mean flow pore size ($\mu m$) | 0.26 |
| First bubble point ($\mu m$) | 0.42 |
| Porosity (%) | 73 ±4 |
| Contact angle | 140° ± 3° |
| Mass Transfer Coefficient ($Kg/h.Pa.m^2$) | 0.001 |

FIG. 3B

Table 2: Characteristics of the feed water (Redseawater).

| Parameter | Feed water (Redseawater) |
|---|---|
| pH | 8.03 |
| Conductivity ($\mu S/cm$) | 61,400 |
| Turbidity ($NTU$) | 0.96 |
| TOC ($mg/L$) | 1.94 |
| Calcuim ($mg/L$) | 480.5 |
| Magnesium ($mg/L$) | 1530 |
| Sodium ($mg/L$) | 12,628 |
| Boron ($mg/L$) | 5.1 |
| Potassium ($mg/L$) | 425 |
| Chloride ($mg/L$) | 23,128 |
| Sulfate ($mg/L$) | 2650 |

FIG. 3C

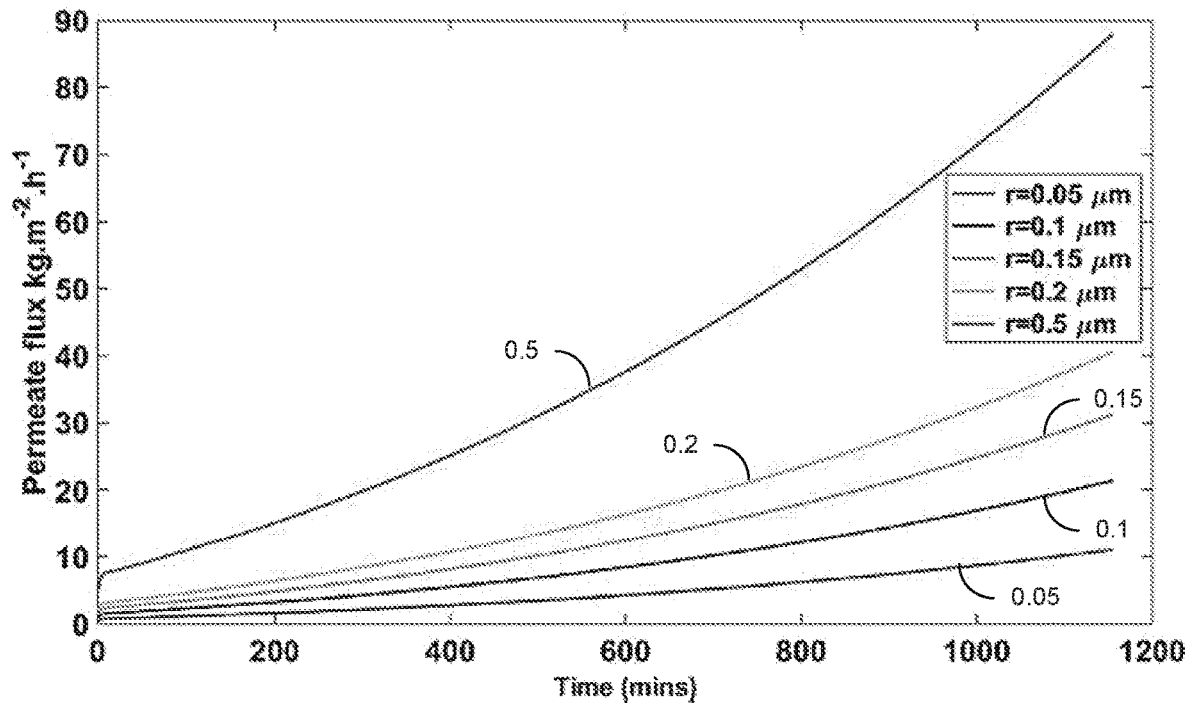

FIG. 6

Table 3: Membrane distillation parameters.

| Parameter | Value | Parameter | Value |
|---|---|---|---|
| Seawater thermal conductivity | 0.596 $W/m.K$ | Seawater density | 1035 $kg/m^3$ |
| Freshwater thermal conductivity | 0.607 $W/m.K$ | Freshwater density | 998.2 $kg/m^3$ |
| Flow rate of freshwater | 0.2 $m/s$ | Flow rate of seawater | 0.25 $m/s$ |
| Specific heat of freshwater | 3850 $J/kg.C$ | Molecular weight of water | 18.01489 $g/mol$ |
| Specific heat of seawater | 4180 $J/kg.C$ | Average thermal conductivity of membrane and vapor | 0.24 $W/mK$ |

FIG. 7

| Electrical | | | Thermal | | |
|---|---|---|---|---|---|
| Element | Expression | Unit | Element | Expression | Unit |
| Voltage | $V$ | V | Temperature | $T$ | °C or K |
| Current | $I$ | A | Heat transfer rate | $Q$ | Watt (W=J/s) |
| Resistor | $R_{elc}\delta x$ | Ω | Resistor | $\dfrac{\delta x}{kA_{cs}}$ | °C/W |
| Capacitor | $C_{elc}\delta x$ | F | Capacitor | $C = c_p m$ | J/°C |

| Element | Expression | Unit |
|---|---|---|
| $R_f$ | $\frac{1}{A_m h_f}$ | °C/W |
| $R_m$ | $\frac{1}{A_m h_m}$ | °C/W |
| $R_p$ | $\frac{1}{A_m h_p}$ | °C/W |
| $Q_{mf}^n$ | $A_m J_n c_p T_{bf_n}$ | W |
| $Q_{ml}^n$ | $A_m J_n H_v [T_{mf}]$ | W |
| $Q_{mp}^n$ | $A_m J_n c_p T_{mp_n}$ | W |
| $C_{bf}$ | $\rho_w c_p v_{bf}$ | J/°C |
| $C_{bp}$ | $\rho_w c_p v_{bp}$ | J/°C |

| Property | Value |
|---|---|
| Membrane material | PTFE |
| Active area | $0.06 m^2$ |
| Total thickness | 0.170 mm |
| Pore size | 0.27 $\mu$m |
| Porosity | 77% |
| Liquid Entry Pressure | 15 psi |
| First bubble point | 0.42 $\mu$m |
| Contact angle | 140 ±3° |

Table 1: Membrane characteristics

| Symbol | Parameter | Value |
|---|---|---|
| $v_z$ | Flow rate | 0.25 m/s |
| $C$ | Mass Transfer Coefficient | $0.0019\ Kg/h.Pa.m^2$ |
| $\delta_m$ | Thickness | $170 \pm 3\ \mu m$ |
| $r$ | Mean flow pore size | $0.26\ \mu m$ |
| $\epsilon$ | Porosity | $73 \pm 4$ |
| $LEP$ | Liquid Entry Pressure | 15 ($PSI$) |
| $k_f$ | Conductivity feed | $61,400\ (\mu s/cm)$ |
| $k_p$ | Conductivity permeate | $8.5\ (\mu s/cm)$ |

SOFT SENSING OF SYSTEM PARAMETERS IN MEMBRANE DISTILLATION

CROSS REFERENCE TO RELATED APPLICATIONS

This is a National Stage Application of PCT/IB2016/055467, filed on Sep. 14, 2016, which application claims priority to, and the benefit of, U.S. provisional application entitled "Soft Sensing of System Parameters in Membrane Distillation" having Ser. No. 62/218,765, filed Sep. 15, 2015, which is hereby incorporated by reference in its entirety.

BACKGROUND

The rapid growth of population around the world has increased the demand on freshwater and put the scarce natural freshwater resources under great pressure. Many water stressed countries rely on desalination plants to meet the ever increasing freshwater demand. The most common water desalination techniques are reverse osmosis (RO), multi-stage flash distillation (MSF), and multi-effect distillation (MED). However, most of these conventional desalination methods rely on fossil fuels to operate, which results in pollution of the environment by emissions and concentrated rejected brine. Membrane distillation (MD) offers a more sustainable and environment-friendly alternative. MD is a thermal separation process that utilizes a specific type of membranes for different applications, such as water desalination. Membranes are selected to be microporous, non-wetted, and highly hydrophobic. These properties allow the transfer of only water vapor or other volatile molecules through the membrane dry pores and so produce clean water. The separation is achieved under the validation of vapor-liquid equilibrium principle for molecules separation. MD is an attractive technology, with promising potentials to take the lead over the other existing water desalination methods. These potentials contribute toward promoting the MD process to be a cost-effective desalination process that is capable of being powered with renewable energy sources, such as geothermal, solar energy or low grade waste heat.

SUMMARY

Embodiments of the present disclosure are related to soft sensing of system parameters in membrane distillation (MD).

In one embodiment, among others, a system, comprises a MD module comprising a feed side and a permeate side separated by a membrane boundary layer; and processing circuitry configured to estimate feed solution temperatures and permeate solution temperatures of the MD module based at least in part upon monitored outlet temperatures of the feed side and the permeate side. In one or more aspects of these embodiments, the processing circuitry can be configured to estimate a membrane mass transfer coefficient of the MD module. The feed solution temperatures and permeate solution temperatures can include boundary temperatures along the membrane boundary layer.

In one or more aspects of these embodiments, the estimation of the feed solution temperatures and permeate solution temperatures can be based on an Advection-Diffusion Equation (ADE) model of feed and permeate solutions in the MD module. The ADE model can be a two-dimensional ADE model including dimensions of the membrane. The ADE model can comprise a plurality of grid points extending across the feed side and the permeate side of the MD module. The feed solution temperatures and permeate solution temperatures can include temperatures corresponding to at least a portion of the plurality of grid points.

In one or more aspects of these embodiments, the system can comprise temperature sensors configured to monitor the outlet temperatures of the feed side and the permeate side of the MD module. The MD module can be a counter current direct-contact MD module. The processing circuitry can be configured to control operation of the MD module based at least in part upon the feed solution temperatures and permeate solution temperatures.

In another embodiment, a method comprises monitoring outlet temperatures of a feed side and a permeate side of a MD module to determine a current feed outlet temperature and a current permeate outlet temperature; and determining a plurality of estimated temperature states of a membrane boundary layer separating the feed side and the permeate side of the MD module based at least in part upon the current feed outlet temperature and the current permeate outlet temperature. In one or more aspects of these embodiments, the method can comprise estimating a membrane mass transfer coefficient of the MD module.

In one or more aspects of these embodiments, the method can comprise adjusting characteristics of the feed solution or the permeate solution supplied to the MD module based at least in part upon the current feed outlet temperature and the current permeate outlet temperature. The estimated temperature states can be based on an Advection-Diffusion Equation (ADE) model of feed and permeate solutions in the MD module. The estimated temperature states can include temperatures corresponding to grid points extending across the feed side and the permeate side of the MD module.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 is a schematic diagram illustrating an example of a discretization grid for the feed and permeate sides of the DCMD module of FIG. 1 in accordance with various embodiments of the present disclosure.

FIG. 3A is a schematic diagram illustrating an example of DCMD experimental set up in accordance with various embodiments of the present disclosure.

FIGS. 3B and 3C include tables of membrane and feed water characteristics for the DCMD experimental set up of FIG. 3A in accordance with various embodiments of the present disclosure.

FIG. 6 illustrates the effect of membrane pore size variation on the membrane flux of the DCMD module of FIG. 1 in accordance with various embodiments of the present disclosure.

FIG. 7 includes a table of membrane distillation parameters used in the model analysis in accordance with various embodiments of the present disclosure.

DETAILED DESCRIPTION

Figure 1:
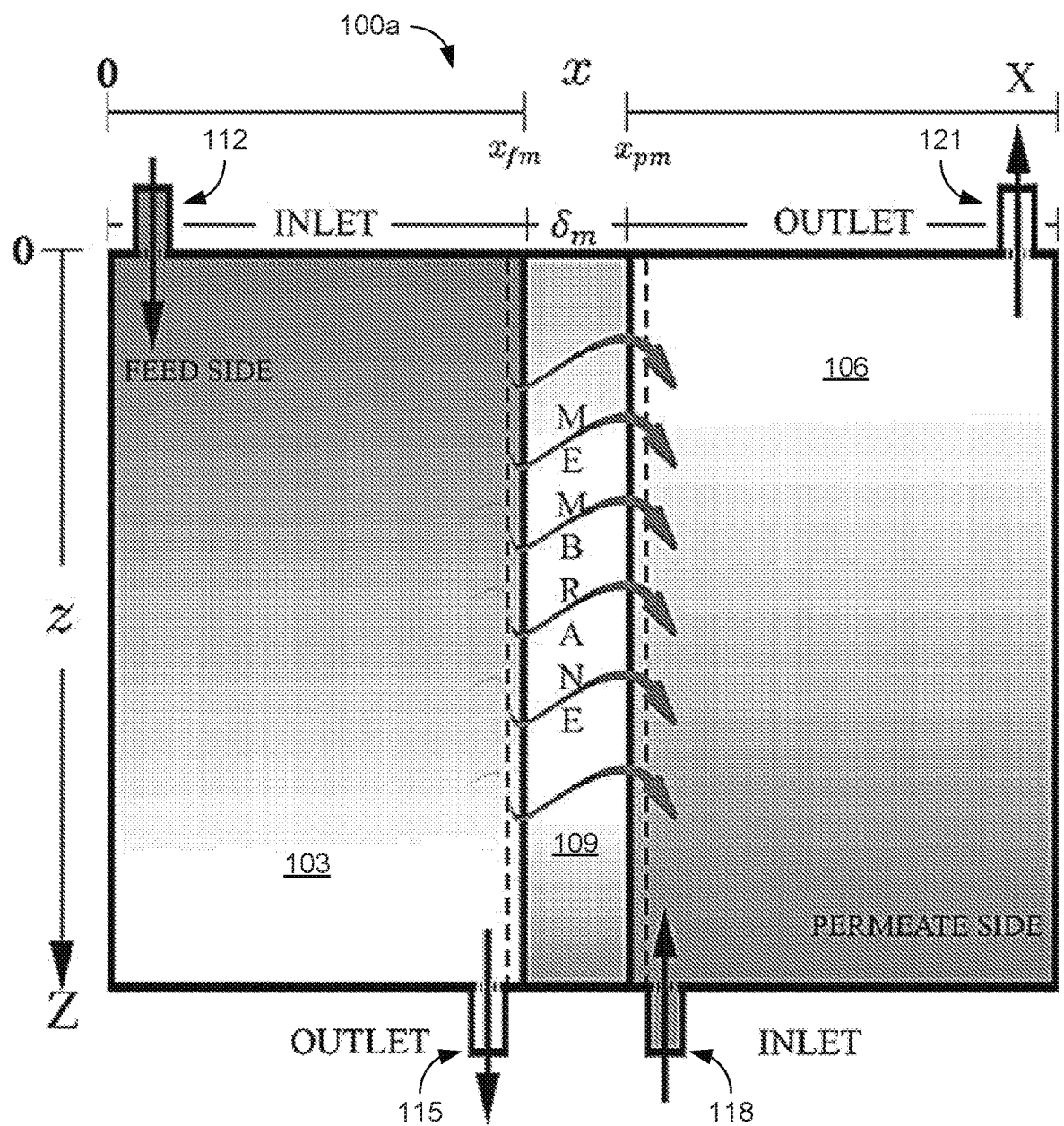
FIG. 1 is a schematic diagram of an example of a counter current direct-contact membrane distillation (DCMD) module in accordance with various embodiments of the present disclosure.

Disclosed herein are various embodiments of methods related to soft sensing of system parameters in membrane distillation (MD), which can include estimation of membrane characteristics such as temperature, mass coefficient transfer, etc. Reference will now be made in detail to the description of the embodiments as illustrated in the drawings, wherein like reference numbers indicate like parts throughout the several views.

Membrane distillation (MD) is a hybrid process in which both thermal and membrane separation techniques are combined. In this process, hot salty stream passes along one side (the feed side) of a microporous hydrophobic membrane, while the other side (the permeate side) of the membrane is kept at a lower temperature (coolant). Due to this temperature difference, water evaporates at the feed-membrane interface, and only water vapor passes through the dry pores of a hydrophobic membrane, driven by the differential saturation vapor pressure across the feed and the permeate sides of the membrane. Water vapor then condenses on the permeate-membrane interface. Since only water vapor is allowed through the hydrophobic membrane, MD has a 100% theoretical rejection rate of ions. Several configurations have been proposed for MD, each with its own pros and cons. One configuration is direct contact membrane distillation (DCMD), where both the hot feed and cold permeate streams are in direct contact with the membrane. Another configuration is the air gap membrane distillation (AGMD), in which the permeate stream is separated from the membrane by a stagnant air gap. A third setup is vacuum membrane distillation (VMD), where a vacuum is applied at the permeate side in order to enhance the flux transfer. Another configuration is material gap membrane distillation (MGMD), which combines DCMD and AGMD.

Unlike thermal-based conventional desalination methods, MD does not need intensive heat which means it can be integrated with solar thermal energy and waste heat sources. Since MD operates at a lower hydraulic pressure, it is less susceptible to scaling and fouling which is a general drawback of pressure-driven membrane based desalination techniques, like RO. Moreover, the general operational concept of MD has less demanding membrane characteristics and properties. All these features make MD ideal for sustainable water desalination in remote areas.

To capitalize on the MD advantages, the MD water desalination process has to be well understood, modeled and then optimized for maximum distilled water flux. The membrane distillation (MD) process starts when the solution in the feed side, after being heated to a desired temperature, evaporates along a membrane boundary layer. The vapor passes through the membrane dry pores, driven by the difference of pressure between the two sides of the membrane maintained by the difference of temperature, and gets condensed in the permeate side providing clean water. The flux of the MD process depends on the vapor gradient pressure between the two sides of the membrane, in addition to the characteristics of the module and the membrane.

The four common configurations include air-gap membrane distillation (AGMD), vacuum membrane distillation (VMD), sweeping-gas membrane distillation (SGMD), and direct-contact membrane distillation (DCMD), although other configurations have also been developed such as water gap MD. Condensation which occurs in the permeate side is the main difference among these configurations. Several applications have targeted the use of DCMD technology, where dewatering like desalination, waste water treatment and concentration of liquid solutions are among the top applications.

Many theoretical studies have been carried out to model and predict the performance of the MD process. Such models contribute to the deep understanding of the involved parameters and thus enhance the performance of the process. The models are mainly empirical and hold the advantages of relating the involved process parameters with each other to show the effect of the overall performance. The majority of the models consider the steady-state performance more important than the transient performance. The kinetic theory of gases through porous media was adopted in the models and the process performance depending on the selected MD configuration was studied. These models lacked the compatibility to be powered by intermittent energy supply, such as the use of solar energy source as they could not accommodate their unsteady nature. Notwithstanding, the use of heating storage tanks was proposed as a remedy to the intermittent unsteadiness effect. However, they introduced additional problems when they missed enough attention to some challenging drawbacks of the heating storage tanks, such as the incompatibility to the space requirement of some applications, and the extra expense for thermal insulation and maintenance, and the relatively low storage capacity they provide, to list a few.

In recent years there has been some effort to model the MD process and understand the effect of its operational parameters. The steady-state space-independent analysis has set the foundation of understanding the process. To capture the steady-state spatial effects on the process, several approaches have been proposed. Energy and mass conservation laws may be used to compare the energy efficiency of three MD configurations, namely DCMD, AGMD, and VMD. Simulations of the laminar steady-state Navier-Stokes equation have been compared to experimental measurements of DCMD. A more recent work, also based on energy and mass balances, was compared to experimental measurements of a DCMD experimental setup.

However, as solar radiation or heat sources vary with time, the inlet temperatures of the MD process can be unsteady throughout the operation. Therefore, due to the spatial and temporal variations of the temperatures distribution inside the MD module and other effects, it is important to learn more about the dynamic response of the process. In addition, when coupling the MD process with renewable energy, the additional challenge of the unsteady nature of the solar energy has to be considered as it evolves in time. All of these reasons have motivated the dynamical modeling of the MD process. Dynamic partial-differential equations (PDEs) have been considered to model AGMD and DCMD, while a black-box model based on neural-networks and a dynamical model for DCMD based on a lumped-parameter method have also been proposed.

There are two main limitations for most of the reported models. They are either only applicable for steady-state dimensionless analysis or computationally costly, specifically for large module sizes where model reduction approaches may be needed. Unlike black-box models, physical models offer more insight into the process and its operational parameters (i.e., the feed and permeate inlet temperatures and flow rates as well as the geometry of the module and the membrane properties). Alternative approaches are based on lumped-parameter models that offer the benefits of physical models, while maintaining a reasonable computational cost. These models are therefore suitable for real-time control and optimization applications.

This disclosure is directed to enhancing the productivity of the MD process accompanied with deep understanding of its behavior, and a dynamic model for the DCMD process is presented with experimental validation in both transient and steady state phases. The model is based on the two-dimensional (2D) Advection-Diffusion Equation (ADE), and it is considered to be in two dimensions including the dimensions of the membrane as well as the feed and permeate solutions. The model appears can contribute toward improving the performance of the process and reducing energy consumption. The model predicts the process to be powered with intermittent energy supply considering its unsteady nature, e.g., renewable energy sources or feeding the module with variable water temperatures. Moreover, an accurate description of the time evolution of the different heat transfer mechanisms inside the MD module is provided, which can account for sudden changes that might happen to the process, besides the steady state phase. This leads eventually to making the process more suitable for automation and control systems, and therefore, resulting in better performance and efficiency. A model is described for the DCMD configuration due to its convenience for laboratory tests and simplicity, but the model can be extended to include other MD configurations. The different heat and mass transfer mechanisms which drive the MD process for improving the performance will now be examined.

Mass Transfer Mechanism in MD Process.

Maintaining the permeate solution to be cooler than the feed solution forces vapor molecules to transfer through the membrane dry pores, from feed side to permeate side where it condenses. Mass transfer starts when the feed solution reaches the evaporation limit, which lets the vapor form in a small region of the membrane boundary layer. The vapor then will be ready to pass through the dry pores of the membrane toward the permeate side. The transfer is driven by the vapor pressure gradient between the feed solution and the permeate solution. Mass transfer is directly proportional to the permeability of the membrane as well as the vapor pressure gradient through:

$$J(T)=C(T)(P_1(T)-P_0(T)), \quad (1)$$

where $J(T)$ is the trans-membrane heat flux, $P(T)$ is the pressure along the membrane boundary layers and $C(T)$ is the membrane mass transfer coefficient of the system, and which are functions of the induced temperature T. The mass transfer coefficient can be modeled with a Knudsen model, a Poiseuille model or a combination of both in a molecular model.

The Knudsen model is the most suitable to describe the mass transfer in the DCMD process, since its criteria of having a mean free path of the transferred molecules to be larger than the membrane pore size is achieved, and the effect of the molecular diffusion for the air trapped within each membrane pores is extremely small relative to the water flux, and therefore it can be neglected. It can be expressed as:

$$J(T) = 1.064 \frac{r\epsilon}{\chi\delta_m}\left(\frac{M}{RT_{mean}}\right)^{0.5}(P_1(T)-P_0(T)), \quad (2)$$

where r is the pore size, $\epsilon$ is the porosity, $\chi$ is the tortuosity, $\delta_m$ is the membrane thickness, R is the gas universal constant, M is the water molecule weight, $T_{mean}$ is the mean temperature along the membrane interfaces, and P is the pressure. It is worth mentioning that Knudsen model utilizes knowledge of some membrane parameters, such as pore size, porosity and thickness. These parameters can be estimated by applying the models to experimental gas fluxes through a given membrane.

Heat Transfer Mechanism in MD Process.

Heat transfers with the vapor and volatile molecules from the feed solution to the permeate solution. This transfer follows the second law of thermodynamics. The transferred heat takes a form of sensible and latent heat inside the membrane, and conduction and convection heat throughout the bulk flow in the feed and the permeate sides.

The majority of the heat transfer models are set according to factors, such as heat balance equations, and conservation of energy and mass laws in thermodynamics. As a result, the involved amount of transferred heat should be equal in both process sides as well as through the membrane dry pores. The involved amount of heat to be generated in the process can be shown as:

$$Q_f = \alpha_f(T_f - T_1), \quad (3)$$

$$Q_p = \alpha_p(T_2 - T_p), \quad (4)$$

$$Q_m = \frac{k_m}{\delta_m} A(T_1 - T_2) + J(T)H(T), \quad (5)$$

where Q is the total heat transferred from the feed through the membrane to the permeate, $k_m$ is the thermal conductivity of the membrane. A is the membrane area, $\alpha$ is the convective heat transfer coefficient, and H(T) is the latent heat of vaporization.

DCMD Models.

Many MD models have been developed to form mathematical formulas for the membrane boundary layers. However, the majority of these models are built upon empirical relations and laboratory experiments. These models are either valid for steady-state phase, or consider only zero-order performance with no dynamic behavior. This means that they are valid only after a sufficient period of time has passed, where the process reaches the steady-state phase and the performance becomes stationary. A group of mathematical relations for the temperature of the membrane boundary layer region have been proposed and these relationships derived from semi-empirical relations and laboratory experiments. Moreover, these relations are based on the fact that it is difficult to measure interfacial temperatures and concentrations directly. Another model has been proposed to estimate those parameters considering a full knowledge of the heat and mass transfer coefficients throughout the MD module and bulk flow temperatures and concentrations.

In another implementation, a group of differential equations with respect to space can be assumed. The model gives a formula for the membrane interface temperature by relating parameters of the process, however it doesn't account for the time evolution of the process. This model is similar to the model to estimate parameters considering the heat and mass transfer coefficients, but with additional complexity. More elaboration is spent on the same empirical relations that were used. The contribution is through development of an optimized iterative method that reduces the error between initial guess for the membrane interface temperature with the assumed values, so they succeeded to know the temperature in each experiment. An intuition to consider a dynamic model for time evolution of the heat in the MD process was addressed, where the interest was focused on introducing a numerical simulation for the Navier-Stokes equations. Interest in dynamic modeling for the MD process has continued, with many studies tackling the dynamic analysis of heat and mass transfer using Computational Fluid Dynamics (CFD) techniques.

The literature models offer a predictive estimation for the temperature of the boundary layer region of the membrane, but they are unable to provide information for the temperature of the bulk solutions inside. Moreover, the CFD modeling requires high computational effort and cost, and the steady-state models do not account for the time evolution of the process, and the needs of the intermittent sources. For example, if the use of solar energy source to drive the MD process is considered, the model should account for the variable output intensity of the source throughout the day.

Dynamic Modeling of DCMD.

A dynamic mathematical model for the DCMD process is disclosed, which considers the time evolution of the heat and mass transfer mechanisms throughout the feed and the permeate solutions. In addition, the dynamic model offers a complete overview of the process performance starting with the transient phase until the steady-state phase is reached. Heat inside feed and permeate solutions transfers in a form of a sensible and latent heat, and a convective heat. Therefore, mechanisms of heat conduction and heat convection are considered within the evolution of heat inside the DCMD module.

Referring now to FIG. 1, shown is a schematic diagram of an example of a counter current DCMD module 100a with the coordinates illustrated for each process component. The DCMD module 100a includes a feed side 103 and a permeate side 106 separated by a membrane 109. The feed side 103 includes a feed inlet 112 and feed outlet 115 of hot/cold water and the permeate side 106 includes a permeate inlet 118 and permeate outlet 121 of cold/hot water. Due to the very small thickness of the membranes 109 that are used, heat transfer mechanisms inside the feed side 103 and the permeate side 106 are affected by each other, and coupled together. This attachment is clear via the heat flux that flows from the feed solution to the permeate solution through the dry pores of the membrane 109. A 2D ADE can be used to model the dynamic heat transfer mechanisms. The interesting properties of the ADE model make it possible to describe the convection and conduction mechanisms of heat transfer inside the feed and permeate solutions. Moreover, the model accounts for the evolution with time and considers the transient behavior of the MD process.

The DCMD mathematical model can be given by:

$$\frac{\partial T(x,z,t)}{\partial t} + v_z \frac{\partial T(x,z,t)}{\partial z} + v_x \frac{\partial T(x,z,t)}{\partial x} = \alpha_x \frac{\partial^2 T(x,z,t)}{\partial x^2} + \alpha_z \frac{\partial^2 T(x,z,t)}{\partial z^2}, \quad (6)$$

with $$0 < t < \tau_{final}, x \in [0, x_{fm}] \cup [x_{pm}, X], 0 < z < Z,$$

where $x \in [0, x_{fm}]$ is in the feed and $x \in [x_{pm}, X]$ is in the permeate. $v_x$ and $v_z$ are the hot and the cold water stream flow rates along the x, z axes, respectively. They can be assumed to be constant along the operation of the process. $\alpha_x$ and $\alpha_z$ are constants that depend on physical properties of the used water such as: thermal conductivity $\kappa_e$, specific heat $c_p$, and the density $\rho$ in:

$$\alpha = \frac{k_e}{\rho c_p}. \quad (7)$$

The initial conditions can be set to be constant throughout the model domain as:

$$T(x,z,0)=T_{finitial} \text{ for } x\in[0,x_{fm}], \quad (8)$$

$$T(x,z,0)=T_{pinitial} \text{ for } x\in[x_{pm},X]. \quad (9)$$

The associated boundary conditions with the model (e.g., the feed solution) can be assumed to be a Dirichlet condition for the inlet of each subsystem container like in:

$$T(x,0,t)=T_{0_f} \text{ for } x\in[0,x_{fm}], \quad (10)$$

$$T(x,Z,t)=T_{0_p}, \text{ for } x\in[x_{pm},X], \quad (11)$$

and Neumann conditions for the rest of the boundaries. The process can be isolated from the left side boundary of the feed side as in:

$$\left.\frac{\partial T(x,z,t)}{\partial x}\right|_{x=0} = 0, \quad (12)$$

and from the right boundary side for the permeate side as in:

$$\left.\frac{\partial T(x,z,t)}{\partial x}\right|_{x=X} = 0, \quad (13)$$

and can have a trans-membrane heat transfer formula for the heat flux and the latent heat of evaporation with the other subsystem (e.g. the permeate subsystem) such as in:

$$\left.\frac{\partial T(x,z,t)}{\partial x}\right|_{x=x_{fm}} = \left[J(T)H(T) + \frac{k_m}{\delta_m}(T(x_{fm},z,t) - T(x_{pm},z,t))\right]/k_f \quad (14)$$

for the feed side and as in:

$$\left.\frac{\partial T(x,z,t)}{\partial x}\right|_{x=x_{pm}} = \left[J(T)H(T) + \frac{k_m}{\delta_m}(T(x_{fm},z,t) - T(x_{pm},z,t))\right]/k_p \quad (15)$$

for the permeate side, and finally the process has a heat flux release at the bottom boundary for the feed side like in:

$$\left.\frac{\partial T(x,z,t)}{\partial z}\right|_{z=Z} = \phi, \quad (16)$$

and at the top boundary for the permeate side as in:

$$\left.\frac{\partial T(x,z,t)}{\partial z}\right|_{z=0} = \phi, \quad (17)$$

where $\phi\in\mathbb{R}$ is a positive constant to represent the amount of flux that is released outside the process containers. It is considered to be zero in the following simulations. H(T) is the latent heat of evaporation that is responsible of the released sensible heat. The empirical formula for the latent heat of water can be shown as:

$$H(T)=(2500.8-2.362500.8-2.36T+0.0016T^2-0.000006T^3)J/g. \quad (18)$$

In the ADE model, it can be assumed that the heat convection transfer is represented by the transport terms $$\left(\frac{\partial T(x,z,t)}{\partial z}, \frac{\partial T(x,z,t)}{\partial x}\right).$$

and the heat conduction transfer is represented by the second derivative terms $$\left(\frac{\partial^2 T(x,z,t)}{\partial z^2}, \frac{\partial^2 T(x,z,t)}{\partial x^2}\right).$$

Semi-Discretized Model.

It is usually difficult to obtain analytic solutions for Partial Differential Equation (PDE) models, hence numerical methods are an appropriate alternative to get an acceptable approximation for these solutions. Numerical approaches commence by discretizing the equations and forming the discretization grid. This process is fulfilled through dividing the desired domain into specific numbers of points denoted by (n), each point in the grid represents the temperature at that location. In order to indicate the temperature location on the grid, each temperature is indexed with two subscripts $T_{i,j}$ to indicate the rows (i) and columns (j). The distance between two consecutive points in the same row in the grid is equal to the horizontal axis step size $\Delta x$, where it is equal to $\Delta z$ between two points below each other in the vertical axis. The discretization grid specifications can be expressed as:

$$x_i=i\Delta x, \quad (19)$$

$$z_j=j\Delta z, \text{ and} \quad (20)$$

$$T(x_i,z_j)=T_{i,j}. \quad (21)$$

The ADE model is semi-discretized (space only) using finite difference discretization schemes. The convective and diffusive terms are solved with first order upwind scheme, and central difference scheme, respectively. The semi-discretization transforms the PDE model from infinite dimensional problem into a finite dimensional group of Ordinary Differential Equations (ODEs). The relations of the grid points in the domain are significant to solve the model. FIG. 2 shows an example of a grid 203 of discretization for the feed side 103 and permeate side 106, where the points $T_{i,j}$ that are located between $x\in[0, x_{fm}]$ represent the feed solution temperatures and the points $T_{i,j}$ that are located between $x\in[x_{pm},X]$ represent the permeate solution temperatures. In DCMD module 100a, the permeate solution starts right after the thickness of the membrane ($\delta_m$) and the width of the feed solution ($x_{fm}$), as in:

$$x_{pm}=x_{fm}+\delta_m. \quad (22)$$

The discrete version of the 2D ADE is a nonlinear high dimension system of ODEs, given by:

$$\dot{\underline{T}}(x,z,t) = \frac{\partial \underline{T}(x,z,t)}{\partial t} = A\underline{T}(x,z,t) + B\underline{U}(t) + \underline{b}(\underline{T}(x,z,t)), \quad (23)$$

where vector $\underline{T}\in\mathbb{R}^{2n^2\times 1}$ is the state vector which represents the temperature distribution at each grid point inside the feed domain ($\underline{T}_f$), and the permeate domain ($\underline{T}_p$) for the time evolution, such as in $$\underline{T} = \begin{bmatrix} \underline{T}_f \\ \underline{T}_p \end{bmatrix}, \quad (24)$$

and thus $\underline{T}_f,\underline{T}_p\in\mathbb{R}^{2n^2\times 1}$ with n the number of discretization points in x and z. Matrix $A\in\mathbb{R}^{2n^2\times 2n^2}$ represents the operator matrix that has the dynamics of the feed and the permeate subsystems with their couplings on the boundaries as shown in:

$$A = \begin{bmatrix} A_{f_{i,j}} & C_{fp} \\ C_{pf} & A_{p_{i,j}} \end{bmatrix}, \quad (25)$$

where i,j are the discretization grid indices, $A_f \in \mathbb{R}^{n^2 \times n^2}$, $A_p \in \mathbb{R}^{n^2 \times n^2}$, $C_{fp} \in \mathbb{R}^{n^2 \times n^2}$, and $C_{pf} \in \mathbb{R}^{n^2 \times n^2}$ are in:

$$A_{f_{i,j}} = \left(-\frac{v_z}{\Delta z} - \frac{v_x}{\Delta x} - \frac{2\alpha_x}{\Delta x^2} - \frac{2\alpha_z}{\Delta z^2}\right)T_{i,j} + \left(\frac{v_z}{\Delta z} + \frac{\alpha_z}{\Delta z^2}\right)T_{i,j-1} + \quad (26)$$
$$\left(\frac{v_x}{\Delta x} + \frac{\alpha_x}{\Delta x^2}\right)T_{i-1,j} + \left(\frac{\alpha_z}{\Delta z^2}\right)T_{i,j+1} + \left(\frac{\alpha_x}{\Delta x^2}\right)T_{i+1,j},$$

$$A_{p_{i,j}} = \left(\frac{v_z}{\Delta z} + \frac{v_x}{\Delta x} - \frac{2\alpha_x}{\Delta x^2} - \frac{2\alpha_z}{\Delta z^2}\right)T_{i,j} + \left(-\frac{v_z}{\Delta z} + \frac{\alpha_z}{\Delta z^2}\right)T_{i,j+1} + \quad (27)$$
$$\left(\frac{\alpha_x}{\Delta x^2}\right)T_{i-1,j} + \left(\frac{\alpha_z}{\Delta z^2}\right)T_{i,j-1} + \left(-\frac{v_x}{\Delta x} + \frac{\alpha_x}{\Delta x^2}\right)T_{i+1,j},$$

$$C_1 = \frac{\alpha_x}{\Delta x^2}\frac{\Delta x k_m}{\delta_m k_l}, \; l = f, p. \quad (28)$$

Matrix $B \in \mathbb{R}^{2n^2 \times 2}$ is the input matrix as shown in:

$$B = \begin{bmatrix} \left(\frac{v_z}{\Delta z} + \frac{\alpha_z}{\Delta z^2}\right)_1 & 0 \\ \vdots & \vdots \\ \left(\frac{v_z}{\Delta z} + \frac{\alpha_z}{\Delta z^2}\right)_n & 0 \\ 0 & 0 \\ \vdots & \vdots \\ 0 & 0 \\ 0 & \left(-\frac{v_z}{\Delta z} + \frac{\alpha_z}{\Delta z^2}\right)_1 \\ 0 & \vdots \\ 0 & \left(-\frac{v_z}{\Delta z} + \frac{\alpha_z}{\Delta z^2}\right)_n \end{bmatrix}, \quad (29)$$

and $\underline{U}(t)$ is the input vector that contains feed and permeate temperature inlets as in:

$$\underline{U} = \begin{bmatrix} T_{fN_f} \\ T_{fN_p} \end{bmatrix}. \quad (30)$$

Vector $\underline{b}(T)$ contains the boundary conditions associated with the membrane boundary layer cells for the feed and the permeate subsystems, such that the trans-membrane heat flux and the latent heat of evaporation are both functions of the membrane interfaces temperature difference, such as in:

$$\underline{b} = \begin{bmatrix} \zeta_1 \\ \vdots \\ \zeta_n \\ \eta_1 \\ \vdots \\ \eta_n \end{bmatrix}. \quad (31)$$

The polynomial nonlinearity structures in the boundary vector are represented by the vectors:

$$\underline{\zeta} = \begin{bmatrix} 0 \\ \vdots \\ \frac{\alpha_x}{\Delta x}\frac{J(T)H(T)}{k_f} \end{bmatrix} \quad (32)$$

$$\underline{\eta} = \begin{bmatrix} -\frac{\alpha_x}{\Delta x}\frac{J(T)H(T)}{k_p} \\ 0 \\ \vdots \\ 0 \end{bmatrix} \quad (33)$$

The measured output can be given by:

$$y = C\underline{T} \quad (34)$$

with the output matrix $C \in \mathbb{R}^{1 \times 2n^2}$ being $C=[0 \ldots 0 \; 1 \; 1 \; 0 \ldots 0]$.

Referring next to FIG. 3A, shown is a schematic diagram of a fully automated DCMD experimental set up used to evaluate the dynamic model. A flat sheet membrane module with an active surface area of 0.005 m², with flow channel dimensions of 0.1 m×0.05 m×0.002 m, was designed and fabricated using poly methyl methacrylate (PMMA) material. A composite membrane with a poly tetra fluoroethylene (PTFE) active layer and a nonwoven poly propylene support layer was used for MD testing. Some of the membrane parameters are presented in the Table of FIG. 3B, while the Table of FIG. 3C presents the feed water characteristics.

As shown in FIG. 3A, Red Sea water was preheated to desired temperatures and circulated through the feed side 103 of the membrane 109, while de-ionized (DI) water was circulated through the premeate side 106 of the membrane 109 simultaneously in a countercurrent mode. Feed and permeate temperatures were controlled using thermo-regulators. Fresh seawater was used for each experiment. The permeate generated during the MD process resulted in an increase in the volume of coolant and overflow through the outlet of the permeate/coolant tank 303. The overflown permeate was collected in a separate container 306 placed on a weighting balance. The increase in weight of the container 306 was continuously monitored and recorded. Pressure, temperature and flow rates were continuously monitored at the inlet and outlet of the feed and permeate sides 103/106 using respective sensors connected to a data acquisition unit equipped with a Lab View Software. Conductivities of both the permeate and feed solutions were continuously monitored and measured using conductivity meters (Oakton Eutech Instruments, Malaysia).

The influence of feed water temperature ranging from 40° C. to 70° C. on water vapor flux was studied by maintaining a constant temperature on the permeate side at 20° C. All the data were recorded after reaching the steady state temperature. Similarly, the influence of feed water temperature ranging from 30° C. to 75° C. on trans-membrane flux was also studied by ramping the feed solution temperature at a rate of 0.05° C. per minute. During ramping experiments, the coolant temperature was also maintained at 20° C. Feed and coolant flow rates were kept constant at 90 Liters/hour and 60 Liters/hour, respectively, for all the experiments.

The salt rejection was calculated by: $SR=(1-C_p/C_f)*100$, where $C_p$ and $C_f$ are the salt concentrations of permeate and feed solutions, respectively. A salt rejection of 99:99% has been observed in all experiments. The water vapor flux can be determined by $J_v=mw/At$, where mw is the weight of collected permeate at a particular time interval t, and A is the effective membrane area.

Model Validation.

The ADE model has been simulated with a developed MATLAB® software and then validated with experimental data through two sets of experiments. For validation purposes, the same DCMD parameter values and membrane specifications as well as environment conditions were applied.

Steady-State Validation.

Figure 4:
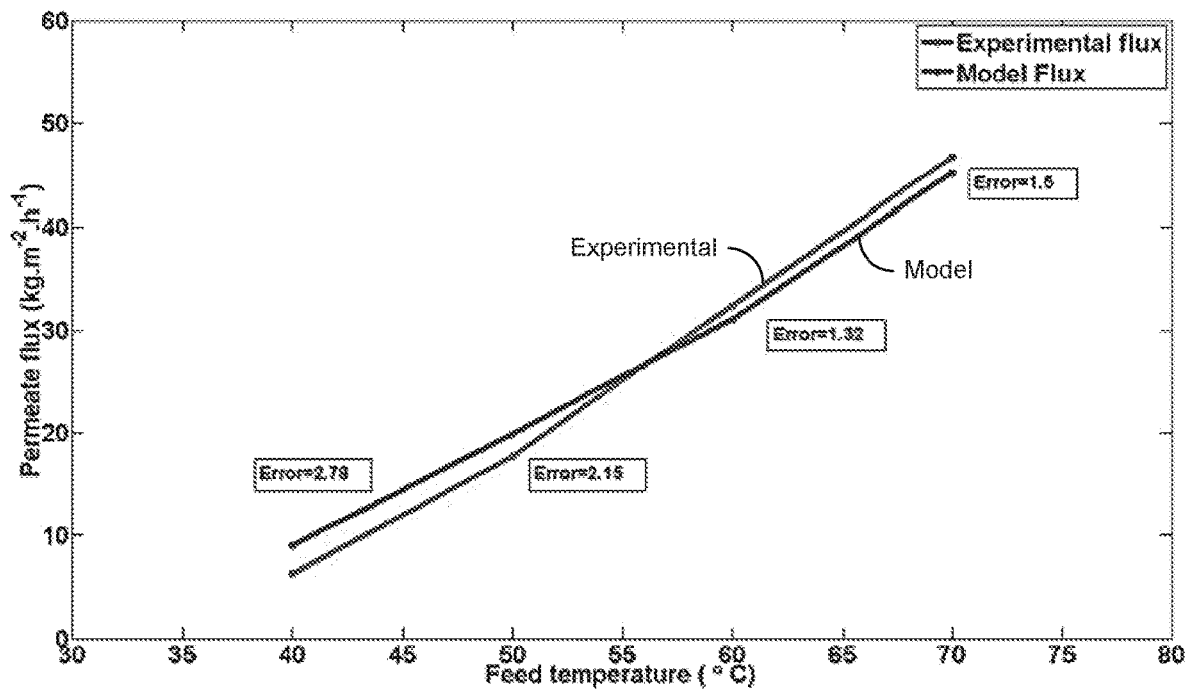
FIGS. 4 and 5 are plots comparing experimental and modeled results in accordance with various embodiments of the present disclosure.

Referring to FIG. 4, shown is a plot of the validation of the dynamic model at the steady-state phase between the experimental data and the simulations for different feed inlet temperatures. The absolute error is also presented in FIG. 4. The model acts best when compared to experiments at high feed inlet temperatures varying from 55° C. to 70° C., while the absolute error is a bit larger for lower temperatures below 40° C. This may be attributed to the water vapor flux being higher at high feed temperatures, which reduces the errors in measurements compared to the very low flux obtained at low feed inlet temperatures.

Transient Validation.

Figure 5:
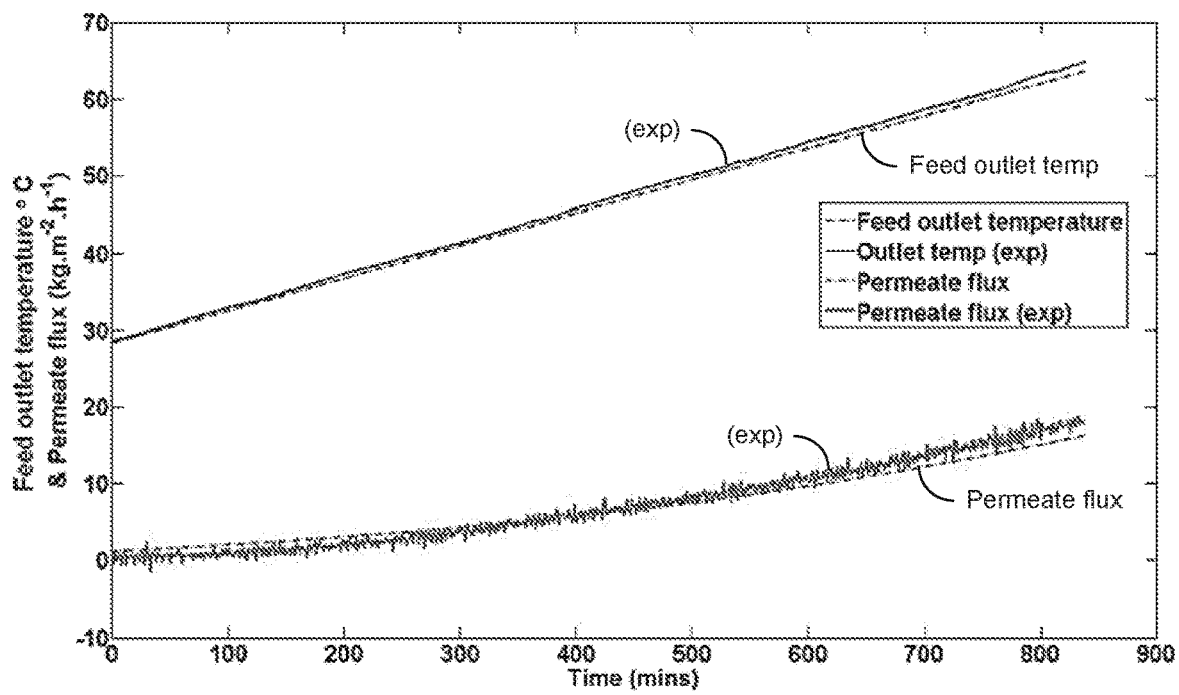

In the other set of experiments, the feed inlet temperature was increased in a ramp fashion from 30° C. to 75° C. The increment was 0.1° C. every 2 minutes, with the outlet feed temperature and permeate flux being recorded. The comparison between the experimental results and the modeled outlet feed temperature and permeate flux is shown in FIG. 5 for the transient phase. In this observation, the transient response of the outlet feed temperature and the permeate flux showed high consistency with the experimental data. This contributes towards the validity of the developed dynamic model to be extended to the transient phase.

The MD process is highly sensitive to considerable variations in the membrane parameter values. For example, FIG. 6 illustrates the effect of membrane pore size variation on the membrane flux, where a higher pore size leads to higher permeate flux. At the same time, the Liquid Entry Pressure (LEP) should not be exceeded to ensure no pore wetting occurs inside the membrane pores. The LEP is equal to 15 PSI for the used membrane, while the actual pressure difference at the liquid-vapor interface ΔP is lower or equal to (7.64-8.33 PSI) for a pore size equal to 0.5 μm and along temperature variation between (20° C.-60° C.), respectively. The variation of the membrane parameter values is very likely to happen when manufacturing the membranes, and so it can introduce some divergence in some cases.

Model Analysis.

The ADE model was applied inside the feed solution as well as the permeate solution. For simulations and up-scaling purposes a software (in a MATLAB® environment) was developed to solve the dynamic model and obtain behavior plots for analysis and improvement aspects. In the simulations, real numeric values for the membrane parameters are used as listed in the Tables in FIGS. 3B and 7. The simulations estimated the response in transient and steady-state phases. The feed and coolant temperatures are set at 60° C. and 20° C., respectively.

Figure 8:
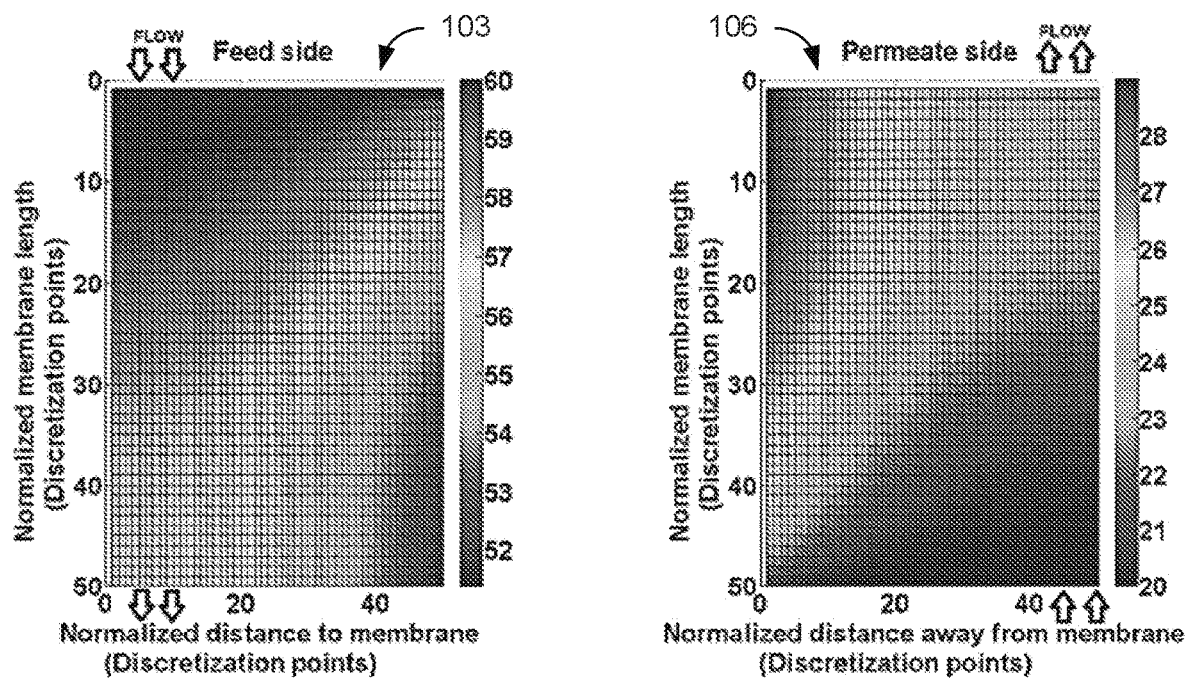
FIGS. 8-13 are plots illustrating the performance of soft sensing estimation using the model for the DCMD module of FIG. 1 in accordance with various embodiments of the present disclosure.

Referring to FIG. 8, shown is an example of the evolution of the feed and permeate solution temperatures at specific instant of time during the transient phase. FIG. 8 shows the feed bulk temperature to be higher than the temperature at the membrane boundary layer from the feed side, and in a same manner the temperature of the membrane boundary layer from the permeate has higher temperature than permeate bulk. It also shows that the difference of temperature between the two sides of the membrane (driving force) is higher at the top side (inlet) of the feed side 103 and decreases gradually towards the bottom side (outlet) of the feed side 103, which is in agreement with the experimental data.

Figure 9:
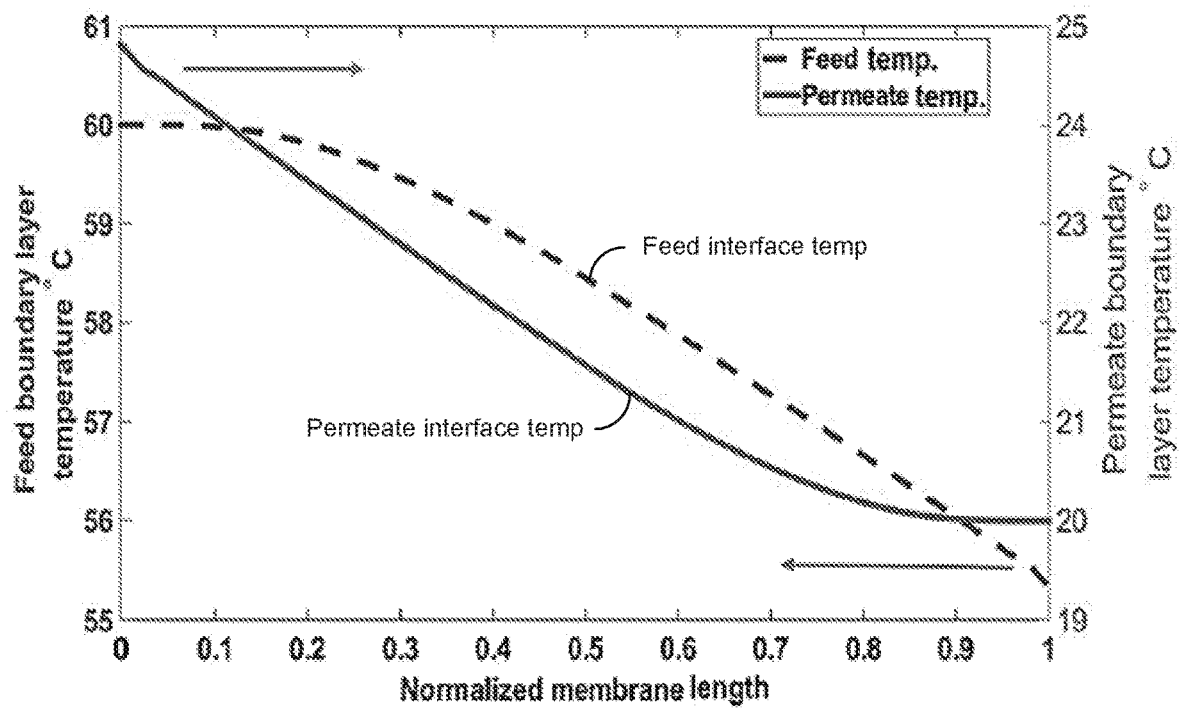

Referring next to FIG. 9, shown is an example of the temperature of the membrane boundary layers at a specific point along the membrane length. FIG. 9 illustrates how close is the amount of temperature drop in the feed side and gained in the permeate side. The feed interlace temperature ranges between 55° C. and 60° C., and the permeate interface temperature ranges between 20° C. and 25° C. along the membrane length.

Figure 10:
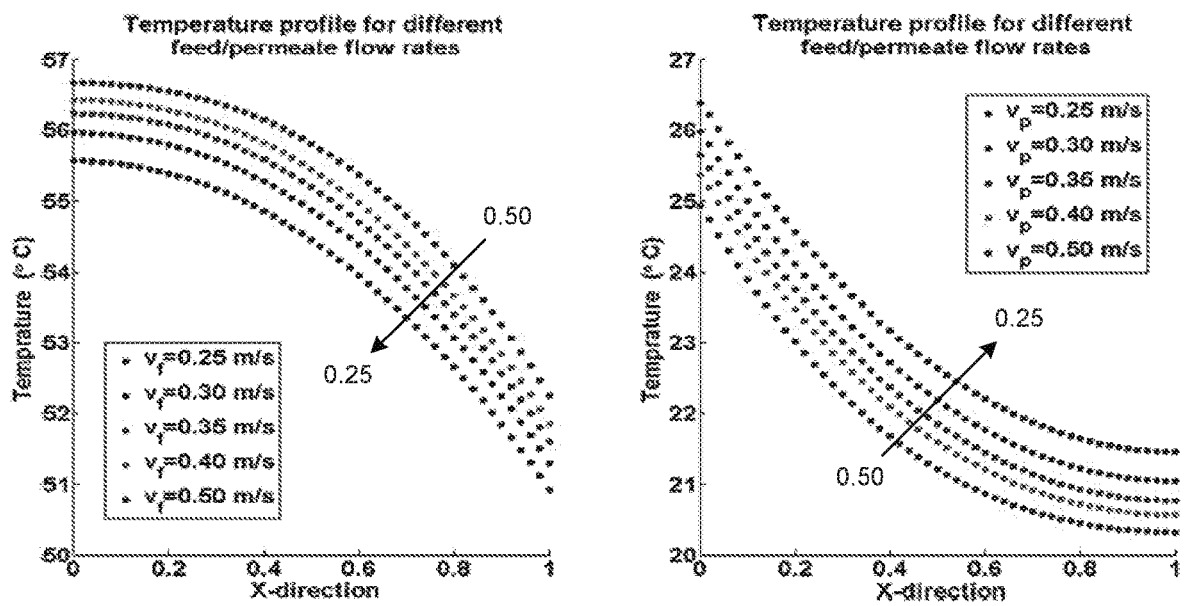

The flow rate of the feed and the permeate streams have a significant role in managing the heat transfer inside the DCMD module. The flow rate controls the amount of the convective heat that transfers throughout the bulk solution, in which increasing its value makes the heat transfers via convection in the bulk more than the conduction through membrane pores. It is useful to have high convection effect, however continuous increasing in the flow rate is unprofitable, because the heat flux would saturate eventually. A smart compromise should take place between convection and conduction mechanisms. The relation between the feed flow rate and the temperature for different flow rates is shown in FIG. 10. Temperature of water molecules near the inlet increases rapidly while increasing flow rate, and therefore, temperature polarization and residence time decrease, while energy consumed by the flow pumps increases.

The temperature polarization was simulated to check the time evolution of its coefficient (TPC). The formula of the TPC is:

$$TPC = \frac{T_{mf} - T_{mp}}{T_{bf} - T_{bp}}. \tag{35}$$

Figure 11:
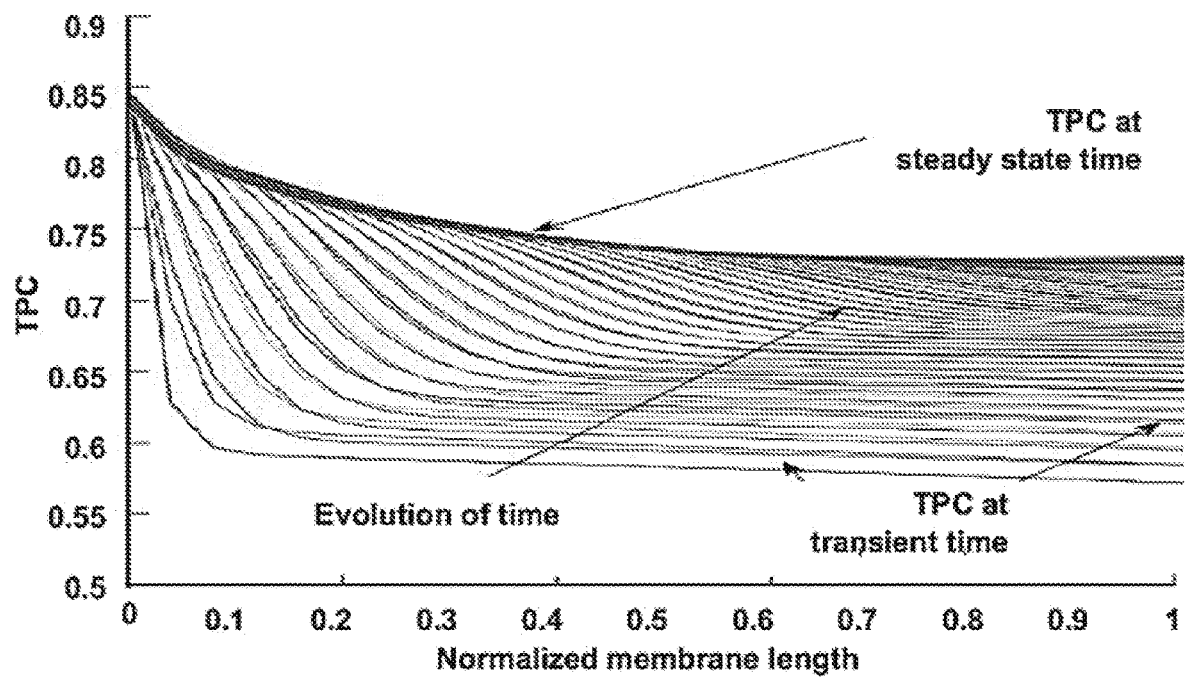

The value of TPC varies from zero for systems that suffer from large boundary layer resistances to unity for well designed systems. FIG. 11 shows examples of the evolution of TPC with time. During the transient phase of the process the amount of heat transfer through the membrane is low due to the starting of heat accumulation, and then it magnifies and increases after reaching steady-state phase.

The dynamic model can be efficiently utilized for DCMD process applications with an intermittent energy supply, such as a solar energy source. The model predictions are strongly correlated with the experimental measurements in both steady state and transient phases, with model predictions being within ±5% of the experimentally obtained values.

The DCMD dynamic model is nonlinear, and it is originated from the functions J(T) and H(T). The present nonlinearity is Lipshitz continuous, which can be shown by examining each function separately. H(T) is Lipshitz continuous following the fact that it is smooth and infinitely differentiable polynomial function. On the other hand, define J(T) to be $$\mathcal{J}(T) = c_1 \left(\frac{1}{T}\right)^{\frac{1}{2}} 10^{\frac{-c_2}{T^2}}, \tag{36}$$

where $c_1, c_2$ are constants, and $T \in [a,b]$, $b > a > 0$. Therefore, J(T) is continuous and differentiable on this interval [a,b], and bounded like in $$\|J(T)\| \leq M. \tag{37}$$

As a result, there exists a Lipshitz constant λ that satisfies:

$$\|f(T_1) - f(T_2)\| \leq \lambda \|T_1 - T_2\|, \tag{38}$$

and the nonlinearity in the DCMD dynamic model is Lipshitz continuous.

Nonlinear Observer.

Nonlinear processes are challenging in stability and control, due to the high sensitivity to initial and forcing conditions. The operation of heat transfer, inside the MD module, is nonlinear and needs sufficient temperature difference along the membrane boundaries to operate efficiently. The temperature distribution along the membrane boundaries can be used in the control of the temperature difference to manage the water production inside the DCMD process. While measuring the temperature distribution is not viable in practice, the process model is observable and the present nonlinearity is Lipshitz continuous, therefore, an observer can be used to estimate the temperature states and feed them back to the controller.

Consider the nonlinear Lyapunov-based observer in the following form:

$$\dot{\hat{\underline{T}}} = \mathcal{A}\hat{\underline{T}} + \mathcal{B}U + \mathcal{F}(\mathcal{H}^{-1}\hat{\underline{T}}) + L(y - \mathcal{C}\hat{\underline{T}}). \quad (39)$$

where $\hat{\underline{T}} \in \mathbb{R}^{2n^2 \times 1}1$ is the estimated state vector for the temperature difference vector ($\tilde{T} = \mathcal{H}$ T) along the membrane boundaries, and L is the observer gain matrix.
In addition, $\mathcal{H} \in \mathbb{R}^{n \times 2n^2}$ is a non-square transformation matrix that form the difference of each correspondent boundaries, such as:

$$\mathcal{H} = \begin{bmatrix} 0 & \dots & 1 & 0 & -1 & \dots & 0 & \dots & 0 \\ 0 & \dots & 0 & 1 & \dots & -1 & 0 & \dots & 0 \\ 0 & \dots & 0 & 0 & \ddots & 0 & \ddots & 0 & 0 \\ 0 & \dots & 0 & \dots & 0 & 1 & \dots & -1 & 0 \end{bmatrix}, \quad (40)$$

and $\mathcal{H}^{-1} = \mathcal{H}^T$, $\mathcal{A} = \mathcal{H} A \mathcal{H}^{-1} \in \mathbb{R}^{n \times n}$ represents the dynamics of the membrane boundaries with representing the dynamics matrix which includes all dynamics of the feed and the permeate with their correspondent couplings on the boundaries as in Eq. (25), $\mathcal{B} = \mathcal{H} B \in \mathbb{R}^{n \times 2}$ is the new input matrix, $\mathcal{F}(\mathcal{H}^{-1}\tilde{T}) = \mathcal{H} f(T) \in \mathbb{R}^{n \times 1}$ is the nonlinear effect on the membrane boundaries, $\mathcal{C} = C\mathcal{H}^{-1} \in \mathbb{R}^{1 \times n}$ is the output matrix, and T=$\underline{T}$. The observer error dynamic equation can be formulated as:

$$\dot{\overline{T}} = (\mathcal{A} - L\mathcal{C})\overline{T} + \mathcal{F}(\mathcal{H}^{-1}\hat{T}) + \mathcal{F}(\mathcal{H}^{-1}\tilde{T}) \quad (41)$$

where $\overline{T} = \hat{T} - \tilde{T}$ is the state estimation error. The following theorem provides sufficient conditions for the exponential stability of the state observer error of Eq. (41).

Theorem.

There exists an exponential stable observer of the form of Eq. (39), if and only if, there exists a symmetric positive definite matrix, P, such that the following standard algebraic Ricatti equation is satisfied:

$$\mathcal{A} P + P \mathcal{A}^T + PR_1 P + Q_1 = 0, \quad (42)$$

where $$R_1 = \left(\gamma^2 I - \frac{C^T C}{\epsilon}\right), Q_1 = I(\epsilon + 1), \epsilon > 0, \epsilon \in \mathbb{R}^+, \quad (43)$$

and the observer gain matrix $$L = \frac{PC^T}{2\epsilon}.$$

Figure 12:
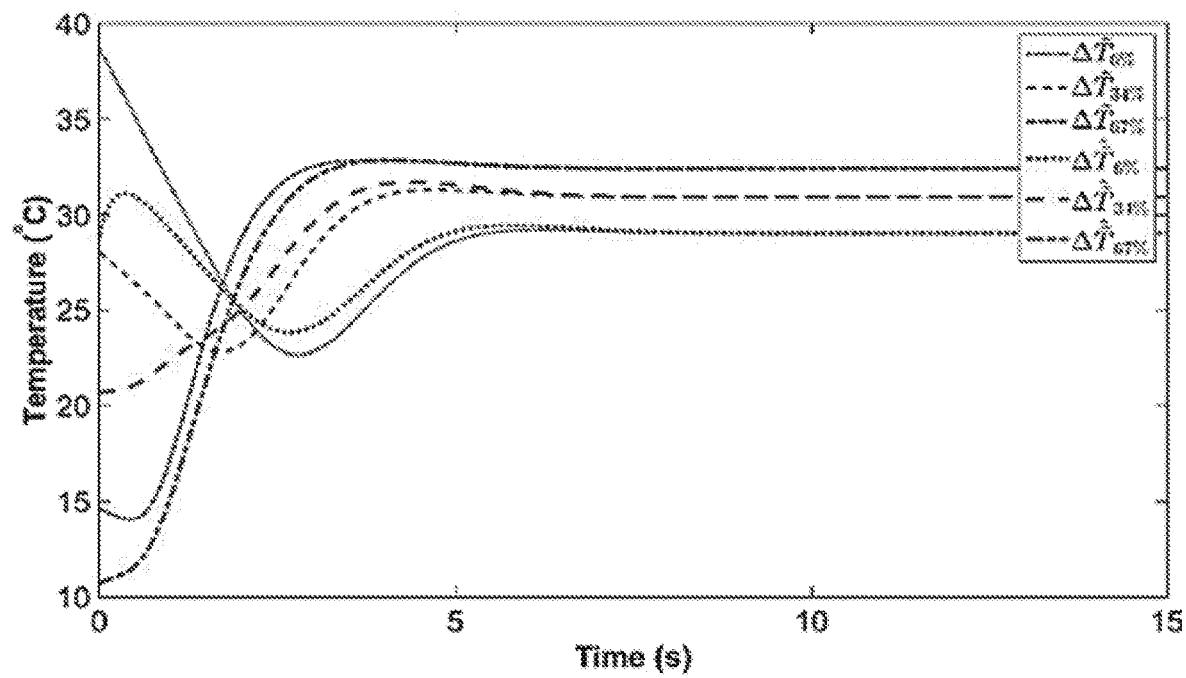
Figure 13:
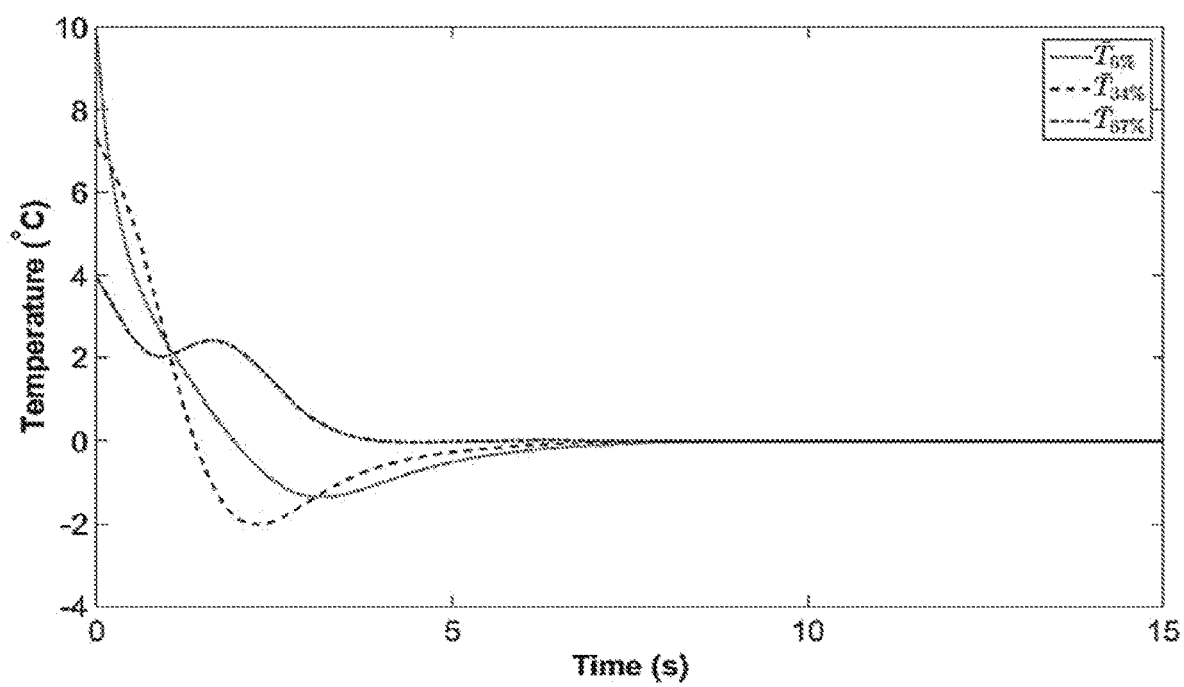

The performance of the nonlinear observer was tested with the convergence time and error. FIG. 12 shows the fast convergence of the estimated states using the nonlinear Lyapunov-based observer for different locations along the membrane length. These locations are marked as a percentage of the total length of the membrane 109 (FIGS. 1 and 2), starting from the top of the membrane to the bottom. As such, FIG. 12 shows the observer convergence on the top (6%), the middle (34%) and the bottom (67%) of the whole membrane length. The fast convergence of the observer was guaranteed by taking smaller sampling times. The error analysis shows the exponential convergence of the error to zero as depicted in FIG. 13.

Soft sensing of the temperature inside a MD module 100a (FIG. 1) along with the estimation of the membrane characteristics is possible using the dynamic model described above. The membrane temperatures are not accessible and are not provided by standard temperature's sensors. The distributed model, which includes a two-dimensional advection diffusion equation, can be used to describe the heat transfer in the MD module 100a. A soil sensing system (or algorithm) based on the observer concept can be used to estimate the temperature and the membrane characteristics of the dynamic system, using measured outlet temperature at both feed and permeate sides.

Estimating the temperature, at the membrane level, for MD plants can provide more information on the process, which can be used for monitoring the system in case something wrong happens. The estimated temperature can be provided to a controller, which controls the performance of the system, especially when connected to a variable source such as a solar energy source. The membrane distillation is driven by the difference of temperature between the two sides of the membrane. With the solar energy source being non-uniform and unstable, soft sensing of the temperature enables the whole process to be controlled in order to insure a desired fresh water production. Along with the temperature measurements, the soft sensing system can provide estimations of other membrane characteristics that cannot be directly measured, such as the mass transfer coefficient.

The present disclosure also builds upon a model based on an electrical analogy to thermal systems. The performance of this model is studied by analyzing the DCMD and to study its predictive capacity. The disclosed model accounts for the spatial and temporal simultaneous heat and mass transfer phenomena in the DCMD. This model enables dynamic predictions of distilled water flux and the temperature distribution along the flow direction by directly solving a system of differential algebraic equations (DAEs). It also offers fixable platform to carryout scale up and design studies, and enable real-time estimation of some intrinsic variables that are inaccessible in physical setups, like the membrane mass transfer coefficient and the temperature at the membrane interfaces. Accordingly, this leads to optimal operating conditions for the MD process. Moreover, the same foundation can be easily extended to other MD configurations.

Dynamic Model of DCMD Formulation.

Figure 14:
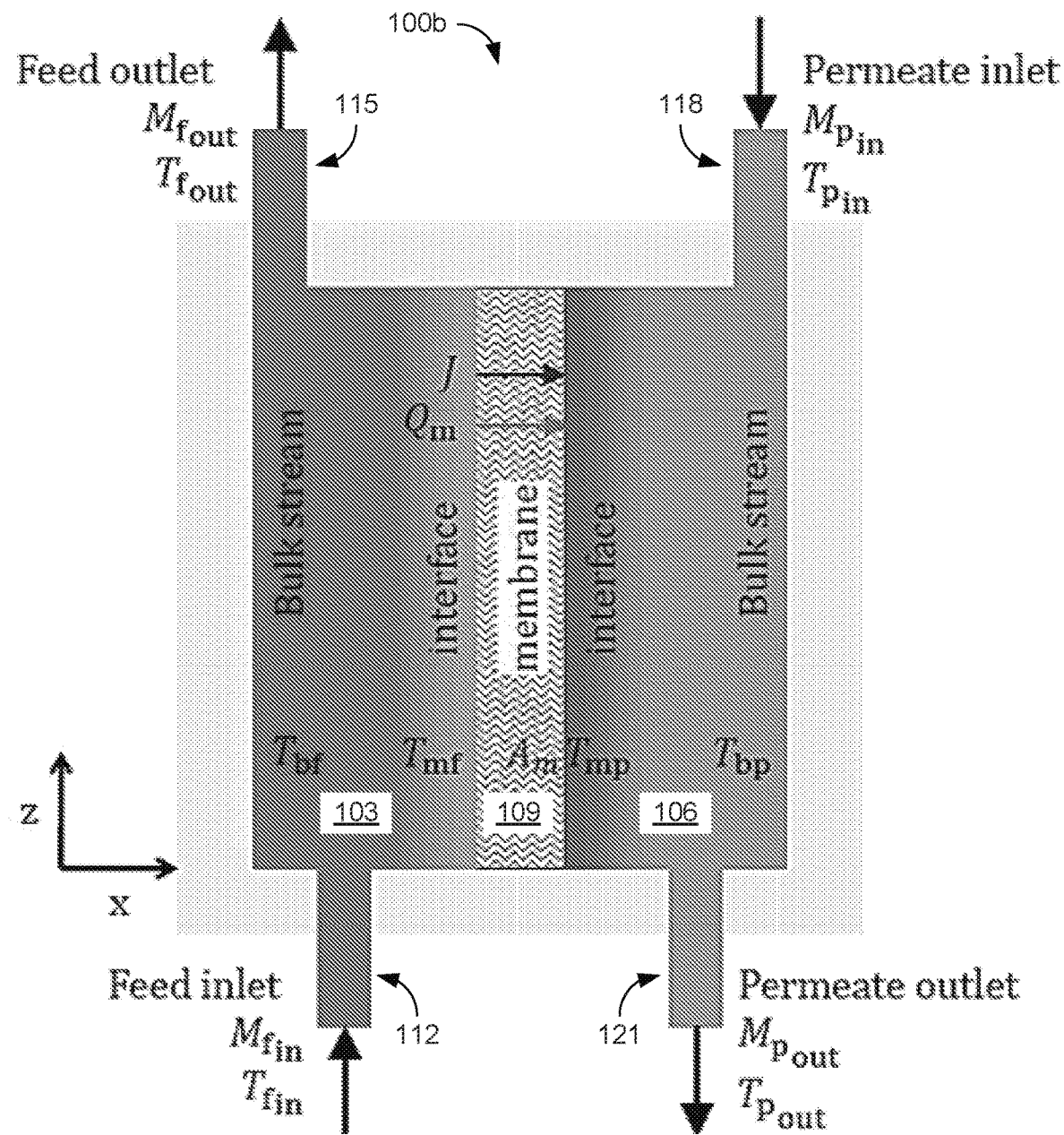
FIGS. 14 and 15 are schematic diagrams of examples of DCMD modules in accordance with various embodiments of the present disclosure.

Referring to FIG. 14, shown is a schematic diagram of a flat-sheet DCMD module 100b. In this configuration, hot water is passed along a hydrophobic membrane 109 on one side (the feed side 103) and cold water flows in the counter direction along the other side (the permeate side 106). Water vapor is driven from the feed side 103 across the membrane 109 and into the permeate side 106 by the induced partial vapor pressure difference. Both heat and mass transfer processes occur simultaneously as water evaporates at the feed-membrane interface and condenses at the permeate-membrane interface. As a result, the temperature at the membrane boundary layers differs from the bulk temperature of the feed and permeate streams, this is known as the temperature polarization effect. In order to quantify this effect, the temperature polarization coefficient (TPC) is given as:

$$TPC = \frac{T_{mf} - T_{mp}}{T_{bf} - T_{bp}}. \tag{44}$$

This effect reduces the mass transfer driving force, and as a result lowers the production rate of the MD desalination system. Moreover, because of the variation of the feed/permeate temperature throughout the module 100b, the TPC varies along the membrane module. Therefore, by dividing the DCMD module 100b into small control volumes of length dz, the temperature changes along the membrane can be accounted for in both the feed and permeate sides. The following subsections detail the mass and heat transfer processes.

Mass Transfer in DCMD.

The transport phenomena can be described by the classic gas permeation and heat transfer theories. The mass flux (J) in the DCMD 100b is related to the saturated vapor pressure difference ΔP across the membrane 109 through the membrane mass transfer coefficient $B_m$, as follows:

$$J = B_m \Delta P = B_m(P_{mf} - P_{mp}). \tag{45}$$

The mechanism dominating the mass transfer through the porous membranes 109 depends on the pore radius (r) and the mean free path of the vapor molecules (λ). For membranes with pore radius in the range of 0.5λ<r<50λ, the membrane mass transfer coefficient is expressed as a parallel combination of Knudsen diffusion ($B_{Kn}$) and molecular diffusion ($B_D$) coefficients given by:

$$B_m = \frac{1}{1/B_{Kn} + 1/B_D}, \tag{46}$$

where:

$$B_{Kn} = \frac{4}{3}\frac{\varepsilon r}{\chi\delta}\sqrt{\frac{2m_w}{\pi \overline{R} T}}, \text{ and } B_D = \frac{\varepsilon}{\chi\delta}\frac{PD}{P_a}\frac{m_w}{\overline{R} T},$$

where χ is the tortuosity of the membrane pores, δ is the membrane thickness, ε is the membrane porosity, $m_w$ is the molecular mass of water, $\overline{R}$ is the gas constant, P is the vapor pressure, D is the diffusivity of the water vapor and air mixture, $P_\alpha$ is the air pressure, and T is the temperature.

The saturated vapor pressure of pure water ($P_w^{sat}[T]$) as a function of temperature is given by the Antoine equation:

$$P_w^{sat}[T] = \exp\left(23.1964 - \frac{3816.44}{T + 227.02}\right). \tag{47}$$

Dissolved salt in the feed stream reduces the saturated vapor pressure. Therefore, to compensate for this, the following relation can be used:

$$P_{mf} = (1 - x_{NaCl})(1 - 0.5x_{NaCl} - 10x_{NaCl}^2)P_w^{sat}[T_{mf}], \tag{48}$$

where $x_{NaCl}$ is the mole fraction of NaCl in the feed stream. However, the permeate is pure and the saturated vapor at the membrane-permeate interface is $P_{mp} = P_w^{sat}[T_{mp}]$.

Heat Transfer in DCMD.

Figures 15, 16:
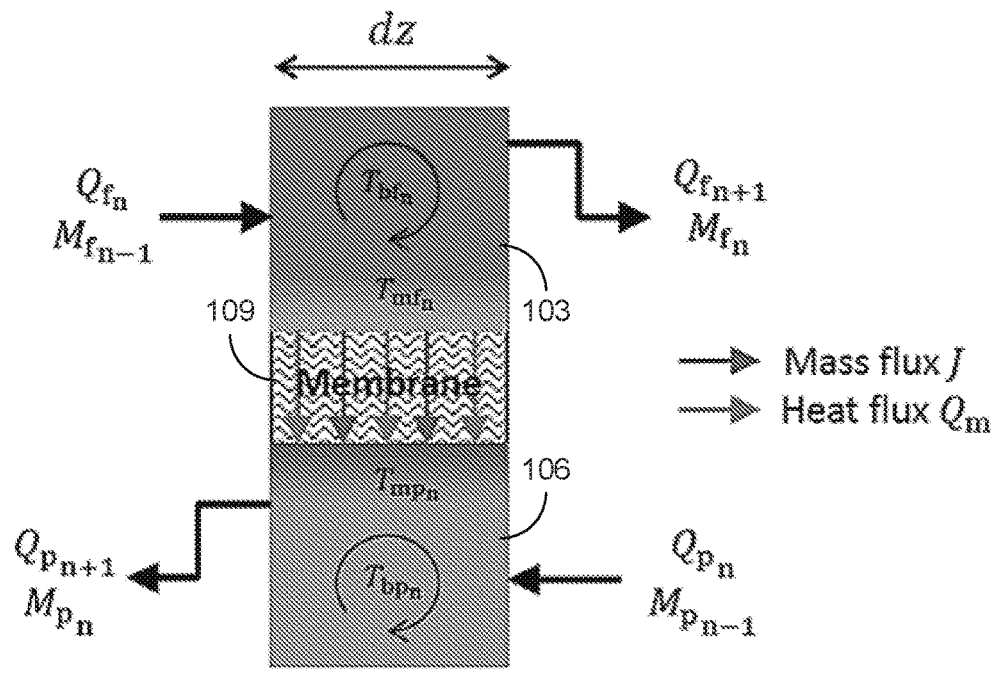
FIG. 16 is a table illustrating electrical thermal analogue elements in accordance with various embodiments of the present disclosure.

To consider the spacial variations on the temperature along the feed and permeate flow directions, the DCMD module 100b can be divided into control-volume cells. Then, based on the lumped-capacitance method, a dynamical model for heat transfer can be developed using the energy conservation law. Conservation laws can be applied on membrane distillation systems in order to develop a mathematical model which describes the dynamical relations between the process variables. This approach is based on lumped-capacitance method, which reduces the DCMD system to discrete control-volume cells. FIG. 15 depicts the $n^{th}$ DCMD cell, where the bulk temperatures ($T_{bf_n}$, $T_{bp_n}$) are uniform throughout the cell except at the membrane interfaces due to the temperature polarization effect. Therefore, heat transfer takes place in three stages, by conduction and due to mass transfer. In the first stage, heat is transferred from the hot bulk feed stream to the boundary layer at the feed-membrane interface, the heat transfer rate is expressed as $Q_{mf}$ by:

$$Q_{mf} = A_m(h_f(T_{bf_n} - T_{mf_n}) + J_n c_p T_{bf_n}). \tag{48}$$

The rate of change of the bulk feed stream energy in the $n^{th}$ cell can now be expressed as:

$$C_{bfg}\frac{dT_{bf_n}}{dt} = Q_{f_n} - Q_{f_{n+1}} - A_m(h_f(T_{bf_n} - T_{mf_n}) + J_n c_p T_{bf_n}), \tag{49}$$

where $Q_{f_n}$ and $Q_{f_{n+1}}$ are the heat transfer rates into and out of the $n^{th}$ feed cell, respectively.

At the second stage, heat is transferred through the membrane via three mechanisms: the first mechanism ($Q_{m1}$) is the latent heat of vaporization ($H_v$) transported by the mass flux ($J_n$) through the $n^{th}$ cell, expressed as:

$$Q_{m1} = A_m J_n H_v[T_{mf}] = B_m(P_{mf_n} - P_{mp_n})H_v[T_{mf}], \tag{50}$$

where the latent heat of vaporization $H_v$ in (KJ/Kg) is expressed as a function of temperature:

$$H_v[T] = -2.42T + 2503. \tag{51}$$

The second and third mechanisms are heat conduction through the membrane material and air trapped in the membrane pores which are combined in ($Q_{m2}$) as:

$$Q_{m2} = A_m h_m(T_{mf} - T^{mp}), \tag{52}$$

where the membrane heat transfer coefficient $h_m$ is given as:

$$h_m = \frac{k_g \varepsilon + k_m(1 - \varepsilon)}{\delta}.$$

Combining these mechanisms to write the energy balance at the membrane interfaces gives the following equation:

$$Q_{mf} = Q_{mp} \tag{53}$$

where the heat transfer rate at the permeate-membrane interface $Q_{mp}$ is expressed as:

$$Q_{mp} = A_m(h_p(T_{mp_n} - T_{bp_n}) + J_n c_p T_{mp_n}) = Q_{m1} + Q_{m2}. \tag{54}$$

Finally, the third stage of heat transfer is where the water-vapor condenses at the permeate-membrane interface and heat is transferred to the bulk permeate mass. The rate of change of energy for the bulk permeate stream is given by:

$$C_{bp}\frac{dT_{bp_n}}{dt} = Q_{p_n} - Q_{p_{n+1}} - A_m(h_f(T_{mp_n} - T_{bp_n}) + J_n c_p T_{mp_n}), \tag{55}$$

where $Q_{p_n}$ and $Q_{p_{n+1}}$ are also the heat transfer rate into and out of the $n^{th}$ permeate cell, respectively.

The two heat transfer coefficients at the membrane interfaces ($h_1$, $h_p$) can be calculated from empirical correlations. These correlations depend on the flow characteristic (laminar or turbulent) and vary accordingly. The following relation can be used for both heat transfer coefficients:

$$h = 0.13 Re^{0.64} Pr^{1/3} \frac{k_w}{D_h}, \quad (56)$$

where Re and Pr are the Reynolds and Prandtl numbers, respectively.

The analysis done so far has not quantified the coupling terms between neighboring cells ($Q_{f_n}$, $Q_{f_{n+1}}$, $Q_{p_n}$, and $Q_{p_{n+1}}$) Equations (49)-(55) can be represented by an electrical analogue circuit. This representation has another advantage, besides facilitating simulation, it allows to couple neighboring cells by modeling the thermal inertia of the system, as discussed in the next subsection.

Dynamic model formulation. The dynamical model is based on electrical analogy to thermal systems, which can be derived from the basic laws of each system. Appendix A details the derivation process and a summary of the electrical analogs of the thermal system is shown in the table of FIG. 16. Indeed, electrical-analogy based methods can be used to describe the dynamical behavior of many industrial and biological systems such as heat exchangers, and the human cardiovascular system. Moreover, the transient diffusion phenomena and the heat transfer due to non-steady fluid flow can be described by an electrical analogue.

Figures 17, 18:
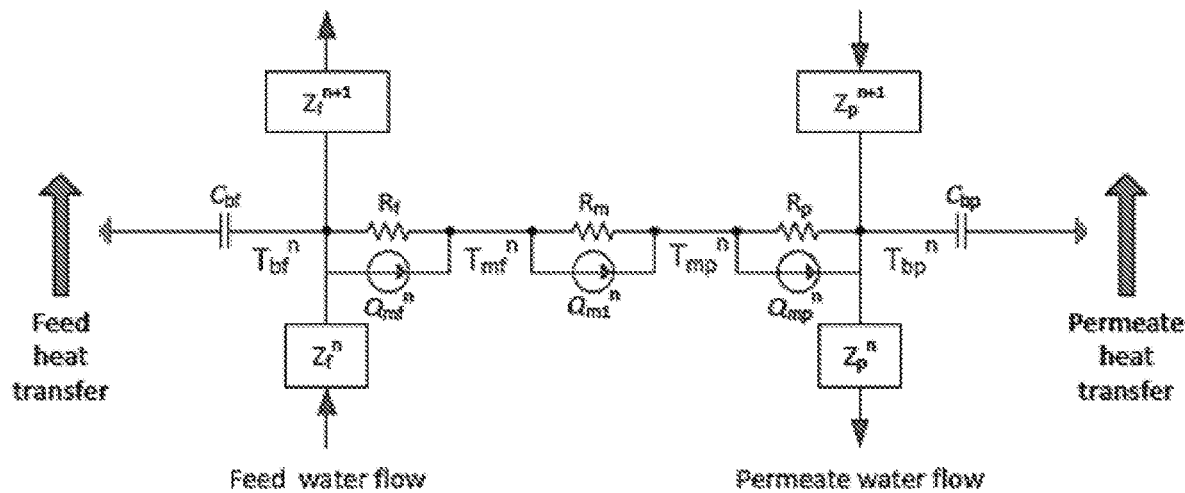
FIG. 17 is a schematic diagram illustrating an electrical thermal analogue network of the $n^{th}$ cell of the DCMD module of FIG. 15 in accordance with various embodiments of the present disclosure.
FIG. 18 is a table of elements of the electrical thermal analogue network of FIG. 16 in accordance with various embodiments of the present disclosure.

Based on the equations derived for the $n^{th}$ DCMD cell, an electrical analogue can be constructed to simulate heat and mass transfer processes. A schematic representation of the electrical analogue of the $n^{th}$ cell of the DCMD module 100b is shown in FIG. 17. The thermal capacity of the feed and permeate bulk sides is represented by $C_{bf}$ and $C_{bp}$ respectively. In each of the three stages of heat transfer discussed above, the heat transfer rate by conduction is proportional to the temperature difference across the thermal resistances $R_f$, $R_m$, and $R_p$, whereas the heat transfer rate due to mass transfer is modeled by the current sources $Q_{mf}^n$, $Q_{m1}^n$, and $Q_{mp}^n$. This completes the analogy of heat transfer within the same cell, and in order to couple neighboring cells, the series impedances (opposition to the heat transfer rate) $Z_f^n$ and $Z_p^n$ are introduced. Apart from the series impedances, the table of FIG. 18 details the expression of each element in the electrical analogue circuit (or electrical thermal network) of FIG. 17.

Another aspect of the DCMD electrical analogy is consideration of the heat transfer by the feed and permeate inlet mass flow rates. Therefore, the electrical analog network of FIG. 17 should be fed and terminated properly to account for the heat transfer rates into and out of the MD module 100b. This, as well as the series impedances, are discussed in Appendix B, and the final results are presented as follows. The temperature drop from one cell to the next in the feed side is proportional to the series impedance $Z_f^n$, which can be given as:

$$Z_f^n = R_{fz}^n + j\omega L_f^n, \quad (57)$$

where:

$$R_{fz}^n = \frac{1}{M_{f_n}^2 c_p^2 (R_f + R_m + R_p)}, \text{ and} \quad (58)$$

$$L_f^n = \frac{R_{fz}^2 C_{bf}}{4}. \quad (59)$$

The symbol $j\omega$ is used to indicate complex impedance. In this case the thermal inertia of the $n^{th}$ cell feed side is modeled by the inductor $L_f^n$, which accounts for the dynamic response that resist sudden changes to temperature by changing the inlet mass flow rate. On the other hand, the steady-state response is given by the thermal resistance $R_{fz}^n$. Similarly, the permeate side series impedance ($Z_p^n$) is given as:

$$Z_p^n = R_{pz}^n + j\omega L_p^n, \quad (60)$$

where:

$$R_{pz}^n = \frac{1}{M_{p_n}^2 c_p^2 (R_f + 0.5 R_m + R_p)}, \text{ and} \quad (61)$$

$$L_p^n = \frac{R_{pz}^2 C_{bp}}{4}. \quad (62)$$

Both of $Z_f^n$ and $Z_p^n$ parametrization was done based on experimental identification using real data.

The other aspect is consideration of the heat transfer rates into and out of the MD module 100b. The feed and permeate inlet temperatures can be simulated by voltage sources that can be set as needed. This allows for simulation of any desired inlet temperature profile. On the other hand, by conservation of energy, the feed outlet temperature cannot go below the permeate inlet temperature and the permeate outlet temperature cannot exceed the feed inlet temperature. Based on this, the feed and permeate outlet sides can be terminated across termination resistances ($R_{f_{term}}$ and $R_{P_{term}}$ receptively) as:

$$0 = T_{f_{out}} - T_{P_{in}} - R_{f_{term}} Q_{f_{n+1}}, \text{ and} \quad (63)$$

$$0 = T_{P_{out}} - R_{f_{in}} + R_{P_{term}} Q_{P1}. \quad (64)$$

Figure 19:
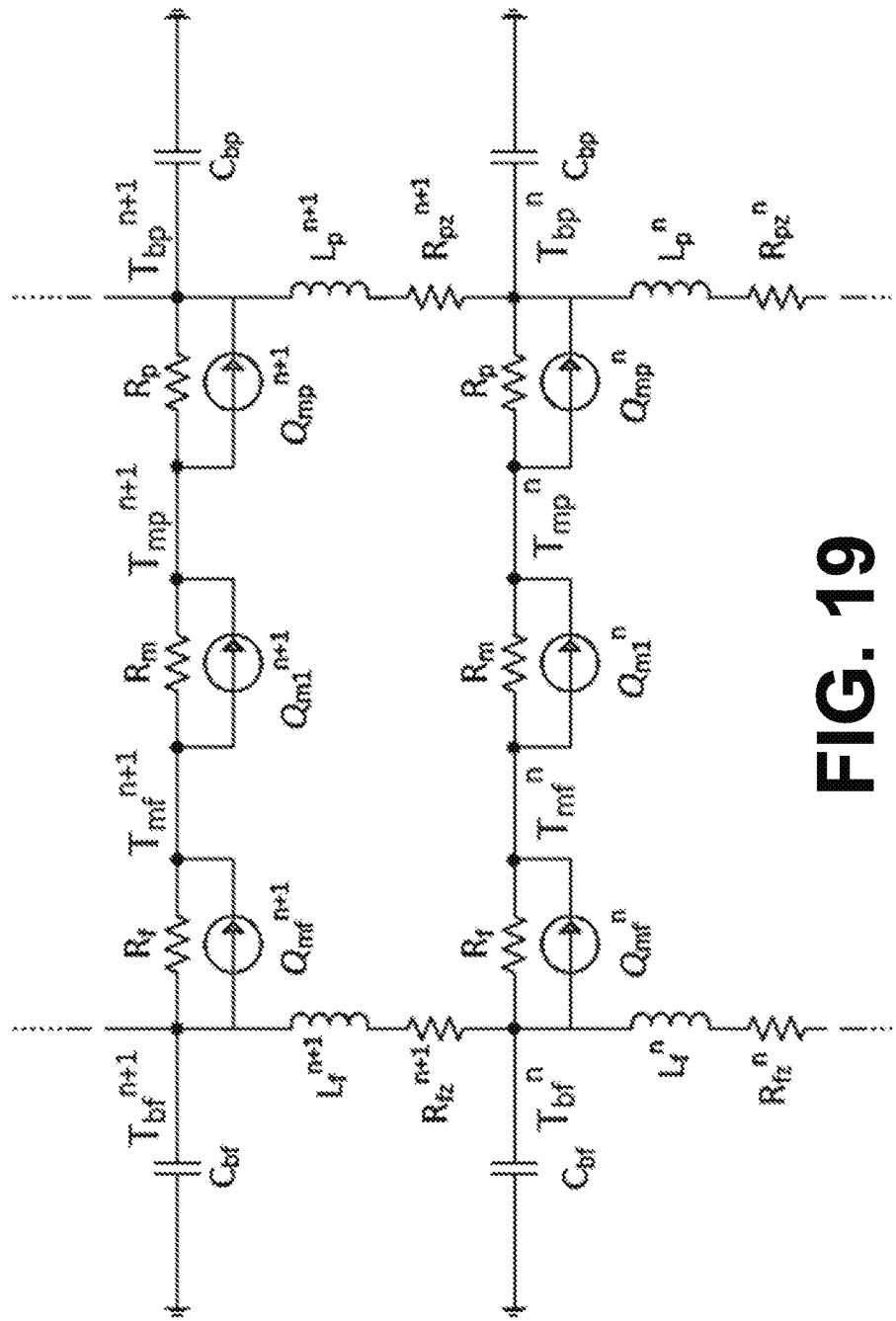
FIG. 19 is a schematic diagram illustrating an example of a completed electrical thermal analogue network of the DCMD module in accordance with various embodiments of the present disclosure.

Referring to FIG. 19, shown is a schematic representation of an example of a complete electrical analogue network including properly identified and parameterized elements. Based on this analogue circuit, electrical laws can be applied to derive the model of the DCMD 100b.

The coupling between neighboring cells can now be quantified by the current (in thermal analogy, current is the heat transfer rate) through the inductors. At the feed side, the rate of change of the heat transfer rate from the n-1 cell to the $n^{th}$ cell is proportional to the temperature difference between them. Taking into consideration the series impedance $Z_f^n$, this can be expressed as:

$$\frac{d Q_{f_n}}{dt} = \frac{1}{L_f^n} T_{bf_{n-1}} - \frac{R_{fz}^n}{L_f^n} Q_{f_n} - \frac{1}{L_f^n} T_{bf_n}. \quad (65)$$

Using Kirchoff's current law at the $n^{th}$ feed node, it follows that the rate of change for the bulk feed temperature ($T_{bf_n}$) is:

$$\frac{d T_{bf_n}}{dt} = \frac{1}{C_{bf}} Q_{f_n} - \frac{1}{C_{bf}} \left( \frac{1}{R_f} + J_n A_m c_p \right) T_{bf_n} - \frac{1}{C_{bf}} Q_{f_{n+1}} + \frac{1}{C_{bf} R_f} T_{mf_n}. \quad (66)$$

Notice that Eq. (66) is equivalent to Eq. (49), but now Eq. (65) describes the dynamics of the heat transfer rates into and out of the $n^{th}$ feed cell ($Q_{f_n}$ and $Q_{f_{n+1}}$, respectively).

Similarly for the permeate side, the rate of change of the heat transfer rate ($Q_{p_n}$) is:

$$\frac{d\, Q_{p_n}}{dt} = \frac{1}{L_p^n} T_{bp_{n-1}} - \frac{R_{pz}^n}{L_p^n} Q_{p_n} - \frac{1}{L_p^n} T_{bp_n}, \quad (67)$$

and the dynamics of the bulk permeate temperature ($T_{bp_n}$) is $$\frac{d\, T_{bp_n}}{dt} = \frac{1}{C_{bp}} Q_{p_n} - \frac{1}{C_{bp} R_p} T_{bp_n} - \frac{1}{C_{bp}} Q_{p_{n+1}} + \frac{1}{C_{bp}} \left( \frac{1}{R_p} + J_n A_m c_p \right) T_{mp_n}. \quad (68)$$

The coupling between the feed and the permeate dynamics in the $n^{th}$ cell is established through the algebraic constraints of Equations (53) and (54), which can be written in residue form as:

$$0 = \left( \frac{1}{R_f} + J_n A_m c_p \right) T_{bf_n} - \frac{1}{R_f} T_{mf_n} - \left( \frac{1}{R_p} + J_n A_m c_p \right) T_{mp_n} + \frac{1}{R_p} T_{bp_n}, \quad (69)$$

and $$0 = \left( \frac{1}{R_m} + \frac{1}{R_p} + J_n A_m c_p \right) T_{mp_n} - \frac{1}{R_p} T_{bp_n} - J_n A_m H_v [T_{mf_n}] - \frac{1}{R_m} T_{mf_n}. \quad (70)$$

The outlet temperatures at the terminal cells of the feed and permeate analogue are also given by the algebraic equations (63) and (64). The heat and mass transfer equations (63)-(70) represent a nonlinear differential-algebraic system.

The electrical thermal network (ETN) model can now be completed with all elements of the network analyzed and parameterized. In this model, the states are the temperatures in each cell and the heat transfer rates into and out of the cell, the manipulated variables are the inlet feed and permeate water temperatures and flow rates, the controlled variables are the water mass fluxes in each cell which when averaged together represent the overall water mass flux of the DCMD module 100b. In the next section, the equations for the DCMD electrical analogy will be driven based on the analysis that has been carried out in order to describe the mass and heat transfer processes.

Experimental Setup and Materials.

Figures 20, 21:
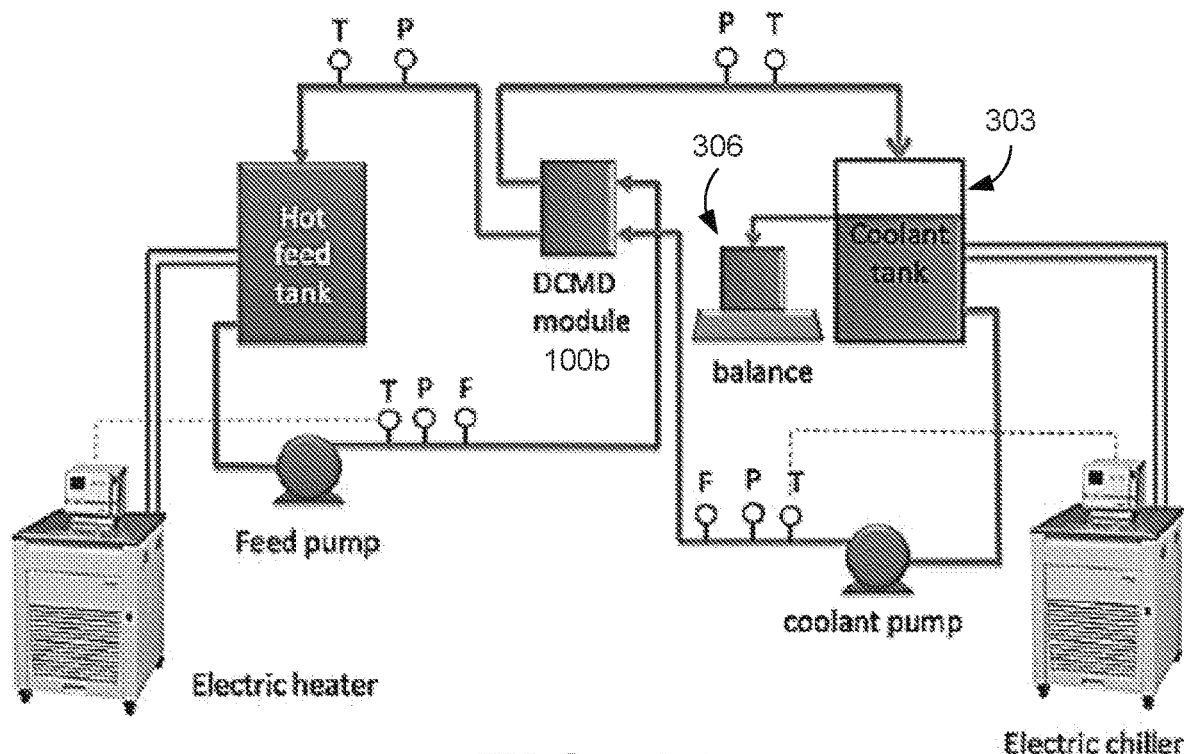
FIG. 20 is a graphical representation of an experimental lab scale setup in accordance with various embodiments of the present disclosure.
FIG. 21 is a table of DCMD module parameters of the experimental lab scale setup of FIG. 20 in accordance with various embodiments of the present disclosure.

The DCMD lab scale set-up used in this experimental work was locally designed and fabricated. A schematic diagram of this setup is presented in FIG. 20. All experimental runs were conducted in a 0.1 m×0.05 m×0.002 m flat sheet membrane module 109 (FIG. 14) made of polymethylmethacrylate (PMMA) material. A composite membrane with a polytetrafluoroethylene (PTFE) active layer and a nonwoven polypropylene support layer was used in all the testing. The table of FIG. 21 presents parameters of the DCMD module 100b.

For the steady state experiments, Red Sea water was preheated to desired temperatures and circulated through the feed side 103 (FIG. 14) of the membrane, while deionized (DI) water was circulated through the permeate side 106 (FIG. 14) of the membrane simultaneously in a counter-current mode. Feed and permeate temperatures were controlled using thermo-regulators. Fresh seawater was used for each experiment. The vapor flux produced in the MD process increases the volume of water in the coolant tank 303 and, as a result, overflow occurs through the outlet of the coolant tank 303 and was collected in a separate container 306 placed on a weighing balance. The increase in weight of the container 306 was continuously monitored and recorded. Pressure (P), temperature (T) and flow rates (F) were continuously monitored at the inlets and outlets of the module 100b for both feed and permeate sides 103 and 106 using respective sensors.

For the transient response experiment, the influence of feed water temperature ranging from 30° C. to 68° C. on trans-membrane flux was also studied by ramping the feed solution temperature at a rate of 0.05° C. per minute. During ramping experiment, the coolant temperature was also maintained at 20° C. For all experiments, feed and coolant flow rates were kept constant at 90 l/h and 60 l/h, respectively, and all measurements were fed through a data acquisition unit into NI LabView software. The conductivity of both the permeate and feed solutions was continuously monitored and measured using conductivity meters (Oakton Eutech Instruments, Malaysia).

Model Validation Results.

This model was implemented using MATLAB® environment, which allows the user to easily adjust the model to simulate various experimental setups and conditions and accurately predict the steady-state and transient behaviors of the DCMD process. In addition, the same model enables scaled up simulations which facilitate module design and process optimization. By increasing the number of total cells (N), the desired level of performance can be achieved. For all simulations in this work, a total of 10 cells were used to simulate the DCMD flat-sheet setup detailed in the previous section and the model was solved using MATLAB® ode15s solver which gave accurate and fast results.

To validate the ETN model, experimental data was collected for both steady state and transient model analysis. The effect of the feed inlet temperature and mass flow rate were investigated and the results are presented and discussed in the following subsections.

DCMD Performance at Different Feed Inlet Temperatures.

Figure 22:
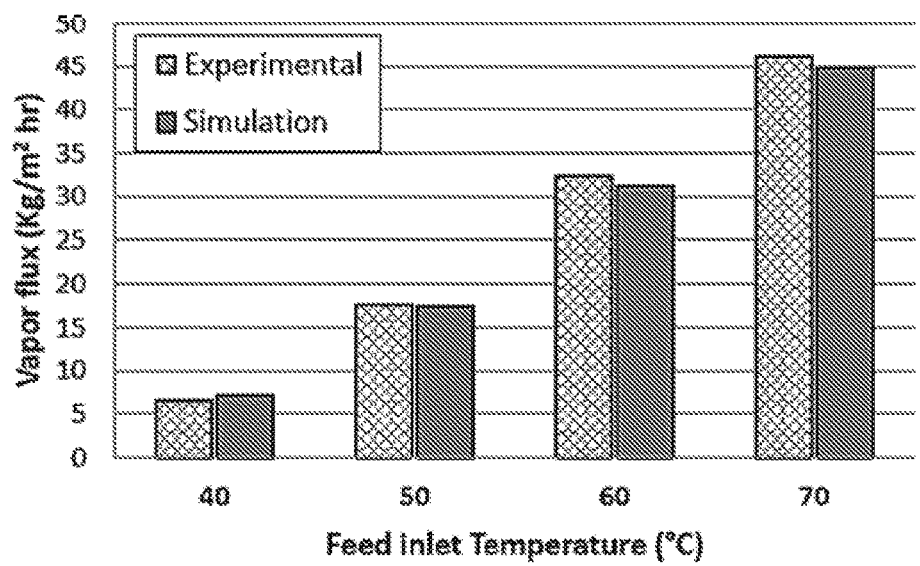
FIGS. 22-27 are plots illustrating the performance of soft sensing estimation using the model for the DCMD module of FIG. 14 in accordance with various embodiments of the present disclosure.

One of the main factors contributing to the flux in DCMD is the feed inlet temperature. Therefore, it was demonstrated that the DCMD model adequately predicts the flux at different feed inlet temperatures. For this experiment, the feed and permeate flow rates were kept constant at 90 l/hr and 60 l/hr, respectively. The permeate inlet temperature was also maintained at 20° C. while the feed inlet temperature was increased from 40° C. to 70° C. in steps of 10° C. The results are plotted in FIG. 22, which shows very good agreement with the experimental measurements throughout the wide range of feed inlet temperatures. The maximum absolute error is 1.3 Kg/m² hr at 70° C., while an error of less than 1.0 Kg/m² hr was observed for the other temperatures.

Dynamic Response of the System.

To study the transient response of the DCMD process, this experiment was designed to ramp up the feed inlet temperature from 30° C. to 68° C. with increment of 0.1° C. per two minutes approximately, while maintaining the permeate inlet temperature constant at 20° C. Counter-current flow mode was used in this experiment, the feed flow rate was 90 l/h, and the permeate flow rate was 60 l/h. Measurements of the feed outlet temperature and water vapor flux were recorded once every minute during the course of approximately 14 hours experiment.

Figure 23:
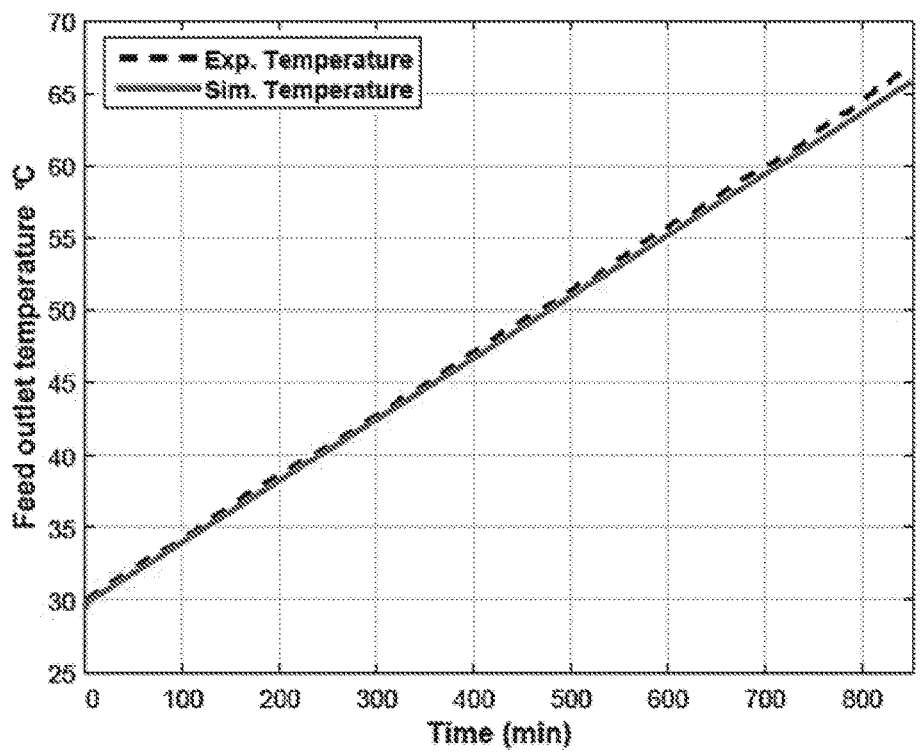
Figure 24:
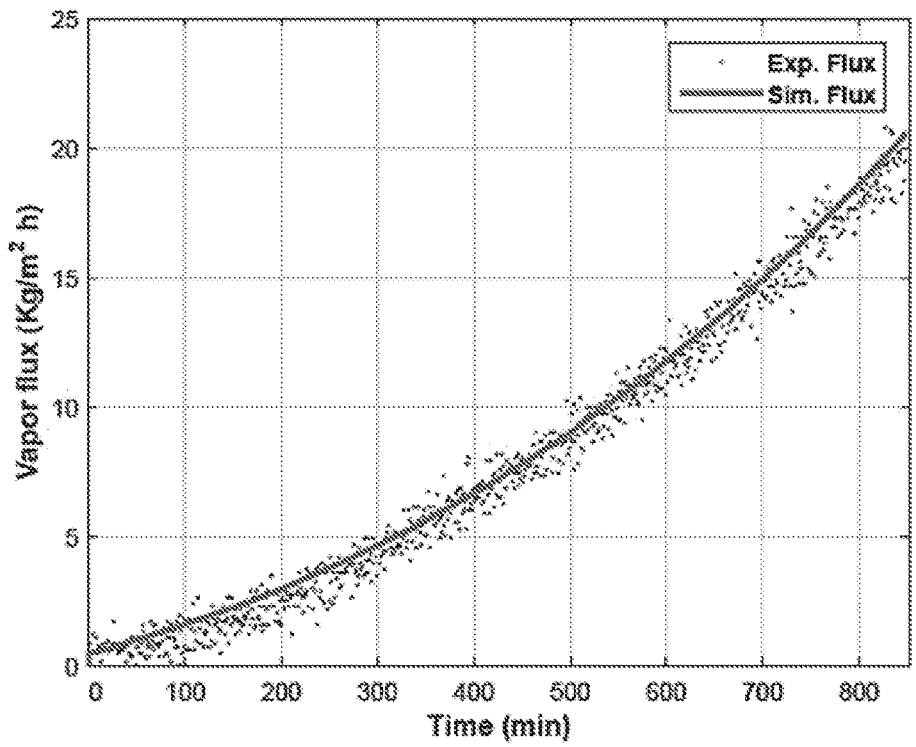

Referring to FIG. 23, shown is a plot of feed outlet temperature for a ramp feed inlet temperature from 30° C. to 68° C. The simulated (solid line) and the experimental measurements (dashed-line) of the feed outlet temperature are depicted. It can be seen that the feed outlet temperature linearly follows the inlet profile and it is clear that the simulation results closely match the experimental data. The simulation results of distilled water flux are illustrated in FIG. 24, which shows a plot of the vapor flux for a ramp feed inlet temperature from 30° C. to 68° C. The dots are the experimental measurements and the solid line is simulation results. Since the vapor flux is a nonlinear function of the trans-membrane temperature difference, an exponential increase in the flux with respect to the feed inlet temperature was noticed. Also, the figure shows good agreement between the measured and simulated flux.

DCMD Process Prediction.

Based on the satisfactory results obtained for the steady-state and dynamic response validations, the same model can be used to solve for intrinsic variables that are not accessible in the physical setups. In the next subsections, the effect of the feed and permeate inlet velocities on the TPC and the response of temperatures and vapor flux at a given cell to a step change in the inlet velocity are presented. In order to demonstrate the flexibility of the model, the DCMD module dimensions for all the following studies were: length 0.4 m, width 0.2 m, channel thickness 0.003 m and keeping the same membrane parameters shown in the table of FIG. 21.

Effect of Linear Velocity on the TPC.

Figure 25:
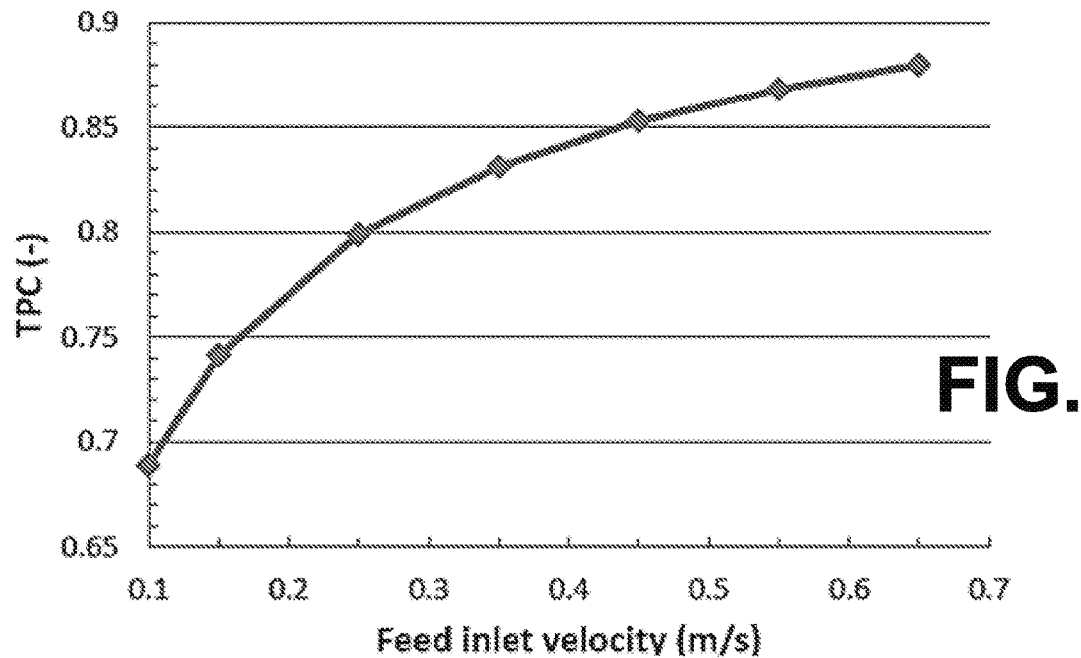

To investigate the effect of feed/permeate inlet velocities on the TPC, the following simulation was designed. The feed and permeate inlet temperatures are kept constant at 60° C. and 20° C., respectively, while the inlet velocities were increased from 0.1 m/s to 0.65 m/s. FIG. 25 shows the TPC as a function of the feed inlet velocity. It is clear that increasing the inlet velocities has a desirable effect on the TPC. However, this effect begins to saturate starting from 0.5 m/s onwards. As the velocity inside the feed/permeate channels increases, the flow becomes more turbulent and, as a result, the thermal boundary layer thickness is reduced and therefore the temperatures at the membrane interfaces are brought closer towards that of the respective bulk temperature.

Dynamic Response to a Step Change of Inlet Velocities.

The other advantage of the ETN model is the ability to obtain a time response under dynamic changes in the process. The effect of increasing the feed inlet temperature was previously examined. In this simulation, the feed and permeate inlet temperatures were again kept constant at 60° C. and 20° C., respectively, while the feed and permeate inlet velocities were changed in steps from 0.2 m/s to 0.4 m/s at t=10 s.

Figure 26A:
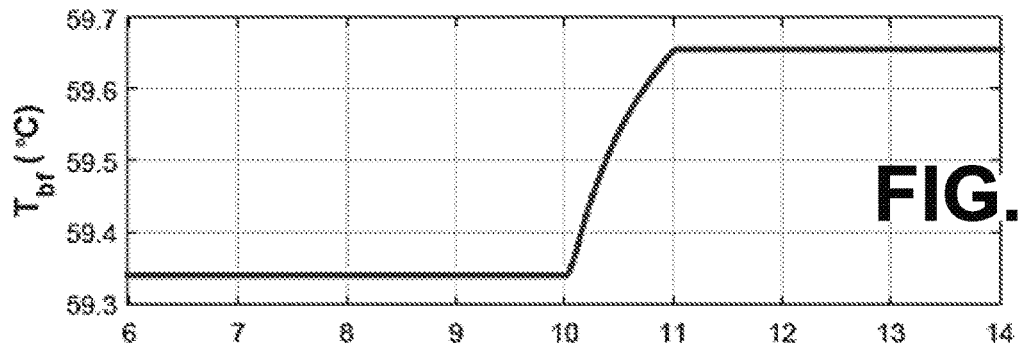
Figure 26B:
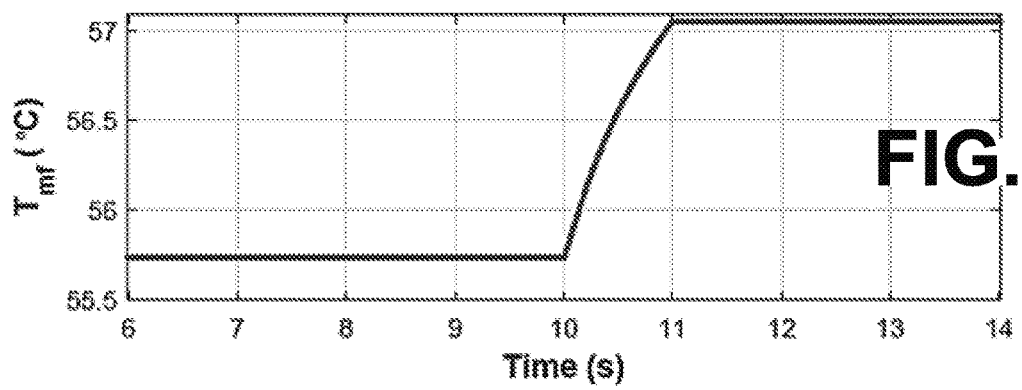
Figure 27:
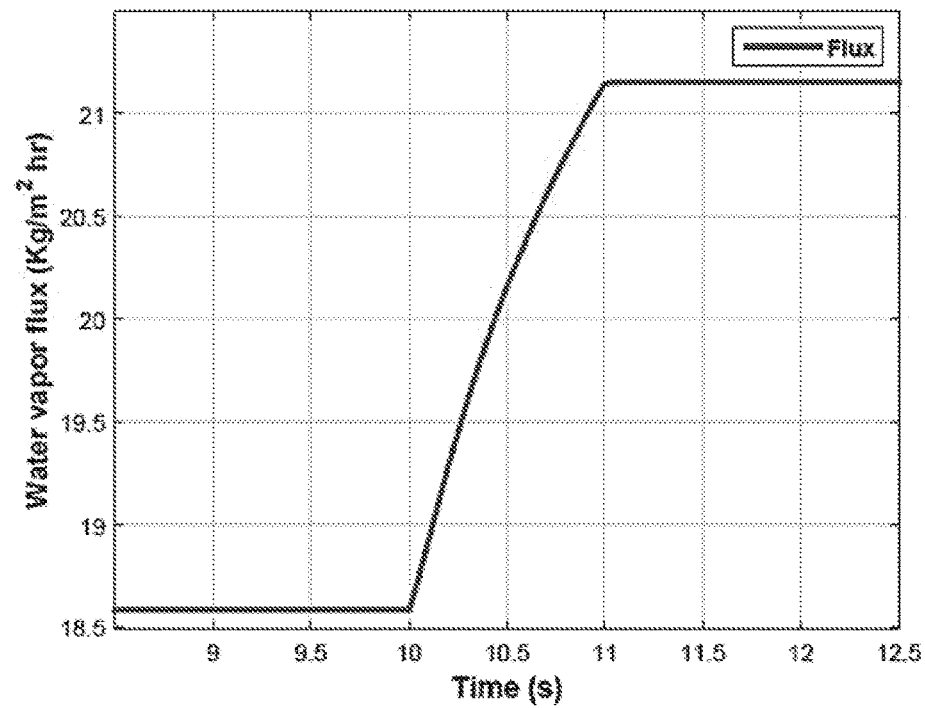

Referring to FIGS. 26A and 26B illustrate the temperature response of the third cell under a step change in the inlet velocities. FIG. 26A shows the bulk feed temperature and FIG. 26B shows the membrane-feed temperature. First, note that the DCMD process response is fast, given sufficient actuation power. Second, note that the temperature increase at the membrane-feed interface is higher (about 1.5° C.) than that at the feed bulk (about 0.3° C.). This shows how influential the inlet velocities on the TPC and therefor on the distilled water flux, depicted in FIG. 27. The water vapor flux response for a step change in the feed/permeate inlet velocities vs. time is illustrated.

Membrane Mass Transfer Coefficient Identification.

The membrane mass transfer coefficient can be estimated to study the efficiency of the module design and monitor the condition of the membrane during operation. A simple test was devised to identify the membrane mass transfer coefficient in each cell which demonstrates the potential application for this model. Again, ten cells were used for this test, but now two cells had a membrane mass transfer coefficient of 4.1919e-07 (Kg/m² hr Pa) and the remaining eight cells had a mass transfer coefficient of 6.6919e-07 (Kg/m² hr Pa). Ten experiments were simulated with increasing linear velocities of the feed and permeate streams from 0.115 m/s to 0.55 m/s, with a feed inlet temperature of 60° C. and a permeate inlet temperature of 20° C., and the total flux was recorded for each experiment. The total flux of the module can be expressed as the sum of the individual cells fluxes:

$$J = \sum_{n=1}^{10} B_{m_n} \Delta P_n. \tag{71}$$

A linear system of equations was set to identify the individual cell membrane mass transfer coefficients, in which the partial vapor pressure difference across the membrane in each cell was calculated from the temperature distribution along the flow direction. By solving the system of equations for $B_{m_n}$ using the truncated singular value decomposition method, the mass transfer coefficient of each cell was successfully identified and in the correct order.

The derivation of a dynamic model for DCMD based on electrical analogy to thermal systems and lumped parameter method was presented. This model was then used to predict and simulate the dynamic response of the water vapor flux under various conditions. The obtained results show great agreement with experimental measurements. The effect of inlet velocities on the process was then investigated. The TPC increased significantly with higher velocities reaching a maximum value of 0.88 at inlet velocities of 0.65 m/s, with asymptotic behavior at high velocities. It was also found that the increase of temperature at the membrane-feed interface is higher than that at the bulk feed. The model was then used to estimate the membrane mass transfer coefficient and identify faults that might be taking place at long operation.

Adaptive Observer for Descriptor Systems

Adaptive observers can be used for joint state and parameter estimation. Among the main motivations to study and design adaptive observers are adaptive control and fault detection and isolation (FDI). Under Lipschitz conditions for the nonlinear terms, one can derive the observer gain based on Lyapunov analysis by solving a set of linear matrix inequalities (LMI). Presented here is an adaptive descriptor observer design for a class of nonlinear descriptor systems with Lipschitz nonlinearities and unknown parameters. Unlike previous methods, the disclosed method does not require coordinate transformation. In addition the adaptive observer gain design can be facilitated by solving a set of LMI, which ensures sufficient conditions for asymptotic convergence of the states and parameters estimations to their true values.

Consider the following descriptor system:

$$E\dot{x} = Ax + Bu + D\gamma(t,x)\theta + \psi(t,y,u),$$

$$y = Cx, \tag{72}$$

where $x \in \mathbb{R}^n$ is the system state, $u \in \mathbb{R}^m$ is the system input (assumed known), $y \in \mathbb{R}^r$ is the system output, $\theta \in \mathbb{R}^{n_\theta}$ is a vector of unknown time invariant parameters. The matrices $E, A \in \mathbb{R}^{n \times n}$, $B \in \mathbb{R}^{n \times m}$, $D \in \mathbb{R}^{n \times q}$, and $C \in \mathbb{R}^{r \times n}$ are constants and rank(E)=s<n. The known nonlinear functions $\gamma(t,x) \in \mathbb{R}^{q \times n_\theta}$ and $\psi(t,y,u) \in \mathbb{R}^n$ are locally Lipschitz.

The following definitions are used for descriptor systems stability and observability:

Lemma 1. Let x and y be real vectors of the same dimension. Then, for any scalar $\epsilon>0$ the following inequality holds:

$$2x^T y \leq \epsilon x^T x + \epsilon^{-1} y^T y.$$

Definition 1. If $\det(sE-A)\neq 0$, $s\in\mathbb{C}$, then the pair $(E, A)$ is said to be regular. A regular pair $(E, A)$ is impulse-free if $\deg \det(sE-A)=\text{rank}(E)$. If all the roots of the polynomial $\det(sE-A)=0$, $s\in\mathbb{C}$ have negative real parts, then the pair $(E, A)$ is stable. If the pair $(E, A)$ is regular, impulse-free, and stable, then it is said to be admissible.

Lemma 4. The pair $(E, A)$ is admissible if and only if there exists a matrix $X\in\mathbb{R}^{n\times n}$ that satisfied the following:

$$E^T X = X^T E \geq 0,$$

$$A^T X + X^T A < 0.$$

Definition 2. The system of Eq. (72) is R-detectable if and only if its slow subsystem (differential equations) is detectable, i.e.:

$$\text{rank}\begin{bmatrix} sE-A \\ C \end{bmatrix} = m, \forall s \in \mathbb{C}, s \text{ finite}.$$

Definition 3. The system of Eq. (72) is called impulse-observable if and only if its fast subsystem (algebraic equations) is impulse-observable, i.e.:

$$\text{rank}\begin{bmatrix} E & A \\ 0 & E \\ 0 & C \end{bmatrix} = n + \text{rank } E.$$

It is assumed that the system of Eq. (72) is R-detectable and impulse-observable, that for $\alpha_1>0$, the function $\gamma(t, x)$ satisfies:

$$\|\gamma(t,x_1)-\gamma(t,x_2)\| \leq \alpha_1\|x_1-x_2\| \quad (73)$$

And that the parameter vector $\theta$ is piecewise constant and bounded $\|\theta\|\leq\alpha_2$, $\alpha_2>0$.

The full-order adaptive observer for the system of Eq. (72) is of the form:

$$E\dot{\hat{x}} = A\hat{x} + Bu + D\gamma(t,\hat{x})\hat{\theta} + \psi(t,y,u) + K(y-\hat{y})$$

$$\hat{y} = C\hat{x} \quad (74)$$

where $\hat{x}\in\mathbb{R}^n$ and $\hat{\theta}\in\mathbb{R}^{n_\theta}$ are the state and parameter estimates, respectively, and $K\in\mathbb{R}^{n\times r}$ is the observer gain to be designed. Defining the state estimation error as $e_1=x-\hat{x}$, then from Eq. (72) and Eq. (74) the observer error dynamics are given by:

$$E\dot{e}_1 = (A-KC)e_1 + D(\gamma(t,x)\theta - \gamma(t,\hat{x})\hat{\theta}). \quad (75)$$

The following theorem gives sufficient conditions for convergence of the adaptive observer error dynamics.

Theorem 1. Consider the following parameter estimation adaptation law:

$$\dot{\hat{\theta}} = \Sigma^{-1}\gamma^T(t,\hat{x})\eta C(x-\hat{x}),$$

where $\Sigma^{-1}=\Sigma^{-T}>0$ is an arbitrary constant matrix of appropriate dimension, which can be thought of as the adaptation rate, and $\eta\in\mathbb{R}^{q\times r}$ such that $D^T P=\eta C$. Then, the system of Eq. (74) is an asymptotically stable adaptive observer for the system of Eq. (72), if there exists a non-singular matrix $P\in\mathbb{R}^{n\times n}$, a matrix $W\in\mathbb{R}^{r\times n}$ such that $K=(WP^{-1})^T$, and a scalar $\epsilon_1>0$ for which the following matrix inequalities are solvable:

$$E^T P = P^T E \geq 0, \quad (76)$$

$$\begin{bmatrix} \Omega & P^T \\ P & -\epsilon_1 I \end{bmatrix} < 0, \quad (77)$$

where $\Omega = A^T P + P^T A - C^T W - W^T C + \epsilon_1\alpha_1^2\alpha_2^2\|D\|^2 I$.

Moreover, if the persistent excitation condition holds $\forall t_0, \exists \xi, \delta>0$ such that:

$$\int_{t_0}^{t_0+\delta} D\gamma(\tau,x)\gamma(\tau,x)^T D^T d\tau > \xi I, \quad (78)$$

then the parameter estimation error converges to zero, i.e $\hat{\theta}\to\theta$ as $t\to\infty$.

Proof.

If the system of Eq. (75) is shown to be asymptotically stable, then it follows that the system of Eq. (74) is a full-order adaptive observer for the system of Eq. (72). Let $\bar{A}=(A-KC)$ and define the Lyapunov candidate function for error dynamics as:

$$V(t) = e_1^T E^T P e_1 + e_2^T \Sigma e_2, \quad (79)$$

where $e_2=\theta-\hat{\theta}$ is the parameter estimation error. The derivative of $V(t)$ can be given as:

$$\begin{aligned}\dot{V}(t) &= (E\dot{e}_1)^T P e_1 + e_1^T P^T E\dot{e}_1 + 2e_2^T \Sigma \dot{e}_2, \\ &= [\bar{A}e_1 + D\gamma(t,x)\theta - D\gamma(t,\hat{x})\hat{\theta}]^T P e_1 + \\ &\quad e_1^T P^T [\bar{A}e_1 + D\gamma(t,x)\theta - D\gamma(t,\hat{x})\hat{\theta}] + \\ &\quad 2e_2^T \Sigma \dot{e}_2, \\ &= e_1^T [\bar{A}^T P + P^T \bar{A}] e_1 + \\ &\quad 2[D\gamma(t,x)\theta - D\gamma(t,\hat{x})\hat{\theta}]^T P e_1 + 2e_2^T \Sigma \dot{e}_2.\end{aligned}$$

Substituting $\hat{\theta}=\theta-e_2$ in the second term gives:

$$\begin{aligned}\dot{V}(t) &= e_1^T [\bar{A}^T P + P^T \bar{A}] e_1 + \\ &\quad 2[D\gamma(t,x)\theta - D\gamma(t,\hat{x})\theta]^T P e_1 + \\ &\quad 2[D\gamma(t,\hat{x})e_2]^T P e_1 + 2e_2^T \Sigma \dot{e}_2.\end{aligned}$$

Applying Lemma 1 (from above) to the second term gives:

$$\begin{aligned}\dot{V}(t) &\leq e_1^T [\bar{A}^T P + P^T \bar{A}] e_1 + \\ &\quad \epsilon_1 \|D(\gamma(t,x) - \gamma(t,\hat{x}))\theta\|^2 + \\ &\quad \epsilon_1^{-1} e_1^T P^T P e_1 + \\ &\quad 2[D\gamma(t,\hat{x})e_2]^T P e_1 + 2e_2^T \Sigma \dot{e}_2.\end{aligned}$$

Using Eq. (73) on the second term gives:

$$\dot{V}(t) \leq e_1^T [\Omega\epsilon_1^{-1} P^T P] e_1 + 2[D\gamma(t,\hat{x})e_2]^T P e_1 + 2e_2^T \Sigma \dot{e}_2, \quad (80)$$

where $\Omega = \bar{A}^T P + P^T \bar{A} + \epsilon_1\alpha_1^2\alpha_2^2\|D\|^2 I$.

Since $\theta$ is piecewise constant, $\dot{\theta}=0$, thus $\dot{e}_2=-\dot{\hat{\theta}}$. Using the condition $D^T P = \eta C$, it is possible to obtain:

$$2[D\gamma(t,\hat{x})e_2]^T P e_1 + 2e_2^T \Sigma \dot{e}_2 = 0,$$

and the parameter adaptation law can be given by:

$$\dot{\hat{\theta}} = \Sigma^{-1} \gamma^T(t,\hat{x}) \eta C e_1.$$

Then, the inequality of Eq. (80) becomes:

$$\dot{V}(t) \leq e_1^T [\Omega + \epsilon_1^{-1} P^T P] e_1. \tag{81}$$

Therefore, a sufficient condition for $\dot{V}(t) < 0$ is:

$$\Omega + \epsilon_1^{-1} P^T P < 0. \tag{82}$$

The above inequality can be converted to an LMI, using Schur complement, as:

$$\begin{bmatrix} \Omega & P^T \\ P & -\epsilon_1 I \end{bmatrix} < 0.$$

For some $\beta > 0$ and from the inequality of Eq. (82), it follows that:

$$\Omega + \epsilon_1^{-1} P^T P < -\beta I. \tag{83}$$

Substituting Eq. (83) into Eq. (81) produces:

$$\dot{V}(t) \leq -\beta e_1^T e_1, \tag{84}$$

which implies that V(t) is bounded, since V(t)≥0 and Eq. (84) shows that V(t) is non-increasing. It follows from Eq. (79) that $e_1$ and $e_2$ are also bounded. Integrating both sides of Eq. (84) from t=0 to t=$t_1$ yields:

$$V(t_1) \leq V(0) - \beta \int_0^{t_1} e_1^T(\tau) e_1(\tau) d\tau. \tag{85}$$

From Eq. (85), $e_1 \in L_2$ can be obtained. In addition, the observer error dynamics of Eq. (75) implies that $\dot{e}_1 \in L_\infty$. Based on this and using Barbalat's lemma, it follows that $\lim_{t \to \infty} e_1 = 0$ and, as a result, $\lim_{t \to \infty} \dot{e}_1 = 0$. Therefore, from Eq. (75):

$$\lim_{t \to \infty} D(\gamma(t,x)\theta - \gamma(t,\hat{x})\hat{\theta}) = 0. \tag{86}$$

As $\lim_{t \to \infty} \hat{x} = x$, Eq. (86) reduces to:

$$\lim_{t \to \infty} D(\gamma(t,x)(\theta - \hat{\theta})) = 0. \tag{87}$$

Moreover, the parameter estimation error converges to zero, i.e., $\vec{\theta} \to \theta$ if the persistent excitation condition of Eq. (78) holds, which is a typical requirement in system identification.

Robustness to Noise.
Consider the noise corrupted descriptor system:

$$E\dot{x} = Ax + Bu + D\gamma(t,x)\theta + \psi(t,y,u) + w(t)$$

$$y = Cx + v(t) \tag{88}$$

where $w(t) \in \mathbb{R}^n$ is the system noise and $v(t) \in \mathbb{R}^r$ is measurement noise.

Theorem 2. If the noises in the system of Eq. (88) w(t) and v(t) are bounded, then the state and parameter estimation errors, $e_1(t)$ and $e_2(t)$ respectively, of the adaptive descriptor observer of Eq. (74) for the system of Eq. (88) are also bounded.
In addition, if the noises w(t) and v(t) have zero mean for all t and are independent of $\gamma(t,x)$, then as $\leftarrow \infty$, the mean of the state and parameter estimation error $\mathbb{E} e_1(t)$ and $\mathbb{E} e_2(t)$ converge asymptotically to zero.

Proof.
In this case, the observer error dynamics can be given by:

$$E\dot{e}_1 = (A - KC)e_1 + D(\gamma(t,x)\theta - \gamma(t,\hat{x})\hat{\theta}) + w(t) - Kv(t), \tag{89}$$

$$\dot{e}_2 = -\Sigma^{-1} \gamma^T(t,\hat{x}) \eta C e_1 - \Sigma^{-1} \gamma^T(t,\hat{x}) \eta v(t). \tag{90}$$

The homogeneous part of Eq. (89) is exponentially stable, thus the state estimation error $e_1(t)$ can be bounded for $\gamma(t,x)$ satisfying the local Lipschtiz condition of Eq. (73) and bounded noises w(t) and v(t). In the proof of Theorem 1 above, if was concluded that the asymptotic convergence of parameter estimation error $e_2(t)$ to zero in the noise free case. Therefore, for bounded noises the $e_2(t)$ is also bounded.

In addition, using the assumption that the noises w(t) and v(t) have zero mean for all time and are independent of y(t, x), then the expected value ($\mathbb{E}$) of the error dynamics for the noise corrupted case (5.35) and (5.36) can be taken as:

$$E \frac{d(\mathbb{E} e_1)}{dt} = (A - DC)\mathbb{E} e_1 + D(\gamma(t,x)\theta - \gamma(t,\hat{x})\hat{\theta}), \tag{91}$$

$$\frac{d(\mathbb{E} e_2)}{dt} = -\Sigma^{-1} \gamma^T(t,\hat{x}) \eta C \mathbb{E} e_1, \tag{92}$$

where the order of differentiation and expectation operations have been interchanged. Notice that the dynamics of $\mathbb{E}(e_1)$ and $\mathbb{E}(e_2)$, of Eq. (91) and Eq. (92) respectively, are similar to the noise free case. Therefore, the state and parameter estimation errors converge to zero asymptotically in the mean sense.

The adaptive observer design is demonstrated through the following example. Consider the system of Eq. (72) with:

$$E = \begin{bmatrix} 0 & 1 & 0 & 0 \\ 0 & 0 & 1 & 0 \\ 0 & 0 & 0 & 1 \\ 0 & 0 & 0 & 0 \end{bmatrix}, A = \begin{bmatrix} 0 & -4 & 0 & 3 \\ 1 & 2 & -4 & 0 \\ 0 & 2 & 0 & -5 \\ -2 & 0 & 3 & 0 \end{bmatrix}$$

$$B = \begin{bmatrix} -1 & 0 \\ 0 & 0 \\ 0 & 0 \\ 0 & 1 \end{bmatrix}, D = \begin{bmatrix} -1 & 0 \\ -1 & 0 \\ 0 & 0 \\ 0 & 1 \end{bmatrix}, C = \begin{bmatrix} 1 & 0 & 0 & 0 \\ 0 & 1 & 0 & 0 \end{bmatrix}$$

$$\gamma = \begin{bmatrix} \sin^2(0.125t) & x_1^2 + \sqrt[3]{x_4} \\ x_3^3 + x_2 & \cos^2(0.125t) \end{bmatrix}$$

Setting the design parameters $\alpha_1 = 1$ and $\alpha_2 = 4$ and using the YALMIP toolbox to solve the LMI sufficient conditions of Eq. (76) and Eq. (77), the following results can be obtained:

$$K = \begin{bmatrix} -8.808 & 6.250 \\ 1.782 & 2.788 \\ 1.267 & 1.650 \\ 7.648 & 0 \end{bmatrix}, \eta = \begin{bmatrix} 0 & -0.05937 \\ 0.05791 & 0.05845 \end{bmatrix}$$

The initial states of the system are:

$$x(0) = [-1.6624 \; 0.8 \; 2.8 \; 0.2]^T, \hat{x}(0) = [-1.5017 \; 1.0 \; 2.25 \; 0.5]^T,$$

and the initial state of the adaptive observer is:

$$\hat{\theta}(0) = [0.4 \; -3.5]^T.$$

The adaptation rate was chosen as $\Sigma^{-1}=\text{diag}([50,30])$. For this simulation, the true values of the parameters $\theta_1$ and $\theta_7$ switch from 0.1 to 0.3 and from −4 to −2, respectively, at t=40 and back again at t=60.

Figure 28A:
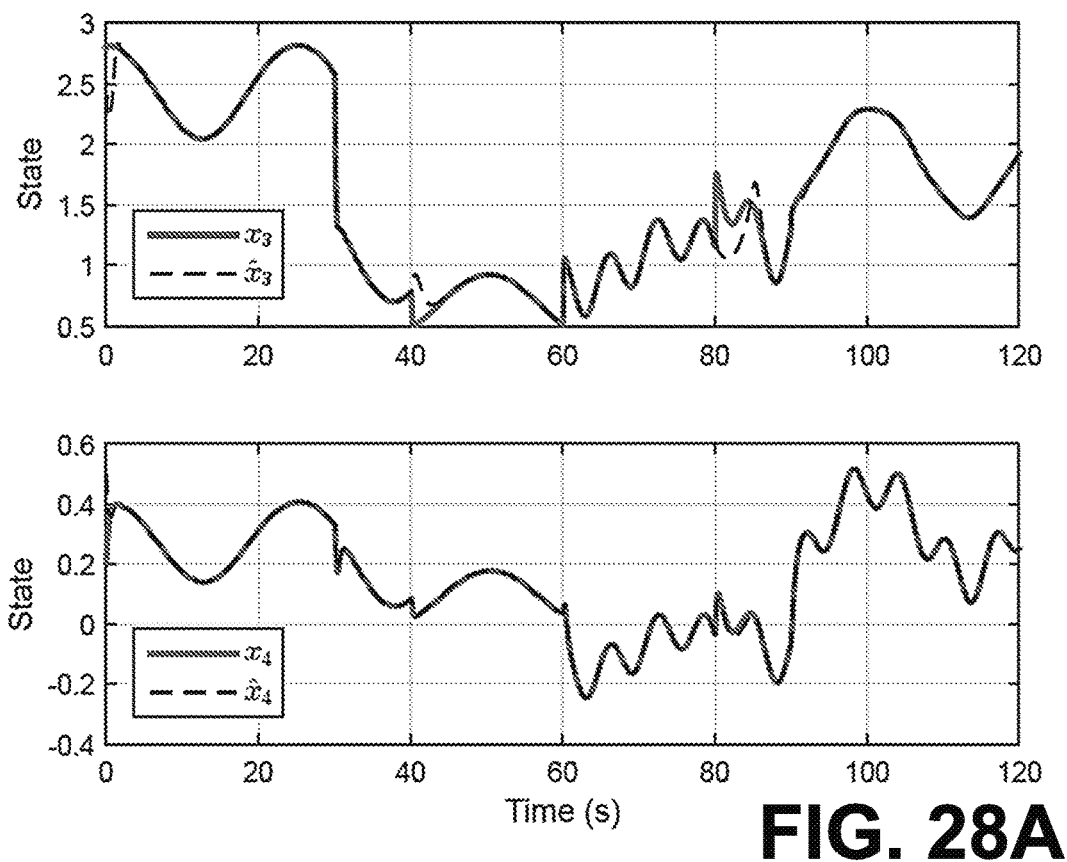
FIGS. 28A-28E illustrate simulation results of a descriptor adaptive observer in accordance with various embodiments of the present disclosure.
Figure 28B:
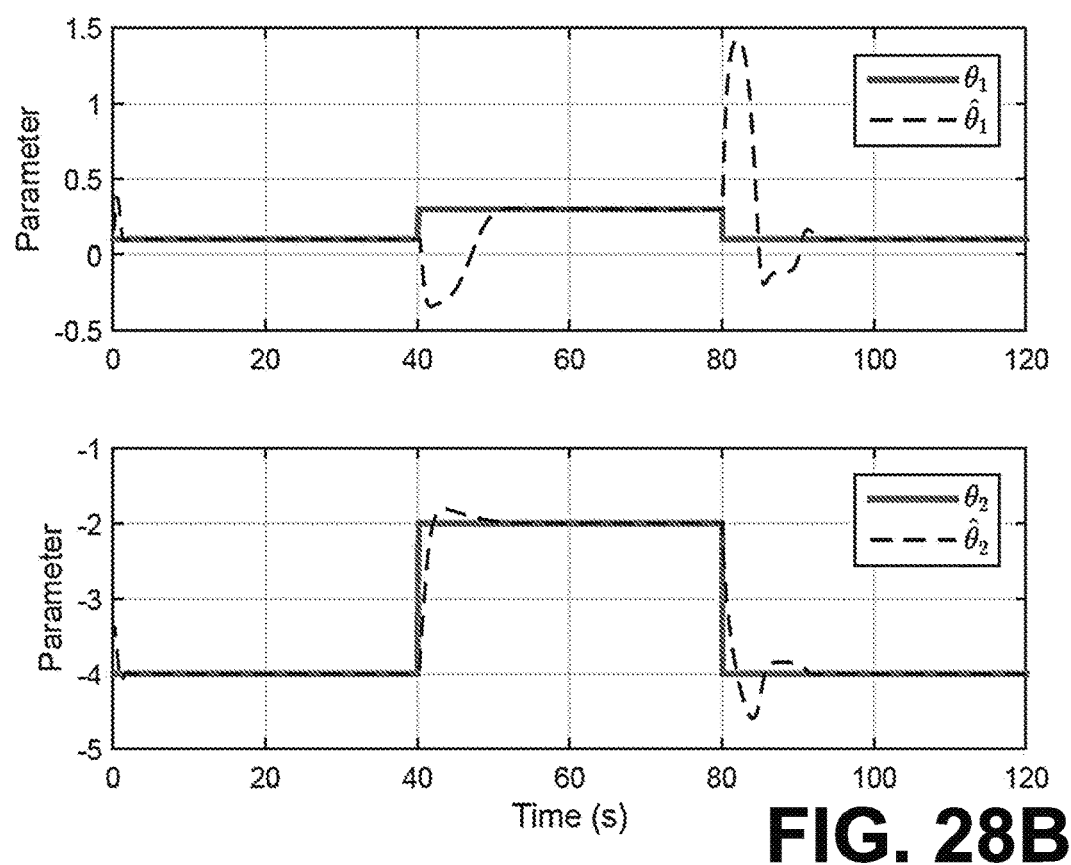

The state and parameters estimation results for the noise-free systems are shown in FIGS. 28A and 28B, respectively. FIG. 28A illustrates examples of the observer response showing the two immeasurable states for the noise free system, with $x_3$ and $\hat{x}_3$ plotted in the top graph and with $x_4$ and $\hat{x}_4$ plotted in the bottom graph. FIG. 28B illustrates examples of the estimates of the unknown parameters, with $\theta_1$ and $\hat{\theta}_1$ plotted in the top graph and $\theta_2$ and $\hat{\theta}_2$ plotted in the bottom graph.

Figure 28C:
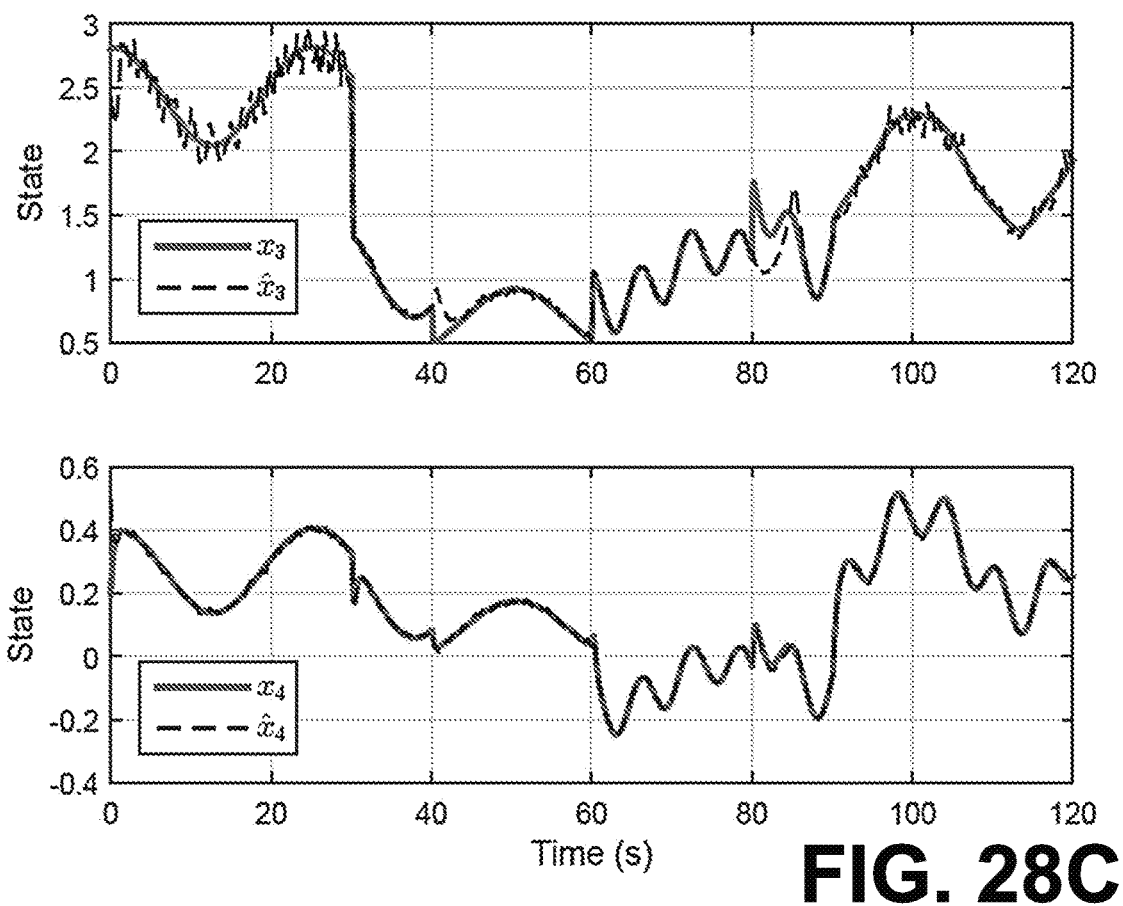
Figure 28D:
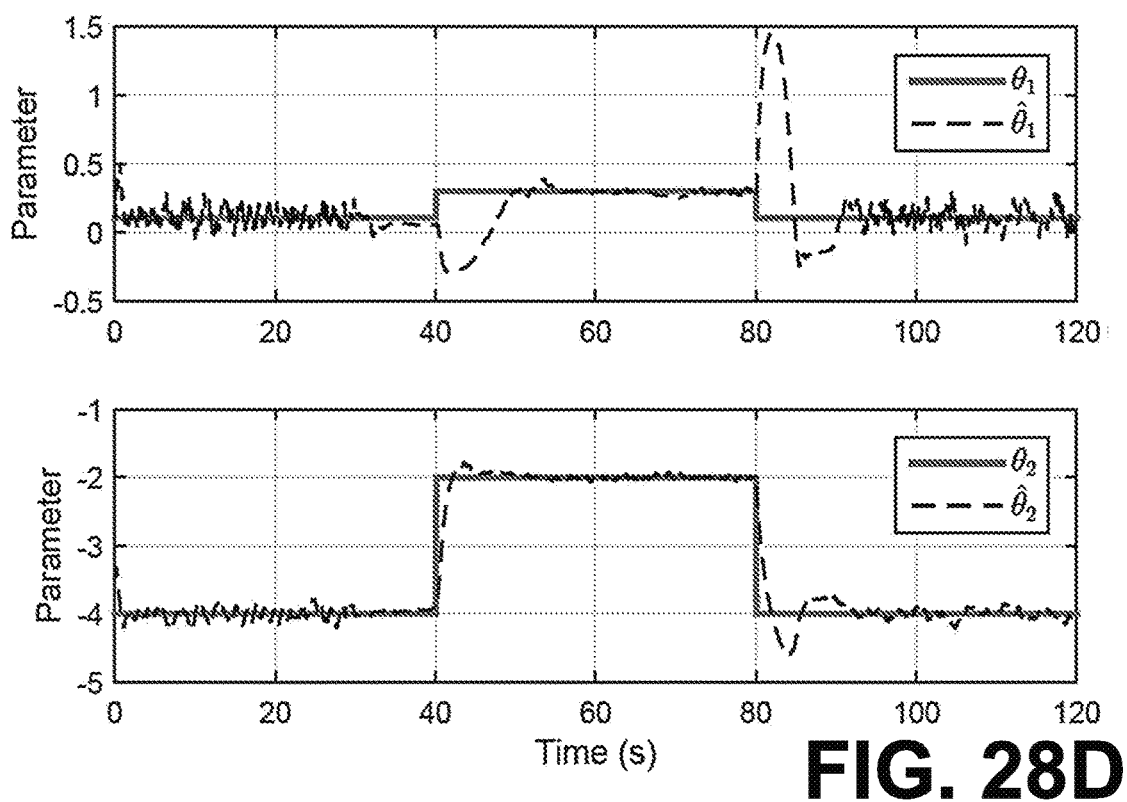

In addition, Gaussian noise with standard deviation of 0.05 was added to the outputs of the system y(t). Examples of the response of the system unknown states and their estimates are shown in FIG. 28C. The observer response illustrates the two immeasurable states for the noise corrupted system, with $x_3$ and $\hat{x}_3$ plotted in the top graph and with $x_4$ and $\hat{x}_4$ plotted in the bottom graph. Examples of the estimates of two unknown parameters are depicted in FIG. 28D. The estimates of the unknown parameters are illustrated, with $\theta_1$ and $\hat{\theta}_1$ plotted in the top graph and $\theta_2$ and $\hat{\theta}_2$ plotted in the bottom graph.

Figure 28E:
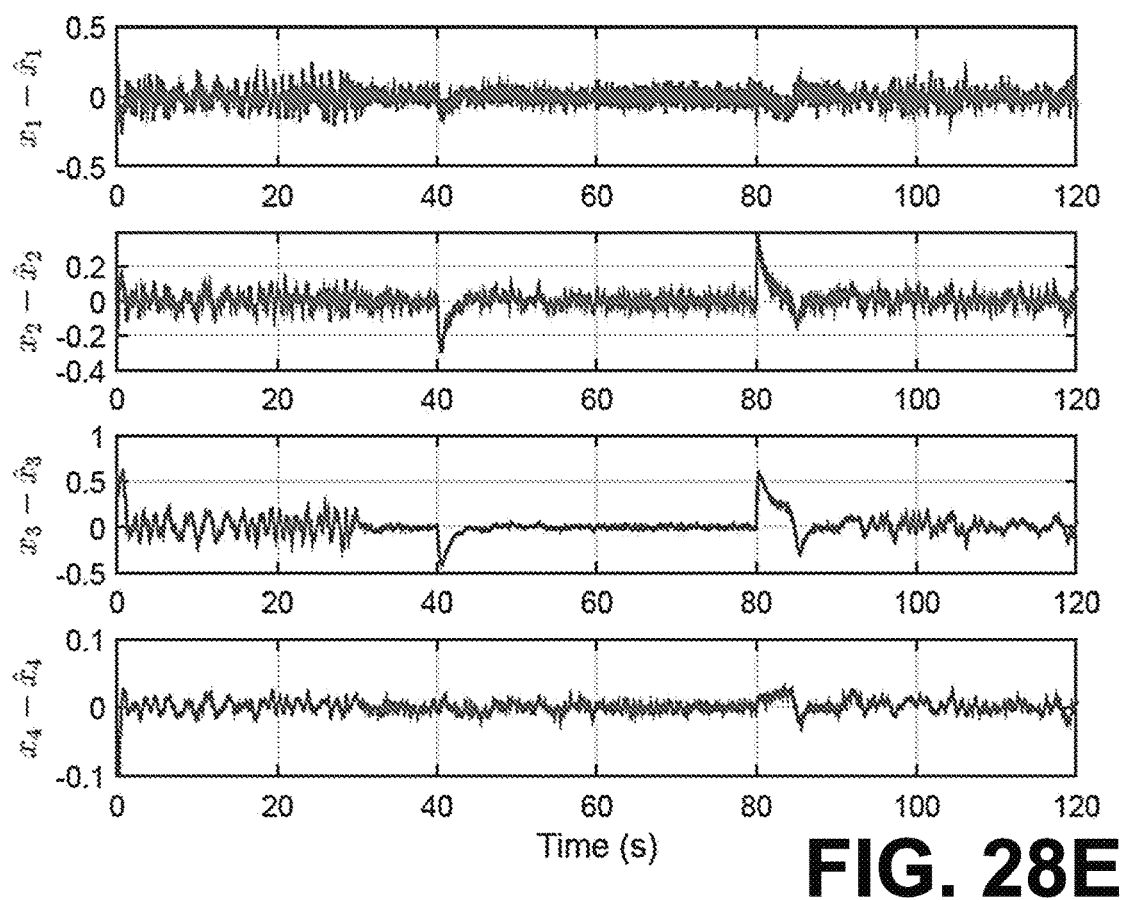

It can be observed that the estimates of the states and parameters are robust to abrupt changes to the system input signals. The estimate of the parameters reconverges to the new value in about 10 s. After each parameter change, the state estimation error $e_1(t)$ converges to zero, in the mean sense, faster than the parameter error $e_2(t)$. FIG. 28E illustrates examples of the state estimation error for the noise corrupted case.

The convergence of the descriptor adaptive observer was obtained by solving a set of sufficient linear matrix inequalities. The robustness under the noise corrupted system and measurements was established. For zero mean noises, the estimation errors of the states and parameters converge, in the mean, to zero. The performance of the method was demonstrated through a numerical example. This method can be used to systematically design adaptive observers for systems with a large number of states, which can be useful for fault detection and adaptive control applications.

Membrane Fouling Detection in DCMD

Figure 29A:
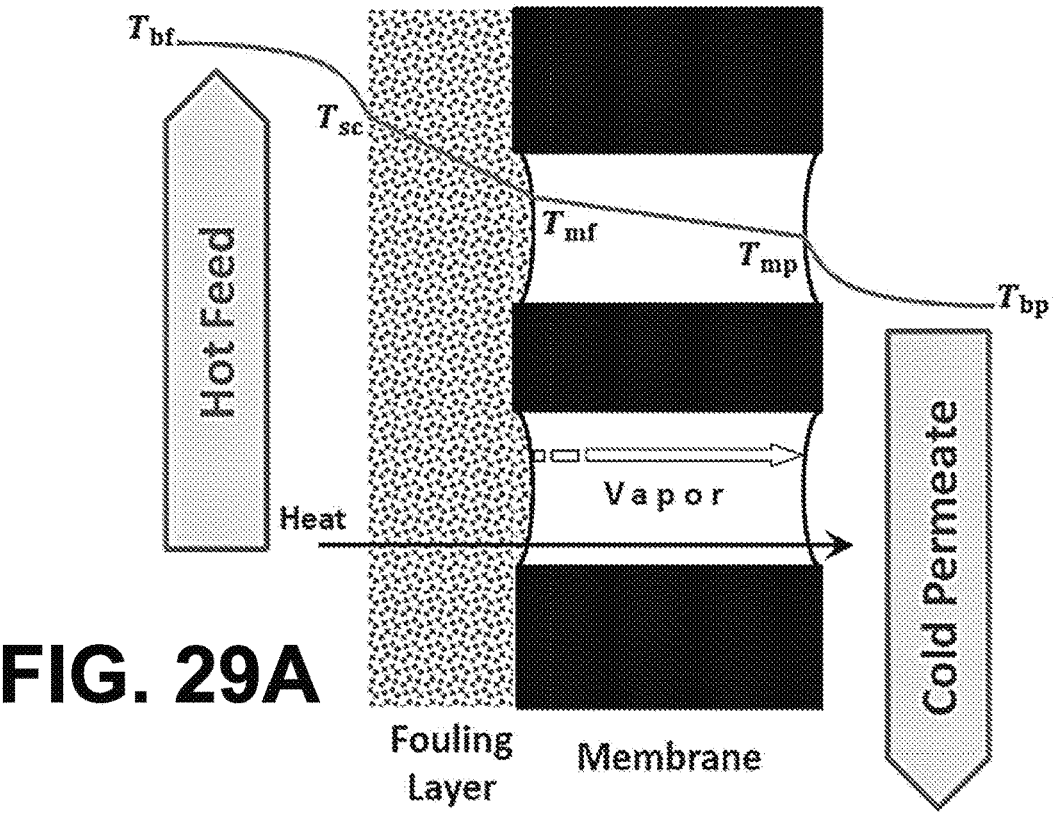
FIGS. 29A and 29B are schematic diagrams illustrating membrane fouling and an electrical thermal analogue network modeling the membrane fouling in accordance with various embodiments of the present disclosure.

Like many membrane-based desalination processes, MD is prone to membrane fouling and scaling, which is a process of accumulated deposition of clay, salt, organic and/or biological materials onto the membrane surface or into the membrane pores. Membrane fouling affects the water quality and reduces the production rate and may even cause system shutdown for cleaning, which in turn, increases the operational cost of the MD system. In MD, the fouling layer deposited on the surface of the membrane introduces a thermal resistance to heat transfer between the bulk feed stream and the membrane surface. This can result in a lower temperature at the feed-membrane interface and hence a lower partial vapor pressure, which ultimately reduces the production rate of the system. FIG. 29A is a schematic diagram illustrating an example of the fouling layer is DCMD setups.

Several methods have been proposed for detecting membrane fouling in various membrane-based processes. Because incorporating sensors into the process can be challenging and expensive, using mathematical tools and readily available measurements to detect fouling is ideal for this application. Observers can be applied for fault detection and isolation (FDI). A general class of models are descriptor systems (known also as differential algebraic systems, DAE, or singular systems), which appear naturally when modeling electrical networks, constrained mechanical systems, and interconnected processes. Observers for linear descriptor systems can be designed using a system of ODE, which asymptotically converges to the true states by eigenvalue assignment. This approach can be extended for fault estimation for linear descriptor systems with unknown inputs and linear parameter varying systems. For Lipschitz nonlinear descriptor systems, a stabilizing gain for a Luenberger-like observer can be designed by solving a set of linear matrix inequalities (LMI).

The descriptor model for direct contact membrane distillation (DCMD) of FIG. 17 can be extended to account for membrane fouling. An adaptive observer can be used for the detection of membrane fouling. The disclosed method does not require coordinate transformation. In addition, the adaptive observer gain design can be facilitated by solving a set of LMI, which guarantees sufficient conditions for asymptotic convergence of the states and parameter estimations to their true values.

Membrane Fouling Modeling.

Figure 29B:
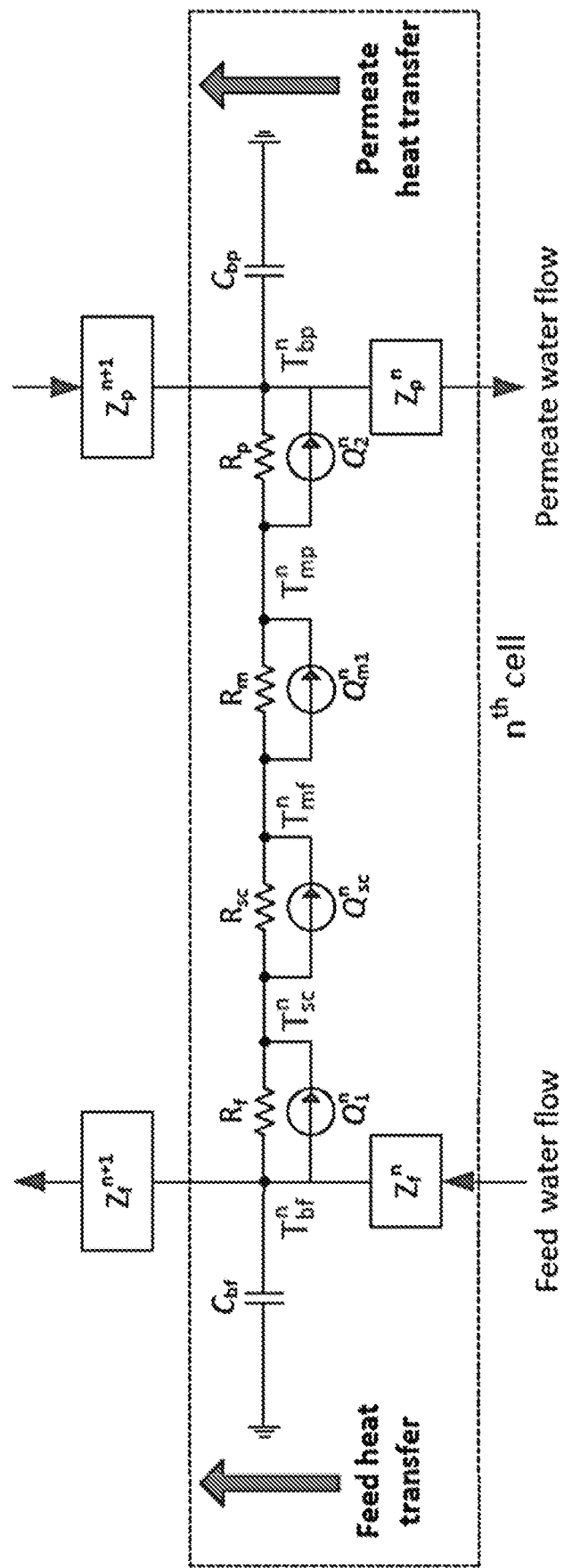

In MD, the fouling layer deposited on the surface of the membrane introduces a thermal resistance to heat transfer between the bulk feed stream and the membrane surface, as shown in FIG. 29A. This results in a lower temperature at the feed-membrane interface and hence a lower partial vapor pressure, which ultimately reduces the production rate of the system. The fouling thermal resistance ($R_{sc}$) can be incorporated into the model of FIG. 17. FIG. 29B shows an example of the electrical analogue of the nth cell of the DCMD module including the thermal resistance of the membrane fouling layer. Rewriting the heat transfer equations to account for the fouling resistance gives:

$$\frac{dT_{bf_n}}{dt} = \frac{1}{C_{bf}}Q_{f_n} - \frac{1}{C_{bf}}\left(\frac{1}{R_f} + J_n A_m c_p\right)T_{bf_n} + \quad (93)$$
$$\frac{1}{C_{bf}}\left(\frac{R_{sc}(1+R_f G_n c_p)}{R_f + R_{sc}(1+R_f G_n c_p)}\right)T_{bf_n} -$$
$$\frac{1}{C_{bf}}Q_{f_{n+1}} + \frac{1}{C_{bf}(R_f + R_{sc}(1+R_f G_n c_p))}T_{mf_n},$$

$$\left(\frac{1}{R_f} + J_n A_m c_p + \frac{R_{sc}(1+R_f G_n c_p)}{R_f + R_{sc}(1+R_f G_n c_p)}\right)T_{bg_n} - \quad (94)$$
$$\frac{1}{(R_f + R_{sc}(1+R_f G_n c_p))}T_{mf_n} = \left(\frac{1}{R_p} + J_n A_m c_p\right)T_{mp_n} - \frac{1}{R_p}T_{bp_u}.$$

The model can now be represented as:

$$E\dot{x} = Ax + Bu + D\gamma(t,x)B_m + H(x, R_{sc}), \quad (95)$$
$$y = \begin{bmatrix} Cx \\ G \end{bmatrix},$$

where $H(x, R_{sc})$ is a nonlinear function of the state x and the fouling thermal resistance $R_{sc}$.

Membrane Fouling Detection.

Expanding the function $H(x, R_{sc})$ around $R_{sc}=0$ and taking the linear terms, the system of Eq. (95) can be written as:

$$E\dot{\hat{x}} = A\hat{x} + Bu + D_1\gamma(t,\hat{x})B_m + D_2\tilde{H}(x)\Delta\hat{R}_{sc}, \quad (96)$$
$$\hat{y} = \begin{bmatrix} C\hat{x} \\ \hat{G} \end{bmatrix},$$

where $\Delta R_{sc}$ is the deviation from the nominal value of zero fouling thermal resistance. Consider the following adaptive observer form for the system of Eq. (96):

$$E\dot{\hat{x}} = A\hat{x} + Bu + D_1\gamma(t,\hat{x})B_m + D_2\tilde{H}(\hat{x})\Delta\hat{R}_{sc} + K(Cx - C\hat{x}), \quad (97)$$

$$\hat{y} = \begin{bmatrix} C\hat{x} \\ \hat{G} \end{bmatrix}$$

Define the state estimation by $e_1 = x - \hat{x}$, then from Eq. (96) and Eq. (74), the observer error dynamics can be given by:

$$E\dot{e}_1 = (A - KC)e_1 + D(\gamma(t,x)\theta - \gamma(t,\hat{x})\hat{\theta}). \quad (98)$$

The following theorem gives sufficient conditions for convergence of the adaptive observer error dynamics.

Theorem 3. Consider the following adaptation law:

$$\dot{\hat{R}} = \Sigma^{-1}\tilde{H}(\hat{x})\eta C(x-\hat{x}) + \Sigma^{-1}L(G-\hat{G}) \quad (99)$$

where $\Sigma^{-1} = \Sigma^{-T} > 0$ is an arbitrary constant matrix of appropriate dimension, which can be thought of as the adaptation rate. Then the system of Eq. (97) is an asymptotically stable adaptive observer for the system of Eq. (96), if there exists a non-singular matrix $P \in \mathbb{R}^{n \times n}$, a matrix $W \in \mathbb{R}^{r \times n}$ such that $K = (WP^{-1})^T$, and a scalar $\epsilon_1 > 0$ for which the following matrix inequalities are solvable:

$$E^T P = P^T E \geq 0,$$

$$\begin{bmatrix} \Omega & P^T \\ P & -\epsilon_1 I \end{bmatrix} < 0,$$

where $\Omega = A^T P + P^T A - C^T W - W^T C + \epsilon_1 \alpha_1^2 \alpha_2^2 \|D_2\|^2 I$.

Moreover, if the persistent excitation condition holds $\forall t_0$, $\exists \xi, \delta > 0$ such that:

$$\int_{t_0}^{t_0+\delta} D_2\tilde{H}(\hat{x})^T D_2^T d\tau > \xi I, \quad (100)$$

then the parameter estimation error converges to zero, i.e $\Delta\hat{R}_{sc} \to \Delta R_{sc}$ as $t \to \infty$.

Proof.

If the system of Eq. (75) is shown to be asymptotically stable, then it follows that the system of Eq. (74) is a full-order adaptive observer for the system of Eq. (96). Let $\overline{A} = (A - KC)$ and define the Lyapunov candidate function for error dynamics as:

$$V(t) = e_1^T E^T P e_1 + e_2^T \Sigma e_2, \quad (101)$$

where $e_2 \theta - \hat{\theta}$ is the parameter estimation error. The derivative of $V(t)$ can be given as:

$$\dot{V}(t) = (E\dot{e}_1)^T P e_1 + e_1^T P^T E\dot{e}_1 + 2e_2^T \Sigma \dot{e}_2,$$

$$= \left[\overline{A}e_1 + D_2\tilde{H}(x)\Delta R_{sc} - D_2\tilde{H}(\hat{x})\Delta\hat{R}_{sc}\right]^T P e_1 +$$

$$e_1^T P^T \left[\overline{A}e_1 + D_2\tilde{H}(x)\Delta R_{sc} - D_2\tilde{H}(\hat{x})\Delta\hat{R}_{sc}\right]^T P e_1 +$$

$$2e_2^T \sum \dot{e}_2,$$

$$= e_1^T \left[\overline{A}^T P + P^T \overline{A}\right] e_1 +$$

$$2\left[D_2\tilde{H}(x)\Delta R_{sc} - D_2\tilde{H}(\hat{x})\Delta\hat{R}_{sc}\right]^T P e_1 + 2e_2^T \sum \dot{e}_2.$$

Substituting $\Delta\hat{R}_{sc} = \Delta R_{sc} - e_2$ in the second term gives:

$$\dot{V}(t) = e_1^T \left[\overline{A}^T P + P^T \overline{A}\right] e_1 +$$

$$2\left[D_2\tilde{H}(x)\Delta R_{sc} - D_2\tilde{H}(\hat{x})\Delta R_{sc}\right]^T P e_1 + 2\left[D_2\tilde{H}(\hat{x})e_2\right]^T P e_1 + 2e_2^T \sum \dot{e}_2$$

Applying Lemma 1 (from above) to the second term gives:

$$\dot{V}(t) \leq e_1^T \left[\overline{A}^T P + P^T \overline{A}\right] e_1 + \epsilon_1 \|D_2(\tilde{H}(x) - \tilde{H}(\hat{x}))\Delta R_{sc}\|^2 +$$

$$\epsilon_1^{-1} e_1^T P^T P e_1 + 2\left[D_2\tilde{H}(\hat{x})e_2\right]^T P e_1 + 2e_2^T \sum \dot{e}_2.$$

Using Eq. (73) on the second term gives:

$$\dot{V}(t) \leq e_1^T [\Omega + \epsilon_1^{-1} P^T P] e_1 + 2[D_2\tilde{H}(\hat{x})e_2]^T P e_1 + 2e_2^T \Sigma \dot{e}_2, \quad (102)$$

where $\Omega = \overline{A}^T P + P^T \overline{A} + \epsilon_1 \alpha_1^2 \alpha_2^2 \|D_2\|^2 I$.

Since $\Delta R_{sc}$ is piecewise constant, $\Delta\dot{R}_{sc} = 0$, thus $\dot{e}_2 = -\dot{\hat{R}}_{sc}$. Using the condition $D^T P = \eta C$ and substituting the adaptation law of Eq. (99), it is possible to obtain:

$$2[D_2\tilde{H}(\hat{x})e_2]^T P e_1 + 2e_2^T \Sigma \dot{e}_2 = -e_2^T L(G - \hat{G}),$$

where $L \in \mathbb{R}^-$ is a negative constant gain, then the term $-e_2^T L(G - \hat{G})$ is always non-positive as it can be shown:

$$\begin{cases} \text{if } e_2 < 0, \to (G - \hat{G}) > 0, \text{ therefore} - e_2^T L(G - \hat{G}) < 0 \\ \text{if } e_2 > 0, \to (G - \hat{G}) < 0, \text{ therefore} - e_2^T L(G - \hat{G}) < 0 \end{cases}$$

Then, the inequality of Eq. (102) becomes:

$$\dot{V}(t) \leq e_1^T [\Omega + \epsilon_1^{-1} P^T P] e_1. \quad (103)$$

Therefore, a sufficient condition for $\dot{V}(t) < 0$ is:

$$\Omega + \epsilon_1^{-1} P^T P < 0, \quad (104)$$

The above inequality can be converted to an LMI, using Schur complement, as:

$$\begin{bmatrix} \Omega & P^T \\ P & -\epsilon_1 I \end{bmatrix} < 0.$$

For some $\beta > 0$ and from the inequality of Eq. (104), it follows that:

$$\Omega + \epsilon_1^{-1} P^T P < -\beta I. \quad (105)$$

Substituting Eq. (105) into Eq. (103) produces:

$$\dot{V}(t) \leq -\beta e_1^T e_1, \quad (106)$$

which implies that $V(t)$ is bounded, since $V(t) \geq 0$ and Eq. (106) shows that $V(t)$ is non-increasing. It follows from Eq. (101) that $e_1$ and $e_2$ are also bounded. Integrating both sides of Eq. (106) from $t=0$ to $t=t_1$, yields:

$$V(t_1) \leq V(0) - \beta \int_0^{t_1} e_1^T(\tau) e_1(\tau) d\tau. \quad (107)$$

From Eq. (107), $e_1 \in L_2$ can be obtained. In addition, the observer error dynamics of Eq. (75) implies that $\dot{e}_1 \in L_\infty$. Based on this and using Barbalat's lemma, it follows that $\lim_{t \to \infty} e_1 = 0$ and, as a result, $\lim_{t \to \infty} \dot{e}_1 = 0$. Therefore, from Eq. (75):

$$\lim_{t \to \infty} D_2(\tilde{H}(x)\Delta R_{sc} - \tilde{H}(\hat{x}_-\Delta\hat{R}_{sc}) = 0. \quad (108)$$

As $\lim_{t \to \infty} \hat{x} = x$, Eq. (108) reduces to:

$$\lim_{t \to \infty} D_2(\tilde{H}(x)(\Delta R_{sc} - \Delta\hat{R}_{sc})) = 0. \quad (109)$$

Moreover, the parameter estimation error converges to zero, i.e., $\Delta \hat{R}_{sc} \to \Delta R_{sc}$ if the persistent excitation condition of Eq. (100) holds, which is a typical requirement in system identification.

Figure 30A:
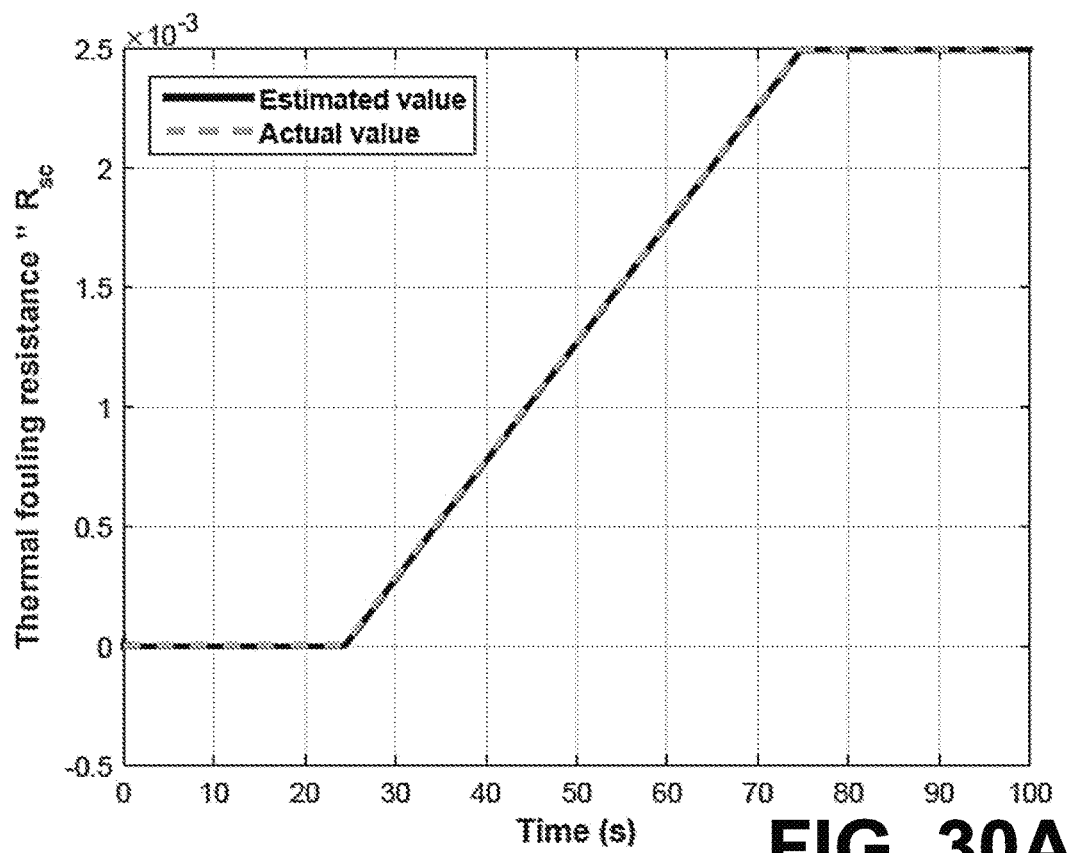
FIGS. 30A-30C illustrate simulation results of membrane fouling detection in accordance with various embodiments of the present disclosure.
Figure 30B:
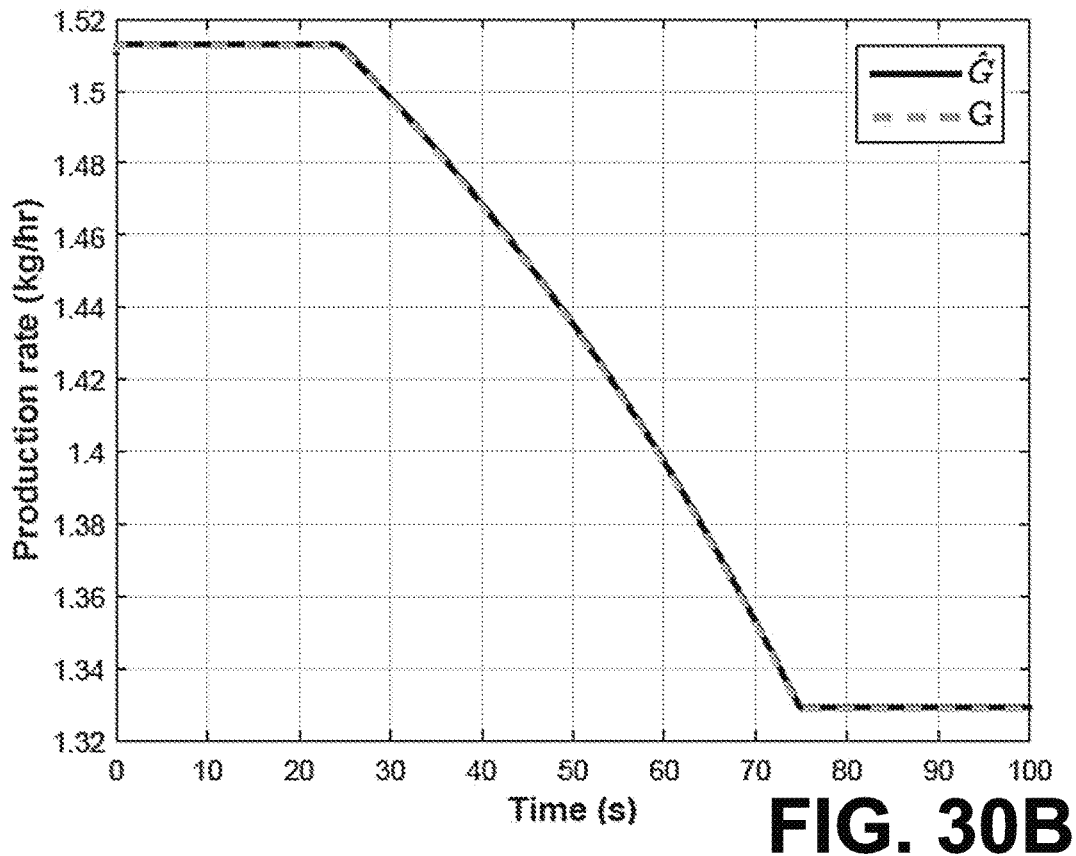
Figure 30C:
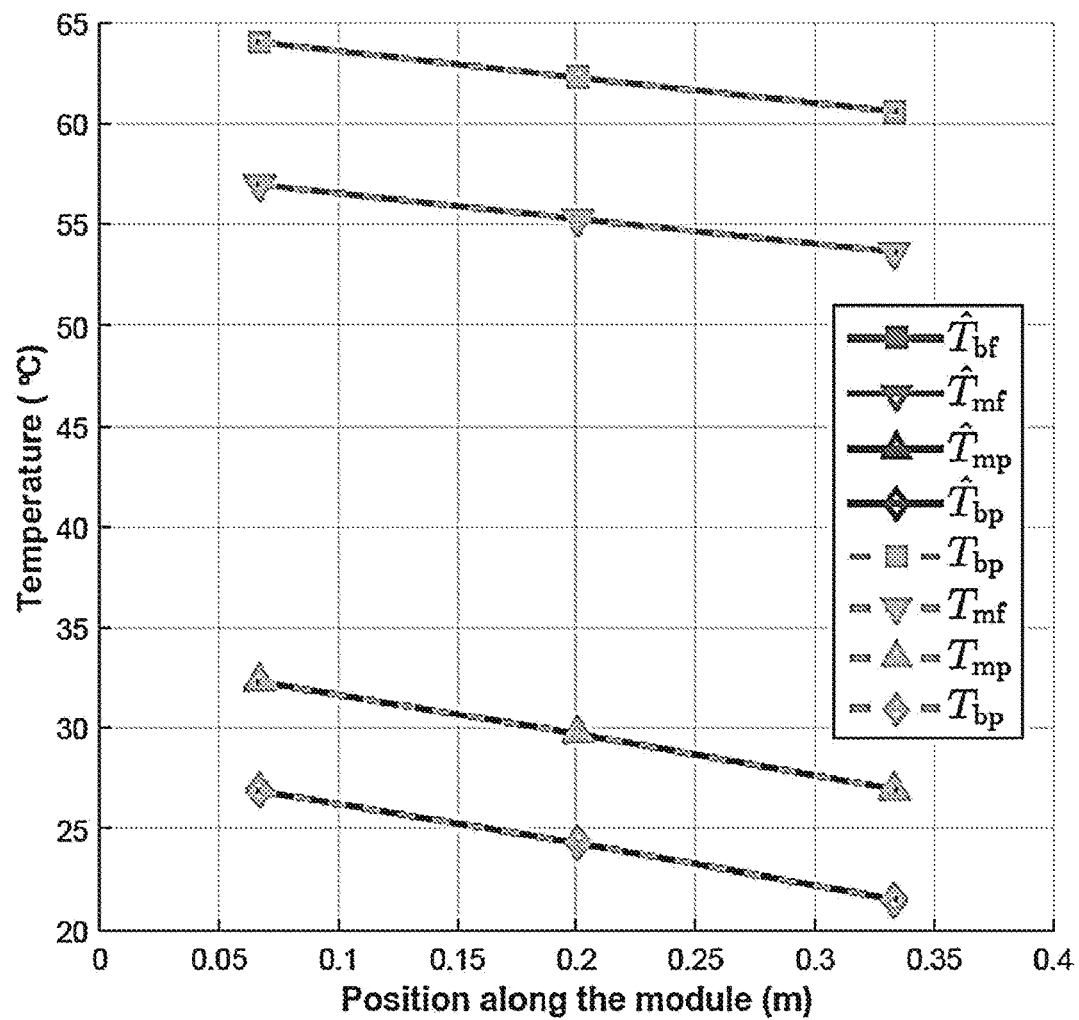

To demonstrate the performance of the disclosed adaptive observer, a simulation of gradual membrane fouling was developed. For the first 25 seconds, the fouling thermal resistance ($\Delta R_{sc}$) was set to zero. Then, a gradual increase took place over the duration of 50 seconds, until the fouling thermal resistance reached $2{:}5 \times 10^{-3}$ and stayed there for another 25 seconds. Referring to FIG. 30A, shown is an example of the actual and estimated profile of the thermal fouling resistance ($\Delta R_{sc}$). It is clear that the adaptive observer is able to track the membrane fouling as it develops. The estimated and actual profile of the modules production rate (G) over time is shown in FIG. 30B, where the effect of membrane fouling on the production rate is clear. To confirm the response of the temperature distribution estimation, FIG. 30C shows the temperature spatial profiles (distribution) through the DCMD module for both the estimated and actual simulated temperature spatial profiles for both the feed and permeate sides of the module at the final time t=100 s.

Nonlinear Observer-Based Lyapunov Control

With no loss of generality, consider a DCMD module, where an example of a counter current DCMD module is depicted in FIG. 1. In this module, the vapor generated in the feed solution is forced to pass through the membrane dry pores to the permeate side, following thermodynamics rules. Accordingly, the heat transfer is driven by the trans-membrane heat flux and the latent heat of evaporation. In this model, there are two inputs to the DCMD process which are the feed and the permeate inlet temperatures, and two measured outputs for the DCMD process which are the feed and the permeate outlet temperatures.

Mechanical Model.

The mathematical mode of the DCMD model can be given by the following 2D ADE:

$$\frac{\partial T(x,z,t)}{\partial t} + v_z^k \frac{\partial T(x,z,t)}{\partial z} = \alpha_x^k \frac{\partial^2 T(x,z,t)}{\partial x^2}, \quad (110)$$

with $k=\{f,p\}$, $0<t<\tau_{final}$, $x \in [0,x_{fm}] \cup [x_{pm},X]$, $0<z<Z$ where $k=\{f,p\}$ refers to the feed and the permeate, respectively. The terms and, $k=\{f,p\}$ are the feed and permeate feed pumps flow rates along the x and z coordinates, respectively. The initial conditions of the model are:

$$T(x,z,0) = T_{finitial}, T(x,z,0) = T_{pinitial}$$

where the associated boundary conditions with the dynamic model (e.g., feed solution) are set to be a Dirichlet condition for the inlet boundary of each subsystem, and Neumann conditions for the rest of the boundaries like Eqs. (10)-(17), $$T(x, 0, t) = T_{0_f} \text{ for } x \in [0, x_{fm}],$$

$$T(x, Z, t) = T_{0_p} \text{ for } x \in [x_{pm}, X],$$

$$\frac{\partial T(x,z,t)}{\partial x}\bigg|_{x=0} = 0, \frac{\partial T(x,z,t)}{\partial x}\bigg|_{x=X} = 0,$$

$$\frac{\partial T(x,z,t)}{\partial x}\bigg|_{x=x_{fm}} = \left[J(T)H(T) + \frac{k_m}{\delta_m}(T(x_{pm},z,t) - T(x_{pm},z,t))\right]/k_f,$$

$$\frac{\partial T(x,z,t)}{\partial x}\bigg|_{x=x_{pm}} = \left[J(T)H(T) + \frac{k_m}{\delta_m}(T(x_{fm},z,t) - T(x_{pm},z,t))\right]/k_p,$$

$$\frac{\partial T(x,z,t)}{\partial z}\bigg|_{z=Z} = \phi, \frac{\partial T(x,z,t)}{\partial z}\bigg|_{z=0} = \phi,$$

where $k_m$ is the average thermal conductivity of the membrane, $\delta_m$ is the membrane thickness, $\phi \in \mathbb{R}^+$ is a positive constant to represent the amount of flux that is released outside the process containers, and H(T) is the latent heat of evaporation that is responsible of the released sensible heat as given by Eq. (18). J(T) is the permeate mass flux to be transferred between the feed and the permeate solutions in the process based on Knudsen diffusion model for the mass transfer coefficient as given by Eq. (2). $\Delta P(T) = P_1(T) - P_0(T)$ is the vapor pressure gradient between the membrane sides. It is a function of the vapor temperature based on the Antoine equation.

Semi-Discretized Model.

The ADE model is semi-discretized (space only) using finite difference discretization scheme. Particularly, the convective and diffusive terms are solved with first-order upwind scheme, and central difference scheme, respectively. The upwind scheme warrants the stability and ensures the solution to satisfy the entropy condition, while the central difference scheme is suitable for second derivative diffusive term. The semi-discretization transforms the infinite dimensional partial differential equations model into a finite dimensional group of ordinary differential equations. It provides good model approximation by refining the mesh grid, and tuning the spatial step sizes. Furthermore, standard control strategies that are applicable for state space representations, can be extended to such systems. The relations between the mesh points in the process designated domain are significant to solve the model. These relations are shown in FIG. 2, where the discretization starts in a row-wise manner providing a solution for the feed then the permeate.

The semi-discrete version of the continuous 2D ADE model is a nonlinear high dimension system of ODEs because of the nonlinearity of the boundary conditions. The discrete 2D ADE model can be expressed as:

$$\begin{cases} \dot{T}(t) = AT(t) + Bu(T) + f(T(t)), \\ y(t) = CT(t), \\ T(0) = T_0. \end{cases} \quad (111)$$

where $T \in \mathbb{R}^{2n^2 \times 1}$ is the state vector, which represents the time evolution of the temperature distribution at each grid point inside the feed and the permeate designated domain $T_f, T_p$, respectively.

$$T = \begin{bmatrix} T_f \\ T_p \end{bmatrix}, \quad (112)$$

where $T_f, T_p \in \mathbb{R}^{n^2 \times 1}$ and n is the number of discretization points in x and z axes, and $T_0$ is the initial condition of the state vector. Matrix $A \in \mathbb{R}^{2n^2 \times 2n^2}$ represents the dynamics matrix which includes all dynamics of the feed and the permeate with their correspondent couplings on the boundaries, as in the following:

$$A = \begin{bmatrix} A_{f_{i,j}} & C_{jp} \\ C_{pf} & A_{p_{i,j}} \end{bmatrix}, \quad (113)$$

where i, j are the discretization grid indices.

$$\begin{cases} A_{f_{i,j}}(u_f) = \left(-\frac{u_f}{\Delta z} - \frac{2\alpha_x^f}{\Delta x^2}\right)T_{i,j} + \left(\frac{u_f}{\Delta z}\right)T_{i,j-1} + \\ \qquad\qquad \left(\frac{\alpha_x^f}{\Delta x^2}\right)T_{i-1,j} + \left(\frac{\alpha_x^f}{\Delta x^2}\right)T_{i+1,j}, \\ A_{p_{i,j}}(u_p) = \left(\frac{u_p}{\Delta z} - \frac{2\alpha_x^p}{\Delta x^2}\right)T_{i,j} - \left(\frac{u_p}{\Delta z}\right)T_{i,j+1} + \\ \qquad\qquad \left(\frac{\alpha_x^p}{\Delta x^2}\right)T_{i-1,j} + \left(\frac{\alpha_x^p}{\Delta x^2}\right)T_{i+1,j}, \\ C_{fp} = \frac{\alpha_z}{\Delta x^2} \frac{\Delta x k_m}{\delta_m k_f}, \\ C_{pf} = \frac{\alpha_x}{\Delta x^2} \frac{\Delta x k_m}{\delta_m k_p}. \end{cases} \quad (114)$$

$$B = \begin{bmatrix} \left(\frac{v_z^f}{\Delta z}\right)_1 & 0 \\ \vdots & \vdots \\ \left(\frac{v_z^f}{\Delta z}\right)_n & 0 \\ 0 & 0 \\ \vdots & \vdots \\ 0 & 0 \\ 0 & \left(-\frac{v_z^p}{\Delta z}\right)_1 \\ \vdots & \vdots \\ 0 & \left(-\frac{v_z^p}{\Delta z}\right)_n \end{bmatrix}, \quad u(t) = \begin{bmatrix} T_{0_f} \\ T_{0_p} \end{bmatrix}, \quad (115)$$

where B is the input matrix and u(t) includes the inputs of the DCMD process. $f(T) \in \mathbb{R}^{2n^2 \times 1}$ contains the different boundary conditions of the feed and the permeate, especially the ones associated with the membrane boundaries. Some of the boundary conditions can be nonlinear and functions of the state vector T as shown in Eqs. (10)-(17). Vectors ç and η in the following equations represent the polynomial nonlinearity structure in f(T).

$$f(T) = [\zeta_1 \cdots \zeta_n \eta_1 \cdots \eta_n]^{tr}, \quad (116)$$

$$\zeta = \left[0 \cdots 0 \; \frac{\alpha_x^k}{\Delta x} \frac{\mathcal{J}(T)H(T)}{k_f}\right]^{tr}, \quad (117)$$

$$\eta = \left[-\frac{\alpha_x^k}{\Delta x} \frac{\mathcal{J}(T)H(T)}{k_p} \; 0 \cdots 0\right]^{tr}, \quad (118)$$

where tr refers to the transpose and $\mathcal{J}(T)$ is the permeate mass flux to be transferred between the feed and the permeate solutions in the process. The two measured outlet temperatures in the output vector are:

$$y = \begin{bmatrix} T_{fout} \\ T_{pout} \end{bmatrix}, \quad (119)$$

where $y \in \mathbb{R}^{2 \times 1}$ and the output matrix is:

$$C = \begin{bmatrix} \overset{n^2}{\overline{0 \cdots 0}} & \overset{n-1}{\overline{10 \cdots 0}} & \overset{n(n-1)+1}{\overline{00 \cdots 0}} \\ 0 \cdots \cdots 0 & 0 \cdots \cdots 0 & 10 \cdots 0 \end{bmatrix}. \quad (120)$$

where $C \in \mathbb{R}^{2 \times 2n^2}$. The boundary condition vector f(T) has some properties, such as being nonlinear, continuous, smooth, bounded and Lipschitz bounded.

Nonlinearity Analysis.

The DCMD dynamic model is nonlinear, and the source of the nonlinearity results from the nature of the functions $\mathcal{J}(T)$, H(T) and their multiplication in the boundary conditions. However, the present nonlinearity is Lipschitz continuous. This result can be proved by showing that each of H(T) and $\mathcal{J}(T)$ is separately Lipschitz continuous, and then their multiplication is going to be directly Lipschitz continuous. For H(T), because it is a polynomial function that is smooth and infinitely differentiable, it is Lipschitz continuous. Then, all the constants can be collected in the expression of $\mathcal{J}(T)$ and can be written in a simplified form as:

$$\mathcal{J}(T) = c_1 \left(\frac{1}{T}\right)^{\left(\frac{1}{2}\right)} 10^{\left(\frac{-c_2}{T}\right)}, \quad (121)$$

where $c_1, c_2$ are constants, and $T \in [a,b]$, $b > a > 0$. Therefore, $\mathcal{J}(r)$ is continuous and differentiable on this interval [a,b], and therefore it is bounded:

$$\|\mathcal{J}(T)\| \leq Y, \quad (122)$$

where Y is a real number. As a result, there exists a Lipshitz constant λ that satisfies:

$$\|f(T_1) - f(T_2)\| \leq \lambda \|T_1 - T_2\|. \quad (123)$$

The boundedness of f(T) can be explained by the physical aspects and properties or the process.

Controller Design.

Nonlinear processes are challenging in stability and control, due to the high sensitivity to initial and forcing conditions. The operation of heat transfer, inside the MD module, is nonlinear and needs a sufficient temperature difference along the membrane boundaries to operate efficiently. Controlling this temperature difference to manage the water production inside the DCMD process will now be discussed.

State Transformation.

The structure of the DCMD process model in Eq. (111) is high dimensional order, and would result in many of its properties being mesh size dependent. For example, a 10×10 discretization mesh would generate more temperature states than a 5×5 mesh, and accordingly the model may not be controllable and observable for higher mesh sizes such as 18×18 mesh. In this disclosure, only the affecting states for control, such as the states of the membrane boundaries, are considered because of their significant role in driving the process.

In this context, the controllability and the observability of the states on the membrane boundaries can be examined. This would reduce the number of involved states hugely, so the following change of variables can be used:

$$\tilde{T} = \mathcal{H} T, \quad (124)$$

where $\tilde{T} \in \mathbb{R}^{n \times 1}$ is the temperature difference vector along the membrane boundaries, and can be defined as follows:

$$\tilde{T} = [\tilde{T}_1 \ldots \tilde{T}_n]^{tr}. \quad (125)$$

$\mathcal{H} \in \mathbb{R}^{n \times 2n^2}$ is a non-square transformation matrix that form the difference of each correspondent boundaries, such as in:

$$\mathcal{H} = \begin{bmatrix} 0 & \cdots & 1 & 0 & \cdots & 0 & -1 & \cdots & 0 & \cdots & \cdots & \cdots \\ 0 & \cdots & \cdots & \cdots & 1 & 0 & \cdots & \cdots & -1 & 0 & \cdots & \cdots \\ 0 & \cdots & \cdots & \cdots & \ddots & 0 & 1 & 0 & \ddots & 0 & -1 & 0 & \cdots \end{bmatrix}. \quad (126)$$

Consider the pseudo inverse $\mathcal{H}^{pseudo} = (\mathcal{H}^T \cdot \mathcal{H})^{-1} \mathcal{H}^T$, which is the inverse matrix of the non-square transformation matrix $\mathcal{H}$. The dynamics of $\tilde{T}$ are:

$$\begin{cases} \dot{\tilde{T}} = \mathcal{H}\dot{T}, \\ = \mathcal{A}\tilde{T} + \mathcal{B}u + \mathcal{F}(T), \\ y = \mathcal{C}\tilde{T}. \end{cases} \quad (127)$$

where $\mathcal{A} = \mathcal{H} A \mathcal{H}^{pseudo} \in \mathbb{R}^{n \times n}$ represents the dynamic matrix of the membrane boundaries, and has the following structure:

$$\mathcal{A} = \begin{bmatrix} \mathcal{A}_1 \\ \mathcal{A}_2 \\ \vdots \\ \mathcal{A}_n \end{bmatrix}, \quad (128)$$

where $\mathcal{A}_i$, i=1, 2, ..., n are the rows of matrix $\mathcal{A}$, $\mathcal{B} = \mathcal{H} B \in \mathbb{R}^{n \times 2}$ is the new input matrix and has a structure such that:

$$\mathcal{B} = \begin{bmatrix} b_1 & 0 & \cdots & 0 \\ 0 & \cdots & 0 & b_2 \end{bmatrix}^{tr} \quad (129)$$

$\mathcal{F}(T) = \mathcal{H} f(T) \in \mathbb{R}^{n \times 1}$ is the nonlinear effect on the membrane boundaries with a structure of the following form:

$$\mathcal{F}(T) = [\mathcal{F}_1(T) \ldots \mathcal{F}_n(T)]^{tr}. \quad (130)$$

$\mathcal{C} = C \mathcal{H}^{pseudo} \in \mathbb{R}^{1 \times n}$ is the output matrix as defined earlier.

Accordingly, the structure of the DCMD process has been reduced, and therefore, it will be easier to examine and guarantee the controllability and the observability of the states on the membrane boundaries through the pairs ($\mathcal{A}, \mathcal{B}$) and ($\mathcal{A}, \mathcal{C}$), respectively. Numerical simulations will show that the controllability and the observability conditions for the DCMD process are satisfied.

Nonlinear Lyapunov Control Design.

The efficiency of the DCMD process appears clearly when the production rate of the clean water is maintained almost constant with relatively low energy consumption. In this regard, Lyapunov control design can be used to maintain the temperature difference along the membrane boundaries to be almost constant, and equal to a desired level. The control will be nonlinear due to the present nonlinearity in the process. Hereby, nonlinear Lyapunov control guarantees the boundedness of the trajectories, and therefore, convergence for the states. Additionally, the control inputs should be constrained to be within an acceptable ranges for energy consumption considerations.

Satisfying such criteria and for practical purposes, we define the inlet temperatures for the feed and the permeate to be bounded with minimum and maximum temperature values equal to 20° C. and 60° C., respectively.

$$0 < U_{min} = 20° C. < u(t) < U_{max} = 60° C., \forall t > 0. \quad (131)$$

Following the reduced DCMD model in Eq. (127), Proposition 1 suggests a control law for the reference tracking error.

Proposition 1. Assume the temperature difference of the membrane boundaries obeys Eq. (127), then the following control law (u=[u$_1$ u$_2$]$^{tr}$):

$$\begin{cases} u_1 = \frac{1}{b_1}[-K_1(\tilde{T}_1 - y_r) - \mathcal{A}_1\tilde{T} - \mathcal{F}_1(T)] \\ u_2 = \frac{1}{b_{21}}[-K_2(\tilde{T}_n - y_r) - \mathcal{A}_n\tilde{T} - \mathcal{F}_n(T)] \end{cases}, \quad (132)$$

ensure the reference tracking, such that the temperature difference $\tilde{T}$ follows the reference $y_r$, where $K_1$ and $K_2$ are positive control gains.

Proof.

The proof is divided into two parts. First, the derivation of the control laws is shown, and second, the convergence of the temperature difference to the reference $y_r$ is proven. To begin, define the error function as follows:

$$e = \tilde{T} - y_r = [e_1 e_2 \ldots e_n]^{tr}, \quad (133)$$

then restrict the subsystem to $$\begin{pmatrix} e_1 \\ e_2 \end{pmatrix},$$

since this is a boundary control problem; i.e. $u_1$ and $u_2$ act only on the first and the last dynamical equations. Next, define a Lyapunov function such as:

$$\begin{cases} V: \mathbb{R}^n \to \mathbb{R}, \\ V = \frac{1}{2}e_2^2 + \frac{1}{2}e_n^2, \end{cases} \quad (134)$$

for which the derivative can be expressed as:

$$\dot{V} = e_1\dot{e}_1 + e_n\dot{e}_n,$$

$$\dot{V} = e_1(\dot{\tilde{T}}_1 - \dot{y}_r) + e_n(\dot{\tilde{T}}_n - \dot{y}_r),$$

$$\dot{V} = e_1(\mathcal{A}_1\tilde{T}_1 + b_1u_1 + \mathcal{F}_1(T)) + e_n(\mathcal{A}_n\tilde{T}_n + b_2u_2 + \mathcal{F}_n(T)). \quad (135)$$

To ensure that the derivative of the Lyapunov function in Eq. (135) is negative definite, we propose the control law in Eq. (132) which guarantees that:

$$\dot{V}(t) = -K_1e_1^2 - K_2e_n^2, \quad (136)$$

where $K_1$ and $K_2$ are positive constants. Hence, the control law will be defined as in Eq. (132).

The second part of the proof shows the stability and convergence of the whole system using the control law defined in Eq. (132). It starts by substituting $u_1$ and $u_2$ into the dynamics of the error equation in Eq. (133), such as in the following form:

$$\dot{e} = \bar{\mathcal{A}}e + \bar{\mathcal{F}}(T) + \mathcal{D}y_r, \quad (137)$$

where $\bar{\mathcal{F}}(T)$ has a structure in the form of:

$$\bar{\mathcal{F}}(T) = [0 \, \bar{\mathcal{F}}(T) \ldots \bar{\mathcal{F}}_{n-1}(T) \, 0]^{tr}, \quad (138)$$

and $\mathcal{D}$ and $\bar{\mathcal{A}}$ are such that:

$$\mathcal{D} = \begin{bmatrix} 0 \\ \mathcal{A}_2 \\ \vdots \\ \mathcal{A}_{n-1} \\ 0 \end{bmatrix}, \bar{\mathcal{A}} = \begin{bmatrix} -\bar{K}_1 \\ \mathcal{A}_2 \\ \vdots \\ \mathcal{A}_{n-1} \\ -\bar{K}_2 \end{bmatrix}, \quad (139)$$

where $\bar{K}_1 = [K_1 \, 0 \ldots 0] \in \mathbb{R}^{1 \times n}$, and $\bar{K}_2 = [0 \ldots 0 \, K_2] \in \mathbb{R}^{1 \times n}$. The system can then be rewritten to be in the following form:

$$\dot{e} = \bar{\mathcal{A}}e + \bar{\mathcal{F}}(T) + \mathcal{D}y_r, \quad (140)$$

Due to the structure of $\bar{\mathcal{A}}$, which is derived from a finite difference scheme, and knowing that $\bar{\mathcal{A}}$ is Hurwitz, there exist M>0 and ω>0 such that:

$$\|\exp(\bar{A}t)\| \leq M \exp(-\omega t). \tag{141}$$

Solving Eq. (139) yields the following:

$$e(t) = \exp(\bar{A}t)e(0) + \int_0^t \exp(\bar{A}(t-\tau))((\tilde{\mathcal{F}}(T) + \mathcal{D}y_r)d\tau, \tag{142}$$

By taking the $L_2$-norm for the left and right sides of Eq. (142), the following can be determined:

$$\|e(t)\| \leq \|\exp(\bar{A}t)e(0)\| + \int_0^t \|\exp(\bar{A}(t-\tau))(\tilde{\mathcal{F}}(T) + \mathcal{D}y_r)\|d\tau. \tag{143}$$

Letting $0 \leq \|e_0\| \leq \epsilon_0$, then:

$$\|e(t)\| \leq M \exp(-\omega t)\epsilon_0 + M\int_0^t \exp((\tau-t)\omega)\|(\tilde{\mathcal{F}}(T) + \mathcal{D}y_r)\|d\tau. \tag{144}$$

With the boundness property of $\tilde{\mathcal{F}}(T)$, it can be written:

$$\|e(t)\| \leq C_1 \exp(-\omega t) + C_2. \tag{145}$$

where $C_1$ and $C_2$ depend on M, ω, $\epsilon_0$ and the bound on $\tilde{\mathcal{F}}(T)$, the convergence of the error to a small region, which can be made as small as possible by appropriate choice of the gains, is ensured.

Nonlinear Observer.

The nonlinear Lyapunov controller in Eq. (132) needs the availability of the temperature distribution along the membrane boundaries, which is not viable in practice. Nevertheless, the process model is observable and the present nonlinearity is continuous and Lipschitz continuous, therefore, designing an observer will help to estimate the necessary temperature states and feed them back to the controller.

Nonlinear Lyapunov-Based Observer Design.

A nonlinear observer that takes advantage of the well-modeled nonlinearity structure in the process can be used. It can be extended to include an online constructive algorithm for finding an adequate observer gain. In this context, consider the nonlinear Lyapunov-based observer in the following form:

$$\dot{\hat{T}} = \mathcal{A}\hat{T} + \mathcal{B}u + \mathcal{F}(\hat{T}) + L(y - \mathcal{C}\hat{T}), \tag{146}$$

where $\hat{T}$ and $\hat{T}$ are the estimates of $\tilde{T}$ and T, and L is the observer gain matrix. Following this, the observer error dynamic equation can be formulated as:

$$\dot{\tilde{T}}(\mathcal{A} - L\mathcal{C})\tilde{T} + \mathcal{F}(T) - \mathcal{F}(\hat{T}), \tag{147}$$

where $\tilde{T} = \hat{T} - \hat{T}$ is the state estimation error. Proposition 2 gives sufficient conditions for exponential stability of the state observer error of Eq. (147).

Proposition 2. There exists an exponential stable observer of the form of Eq. (146), if there exists a symmetric positive definite matrix, P, such that he following standard algebraic Ricatti equation is satisfied:

$$\mathcal{A}P + P\mathcal{A}^T + PR_1P + Q_1 = 0, \tag{148}$$

$$\text{where } R_1 = \left(\lambda^2 I - \frac{C^T C}{\epsilon}\right), Q_1 = I(\epsilon + 1), \epsilon > 0, \epsilon \in \mathbb{R}^+. \tag{149}$$

and the observer gain matrix is $$L = \frac{PC^T}{2\epsilon}.$$

Figure 31A:
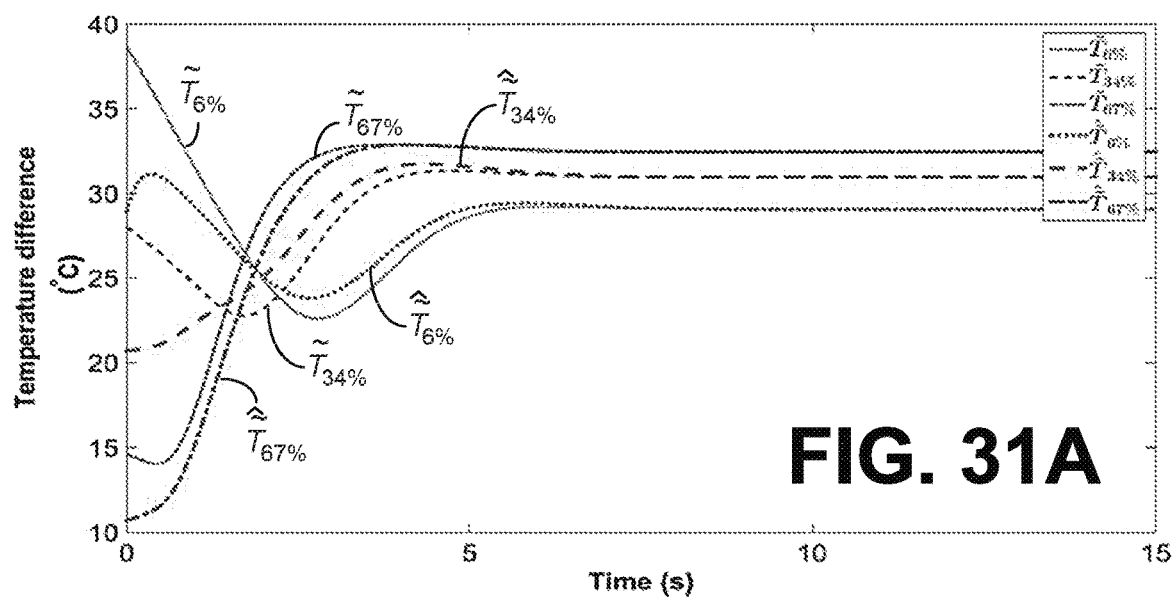
FIGS. 31A and 31B illustrates examples of convergence of the estimated states and error using the nonlinear Lyapunov-based observer in accordance with various embodiments of the present disclosure.
Figure 31B:
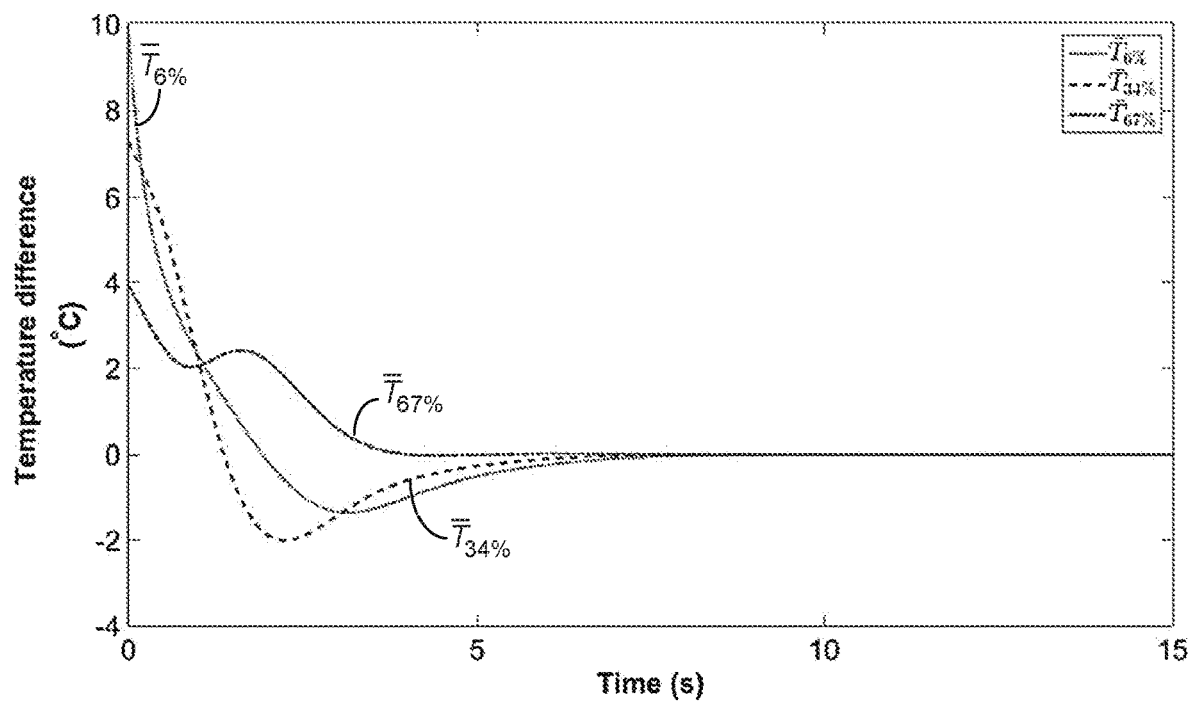

The performance of the nonlinear observer was tested with the convergence time and error. FIG. 31A shows the fast convergence of the estimated states using the nonlinear Lyapunov-based observer for different locations along the membrane length. Each curve represents the location on the membrane module. These locations are marked as a percentage of the total length of the membrane, starting from the top of the membrane to its bottom, therefore the curves in FIG. 31A illustrates the observer convergence on the top, the middle and the bottom of the whole membrane length. The fast convergence of the observer is guaranteed by using a smaller sampling time. In the same context, the error analysis shows the exponential convergence of the error to zero as depicted in FIG. 31B. Each curve represents the location on the membrane module, which is a percentage from the membrane total length.

Nonlinear Observer-Based Lyapunov Controller.

Following the design of the nonlinear Lyapunov-based observer, the temperature difference along the membrane boundaries is available at each instant of time. Proceeding further, the estimated states back can be fed to the nonlinear Lyapunov controller to operate, which is valid because the observer convergence is fast. The control law in Eq. (132) with the estimated temperature difference along the membrane boundaries in Eq. (146). The new control law will be:

$$\begin{cases} u_1 = \frac{1}{b_1}\left[-K_1(\hat{T}_1 - y_r) - \mathcal{A}_1\hat{T} - \mathcal{F}_1(\hat{T})\right], \\ u_2 = \frac{1}{b_2}\left[-K_2(\hat{T}_n - y_r) - \mathcal{A}_n\hat{T} - \mathcal{F}_n(\hat{T})\right]. \end{cases} \tag{150}$$

Figure 32:
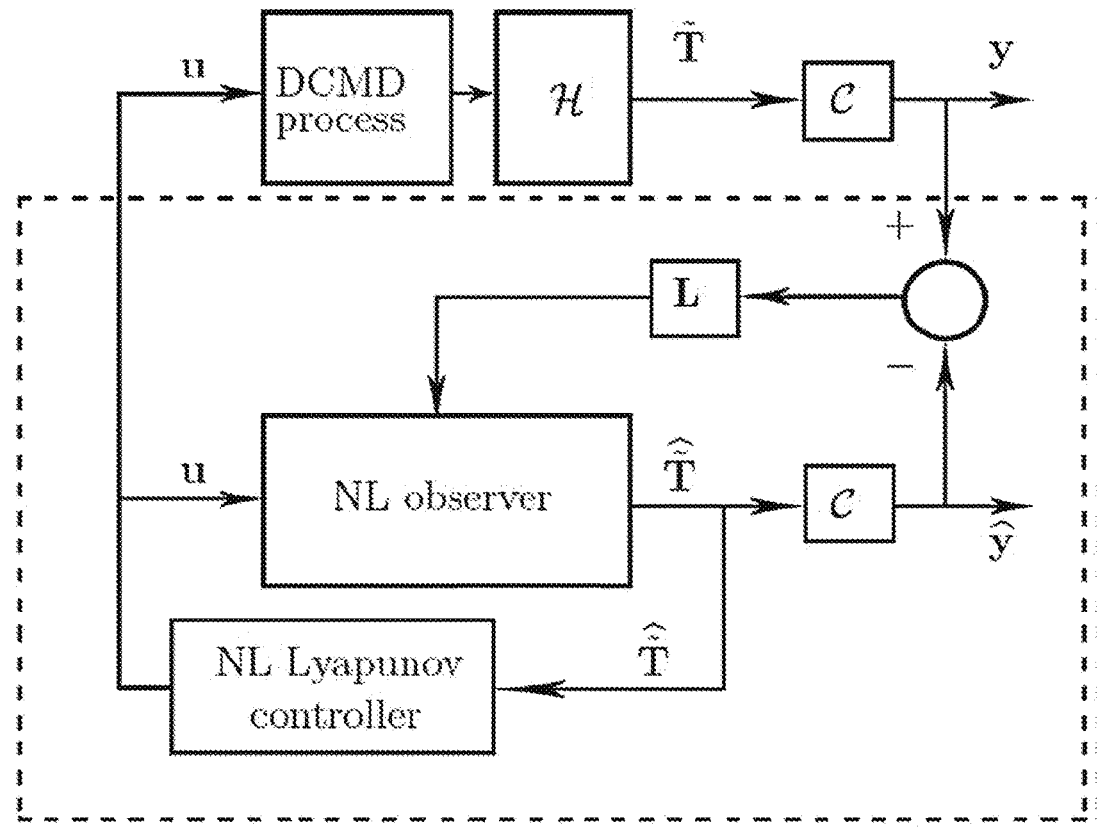
FIG. 32 is a schematic diagram illustrating an example of a nonlinear observer-based Lyapunov controller in accordance with various embodiments of the present disclosure.

FIG. 32 is a schematic diagram illustrating an example of the structure of the nonlinear observer-based Lyapunov controller.

The convergence of the combined system can be examined by studying the stability of the augmented system of the dynamics of the tracking reference error e, and the observer error T. The augmented error system is shown in:

$$\begin{pmatrix} \dot{\tilde{T}} \\ \dot{e} \end{pmatrix} = \begin{pmatrix} \mathcal{A} - L\mathcal{C} & 0 \\ \underline{\mathcal{A}} + K & \bar{\mathcal{A}} \end{pmatrix} \begin{pmatrix} \tilde{T} \\ e \end{pmatrix} + \begin{pmatrix} \mathcal{F}(T) - \mathcal{F}(\hat{T}) \\ \Delta\tilde{\mathcal{F}}(T) + \tilde{\mathcal{F}}(\hat{T}) \end{pmatrix} + \begin{pmatrix} 0 \\ \mathcal{D}y_r \end{pmatrix}, \tag{151}$$

and can be further simplified to be:

$$\dot{\vartheta} = \mathbb{A}\vartheta + \Phi(\tilde{T},\hat{T}) + \varsigma, \tag{152}$$

where $$\vartheta = \begin{pmatrix} \tilde{T} \\ e \end{pmatrix} \in \mathbb{R}^{n \times 1}$$

represents the error state vector. The dynamics of the error are represented in $$\mathbb{A} = \begin{pmatrix} \mathcal{A} - LC & 0 \\ \underline{\mathcal{A}} + K & \bar{\mathcal{A}} \end{pmatrix} \in \mathbb{R}^{n \times n},$$

where $\underline{\mathcal{A}}$ has a structure as follows:

$$\underline{\mathcal{A}} = \begin{bmatrix} \mathcal{A}_1 \\ 0 \\ \vdots \\ 0 \\ \mathcal{A}_n \end{bmatrix}. \tag{153}$$

The nonlinear terms are in:

$$\Phi(\tilde{T},\hat{\tilde{T}}) = \begin{pmatrix} \mathcal{F}(T) - \mathcal{F}(\hat{T}) \\ \Delta\mathcal{F}_1(T) + \mathcal{F}_1(\hat{T}) \end{pmatrix} \in \mathbb{R}^{n\times 1},$$

where $\Delta\tilde{\mathcal{F}}(T) \in \mathbb{R}^{n\times 1}$ has a structure such as:

$\Delta\tilde{\mathcal{F}}(T) = [(\mathcal{F}_1(\hat{T}) - \mathcal{F}_1(T))0 \ldots 0(\mathcal{F}_n(\hat{T}) - \mathcal{F}_n(T))]^T$.

In addition, $$\varsigma = \begin{pmatrix} 0 \\ \mathcal{D}y_r \end{pmatrix} \in \mathcal{F}^{n\times 1},$$

and matrix $$K = \begin{bmatrix} \tilde{K}_1 \\ 0 \\ \vdots \\ 0 \\ \tilde{K}_2 \end{bmatrix} \in \mathbb{R}^{n\times n}.$$

Proposition 3 gives sufficient condition for stability of the augmented error matrix.

Proposition 3. The augmented error system in Eq. (152) is stable, if there exists two reals, $M_1 > 0$ and $\omega_1 > 0$, such that:

$$\|\exp(\mathbb{A}t)\| \leq M_1 \exp(-\omega_1 t), \quad (154)$$

and if $$0 < \|\vartheta(0)\| \leq \vartheta_0, \quad (155)$$

where $\vartheta > 0$ is a smaller scalar.

Proof.

Similar to the proof of Proposition 1, the stability of system in Eq. (152) is guaranteed if the matrix $\mathbb{A}$ is Hurwitz. Solving Eq. (152) yields the following:

$$\vartheta(t) = \exp(\mathbb{A}t)\vartheta(0) + \int_0^t \exp(\mathbb{A}(t-\tau))\Phi(\tilde{T},\hat{\tilde{T}}) + \varsigma d\tau. \quad (156)$$

then the following can be determined taking the $L_2$-norm for the left and right sides:

$$\|\vartheta(t)\| \leq \|\exp(\mathbb{A}t)\vartheta(0)\| + \int_0^t \|\exp(\mathbb{A}(t-\tau))\Phi(\tilde{T}-\hat{\tilde{T}}) + \varsigma\| d\tau. \quad (157)$$

If there exist $M_1 > 0$ and $\omega_1 > 0$, then:

$$\|\vartheta(t)\| \leq M_1 \exp(-\omega_1 t)\vartheta_0 + M_1 \int_0^t \exp((\tau-t)\omega_1)\|\Phi(\tilde{T},\hat{\tilde{T}}) + \varsigma\| d\tau. \quad (158)$$

With the boundness and the Lipschitz continuity of the nonlinearity, there exist constants such that:

$$\|\vartheta(t)\| \leq C_3 \exp(-\omega_1 t) + C_4, \quad (159)$$

where $C_1$ and $C_2$ depend on $M_1$, $\omega_1$, $\vartheta_0$ and the bound on the nonlinearity, which ensure the convergence to a small region, that can be made as small as possible by appropriate choice of the gains.

Simulation and Results.

Extensive numerical simulations have been carried out on the dynamic model of the DCMD process. The simulations illustrated the behavior of the process, especially along the membrane boundaries to highlight the effect of the controller. All simulations were performed with real membrane parameter values, which are provided by the Water Desalination and Reuse Center (WDRC) at King Abdullah University of Science and Technology (KAUST). These values are listed in the table of FIG. 33A.

Model Simulation.

The production of the DCMD process with no imposed control is fluctuating, and therefore, the temperature difference along the membrane boundaries is not constant, and does not fall within practical values to provide fixed rate of permeate flux. The induced fluctuations in the temperature difference along the membrane boundaries lead to more energy consumption, and as a natural result, fluctuations in the water production rate.

Observer-Based Lyapunov Controller Simulations.

Figures 33A, 33B:
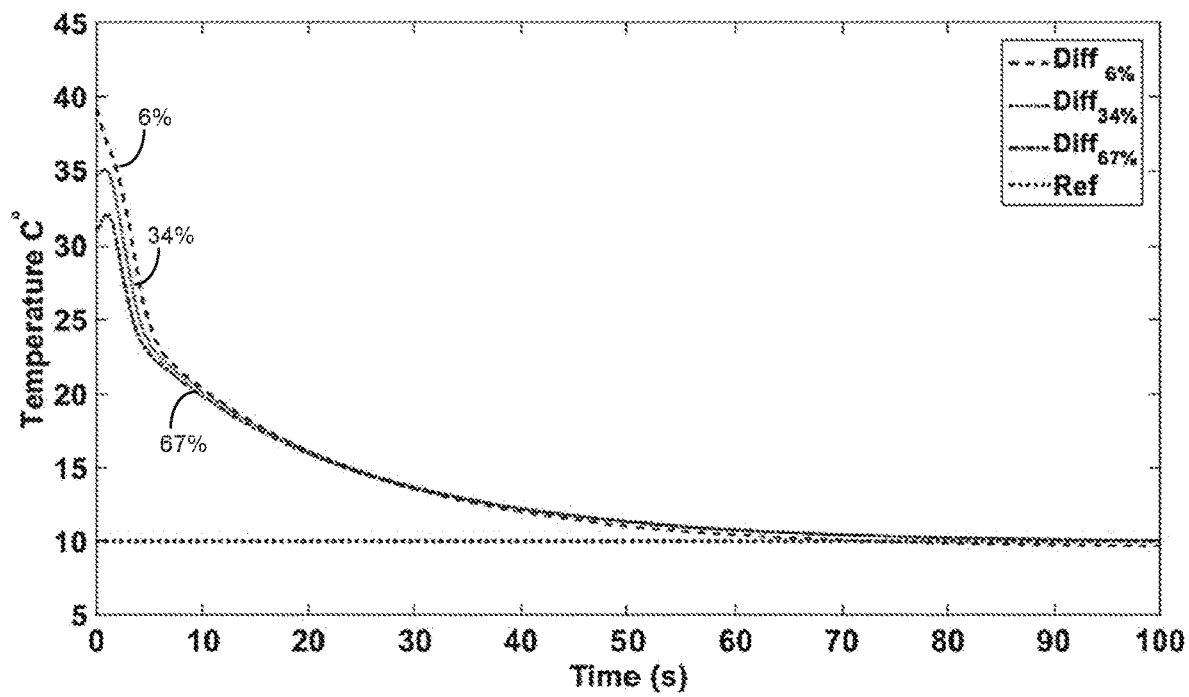
FIG. 33A is a table of membrane parameters used in the controller analysis in accordance with various embodiments of the present disclosure.
FIGS. 33B-33F illustrate simulation results of the controller in accordance with various embodiments of the present disclosure.

The overall structure of the whole DCMD process was simulated. The structure included the nonlinear observer-based controller, as well as the DCMD dynamic model. The role of the nonlinear controller was maintaining the difference temperature along the membrane boundaries to be almost fixed around a desired reference such as about 10° C. This difference was recommended from experimental perspective for high permeate flux production. The value of this reference was chosen to be within a range of 5° C. to 15° C., following practical advice for sufficient water production. Additionally, the controller gains $K_1$ and $K_2$ were set to be equal $K_1=K_2=K$. FIG. 33B shows the convergence of the temperature difference for different locations on the membrane boundaries to the desired reference. Each curve represents the location on the membrane module, which is a percentage of the membrane total length.

Figure 33C:
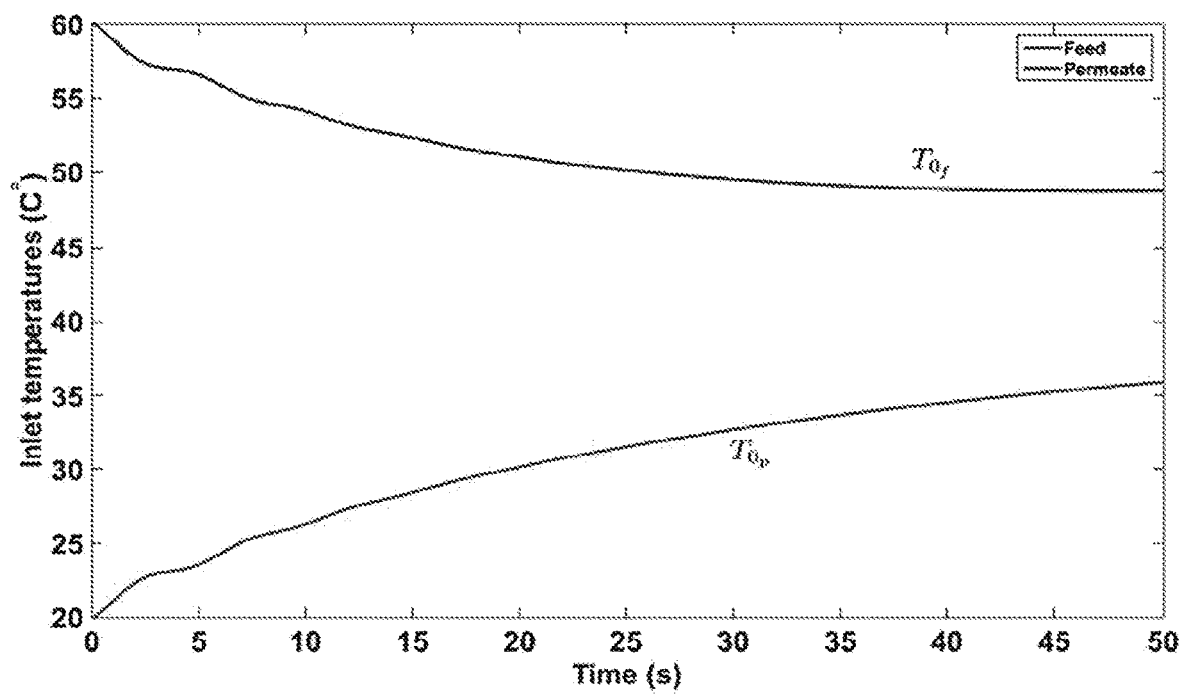
Figure 33D:
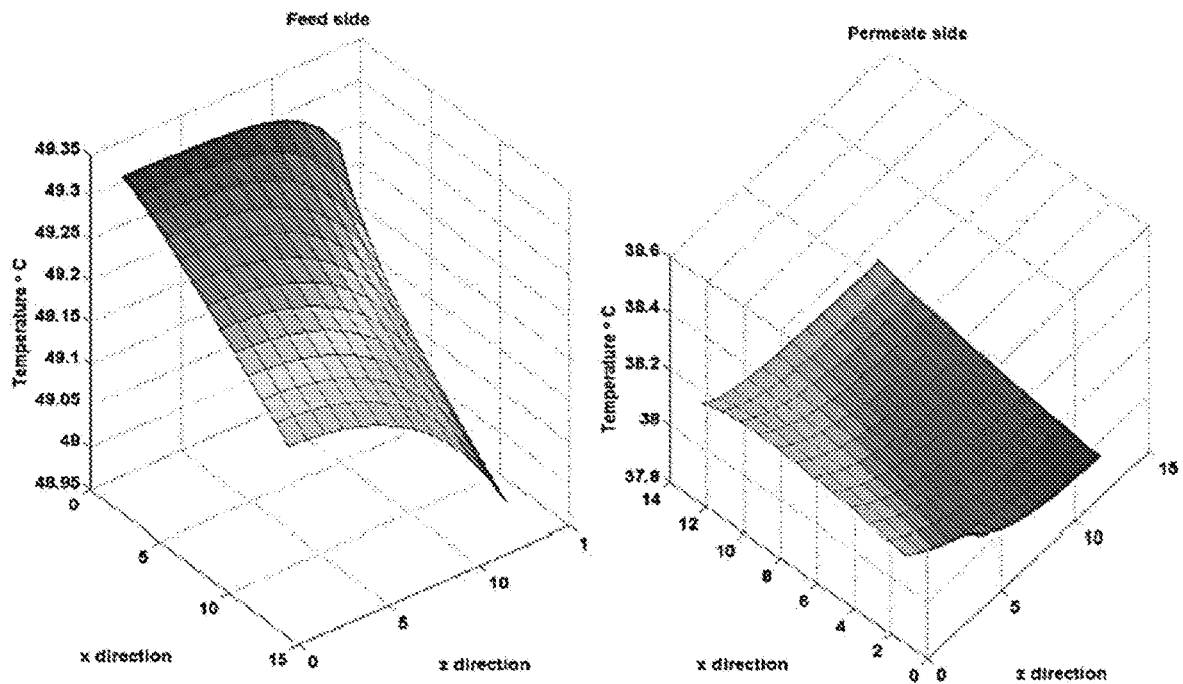
Figure 33E:
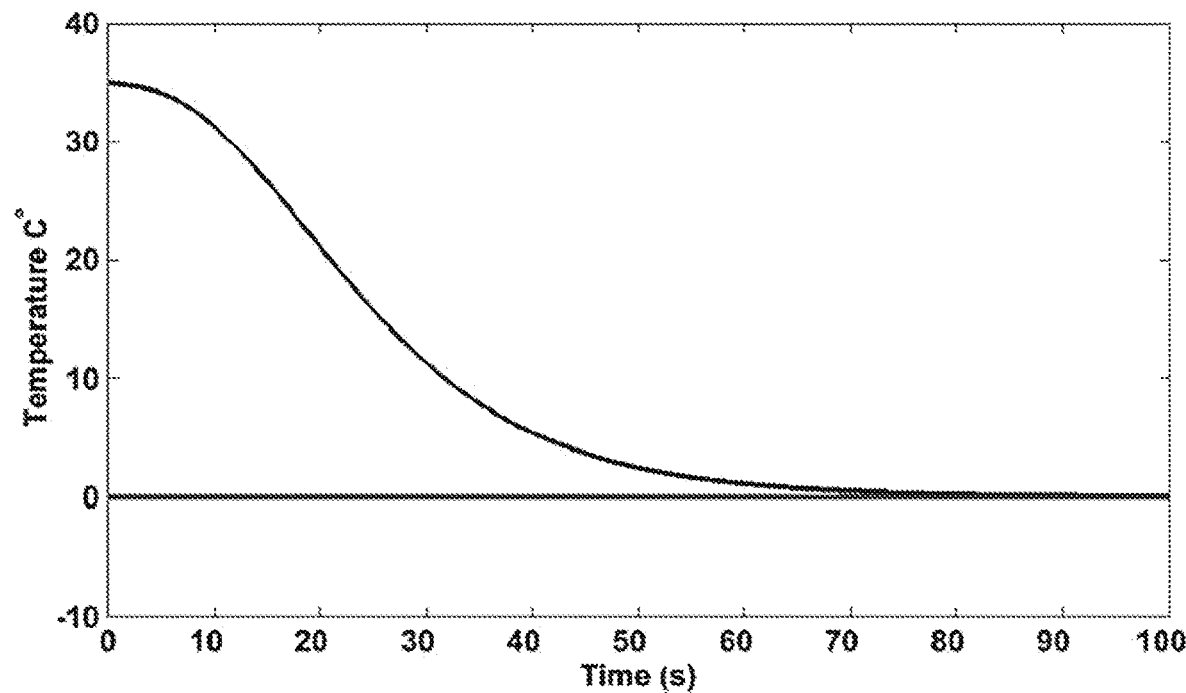

The convergence of the temperature difference was accomplished with an acceptable evolution of the control inputs within the predefined range. FIG. 33C depicts that time evolution of the control inputs. Reaching steady state phase, with no disturbance, the DCMD process experiences a stable behavior among all its designated domain. FIG. 33D illustrates that effect of the observer-based Lyapunov_controller on the process during the steady state phase. The time evolution of the error between the desired reference and the actual temperature difference along the membrane boundaries is shown in FIG. 33E. The results show the asymptotic stability of the error, which was achieved using the observer-based Lyapunov_controller.

Controller Gain Simulations.

Figure 33F:
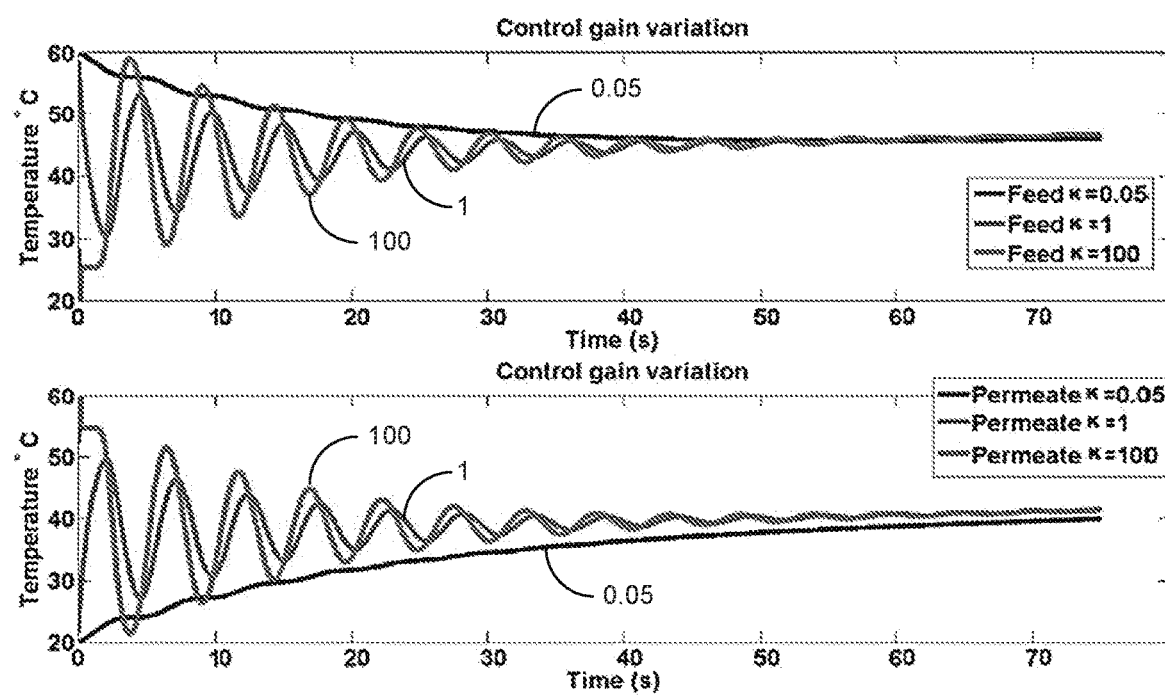

The controller gains $K_1$ and $K_2$ have a significant role in smoothing out the performance of the DCMD process, where it reduces the potential oscillations during the transient phase. Therefore, the selection process of this constant is important, and needs a balance between the convergence time and the process behavior. The impact of the controller gain is shown in FIG. 33F, where it shows the effect on the control inputs time evolution. Consequently, low controller gain gives low oscillations in the control inputs transient phase, unlike high gain values, and reduces spikes that may appear in the response.

An observer-based Lyapunov control design was presented to manage the production of a DCMD process. The DCMD process was modeled with Advection Diffusion Equation model in two dimensions, where the model experienced a nonlinear behavior that originated from the associated boundary conditions. Due to the significance of the temperature difference along the membrane boundaries in driving the DCMD process, the dynamic model was reduced to include only the temperature distribution along the membrane boundaries. Afterwards, a nonlinear Lyaponuv control design was adopted to maintain the temperature difference around a sufficient desired reference. This allows the process be able to provide satisfying water production levels.

Following the needs of the controller, a nonlinear observer was designed to provide the nonlinear controller with the temperature distribution along the membrane surfaces at each time instance. The controller combined with the observer guarantees the convergence to the desired reference. Control inputs were constrained with maximum and minimum values to follow critical physical limitations as well as process requirements. Simulations were performed with real membrane parameter values.

Figure 34:
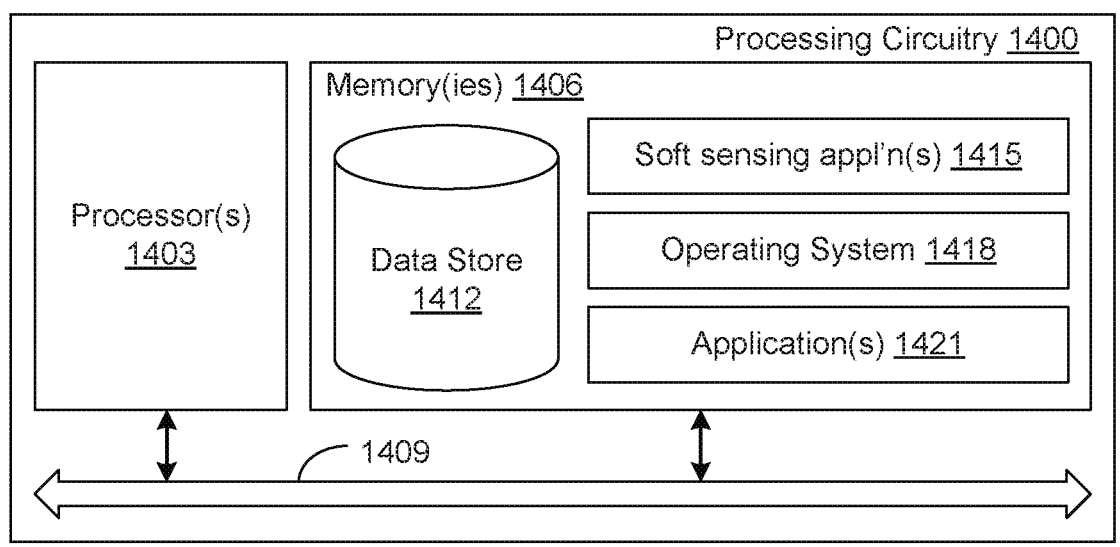
FIG. 34 is a schematic block diagram that illustrates an example of processing circuitry employed by the DCMD module of FIGS. 1 and 14 in accordance with various embodiments of the present disclosure.

With reference now to FIG. 34, shown is a schematic block diagram of an example of processing circuitry 1400 that may be used to implement various portions of the control of the membrane distillation (MD) process 100 of FIGS. 1 and 14 in accordance with various embodiments of the present disclosure. The processing circuitry 1400 includes at least one processor circuit, for example, having a processor 1403 and a memory 1406, both of which are coupled to a local interface 1409. To this end, the processing circuitry 1400 may be implemented using one or more circuits, one or more microprocessors, microcontrollers, application specific integrated circuits, dedicated hardware, digital signal processors, microcomputers, central processing units, field programmable gate arrays, programmable logic devices, state machines, or any combination thereof. The local interface 1409 may comprise, for example, a data bus with an accompanying address/control bus or other bus structure as can be appreciated. The processing circuitry 1400 can include a display for rendering of generated graphics such as, e.g., a user interface and an input interface such, e.g., a keypad or touch screen to allow for user input. In addition, the processing circuitry 1400 can include communication interfaces (not shown) that allow the processing circuitry 1400 to communicatively couple with other communication devices. The communication interfaces may include one or more wireless connection(s) such as, e.g., Bluetooth or other radio frequency (RF) connection and/or one or more wired connection(s).

Stored in the memory 1406 are both data and several components that are executable by the processor 1403. In particular, stored in the memory 1406 and executable by the processor 1403 are soft sensing application(s) 1415, an operating system 1418, and/or other applications 1421. Soft sensing applications 1415 can include applications that support, e.g., controllers for control of the operation of the MD process 100 and/or observers for estimation of states and/or characteristics of the MD process 100. It is understood that there may be other applications that are stored in the memory 1406 and are executable by the processor 1403 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, LabVIEW® or other programming languages.

A number of software components are stored in the memory 1406 and are executable by the processor 1403. In this respect, the term "executable" means a program file that is in a form that can ultimately be run by the processor 1403. Examples of executable programs may be, for example, a compiled program that can be translated into machine code in a format that can be loaded into a random access portion of the memory 1406 and run by the processor 1403, source code that may be expressed in proper format such as object code that is capable of being loaded into a random access portion of the memory 1406 and executed by the processor 1403, or source code that may be interpreted by another executable program to generate instructions in a random access portion of the memory 1406 to be executed by the processor 1403, etc. An executable program may be stored in any portion or component of the memory 1406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1406 is defined herein as including both volatile and nonvolatile memory and data storage components. Volatile components are those that do not retain data values upon loss of power. Nonvolatile components are those that retain data upon a loss of power. Thus, the memory 1406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1403 may represent multiple processors 1403 and the memory 1406 may represent multiple memories 1406 that operate in parallel processing circuits, respectively. In such a case, the local interface 1409 may be an appropriate network that facilitates communication between any two of the multiple processors 1403, between any processor 1403 and any of the memories 1406, or between any two of the memories 1406, etc. The local interface 1409 may comprise additional systems designed to coordinate this communication, including, for example, performing load balancing. The processor 1403 may be of electrical or of some other available construction.

Although the soft sensing application(s) 1415, the operating system 1418, application(s) 1421, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the soft sensing application(s) 1415 and/or application(s) 1421, that comprises software or code can be embodied in any non-transitory computer-readable medium for use by or in connection with an instruction execution system such as, for example, a processor 1403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about to about 'y'".

The invention claimed is:

1. A system for water desalination, comprising:
    a membrane distillation (MD) module including a feed side and a permeate side separated by a membrane having a membrane boundary layer, wherein the feed side further comprises a feed inlet and feed outlet and wherein the permeate side further comprises a permeate inlet and permeate outlet:
    temperature sensors configured to monitor feed solution temperatures at the feed outlet and permeate solution temperatures at the permeate outlet; and
    processing circuitry configured to estimate, during steady- and unsteady-state operation, feed solution temperatures along the membrane boundary layer, on the feed side, and permeate solution temperatures along the membrane boundary layer, on the permeate side of the MD module using an Advection-Diffusion Equation (ADE), wherein the processing circuitry utilizes, as inputs, the monitored feed solution and permeate solution temperatures at the feed outlet and permeate outlet, respectively,
    wherein the ADE includes a first part that describes the unsteady-state operation, a second part that describes a heat convection transfer between the feed side and the permeate side, and a third part that describes a heat conduction transfer between the feed side and the permeate side, and
    wherein the processing circuitry is further configured to control operation of the MD module comprising maintaining, at a desired reference value, a difference between the feed solution temperatures along the membrane boundary layer, on the feed side, and the permeate solution temperatures along the membrane boundary layer, on the permeate side, based on the estimation.

2. The system of claim 1, wherein the processing circuitry is further configured to estimate a membrane mass transfer coefficient of the MD module.

3. The system of claim 1, wherein the feed solution temperatures and permeate solution temperatures include boundary temperatures along the membrane boundary layer.

4. The system of claim 1, wherein the Advection-Diffusion Equation (ADE) is a two-dimensional ADE model including dimensions of the membrane.

5. The system of claim 4, wherein the ADE model includes a plurality of grid points extending across the feed side and the permeate side of the MD module.

6. The system of claim 5, wherein the feed solution temperatures and permeate solution temperatures include temperatures corresponding to at least a portion of the plurality of grid points.

7. The system of claim 1, wherein the MD module is a counter current direct-contact MD module.

8. A method for water desalination, the method comprising:
    monitoring feed solution temperatures at a feed outlet and permeate solution temperatures at a permeate outlet of a membrane distillation (MD) module;
    determining, during steady- and unsteady-state operation, a plurality of estimated temperature states along a membrane having a membrane boundary layer separating the feed side and the permeate side of the MD module using an Advection-Diffusion Equation (ADE), wherein the ADE utilizes, as inputs, the feed solution temperature monitored at the feed outlet and the permeate solution temperature monitored at the permeate outlet, wherein the ADE includes a first part that describes the unsteady-state, a second part that describes a heat convection transfer between the feed side and the permeate side, and a third part that describes a heat conduction transfer between the feed side and the permeate side; and
    controlling operation of the MD module comprising maintaining at a desired reference value, a difference between the feed solution temperatures along the membrane boundary layer, on the feed side, and the permeate solution temperatures along the membrane boundary layer, on the permeate side, based on the determining.

9. The method of claim 8, further comprising estimating a membrane mass transfer coefficient of the MD module.

10. The method of claim 8, further comprising adjusting characteristics of the feed solution or permeate solution based at least in part upon the feed solution temperature monitored at the feed outlet and the permeate solution temperature monitored at the permeate outlet.

11. The method of claim 8, wherein the estimated temperature states include temperatures corresponding to grid points extending across the feed side and the permeate side of the MD module.

12. The method of claim 8, wherein the ADE model is a two-dimensional ADE model including dimensions of the membrane.

13. A system for water desalination, comprising:
a membrane distillation (MD) module including a feed side and a permeate side separated by a membrane having a membrane boundary layer;
temperature sensors configured to monitor feed solution temperatures at a feed outlet and permeate solution temperatures at a permeate outlet; and
processing circuitry configured to (1) apply an Advection-Diffusion Equation (ADE) model to estimate, during steady- and unsteady-state operation, feed solution temperatures and permeate solution temperatures along the membrane boundary layer, within the feed side and the permeate side, respectively, of the MD module using an Advection-Diffusion equation (ADE), wherein the feed solution temperatures monitored at the feed outlet and the permeate solution temperatures monitored at the permeate outlet are used as inputs to the ADE model, and (2) control operation of the MD module based at least in part upon the feed solution temperatures estimated within the feed side and permeate solution temperatures estimated within the permeate side,
wherein the ADE model includes a first part that describes the unsteady-state, a second part that describes a heat convection transfer between the feed side and the permeate side, and a third part that describes a heat conduction transfer between the feed side and the permeate side, and
wherein the processing circuitry is further configured to control operation of the MD module comprising maintaining, at a desired reference value, a difference between the feed solution temperatures along the membrane boundary layer, on the feed side, and the permeate solution temperatures along the membrane boundary layer, on the permeate side, based on the estimation.

14. The system of claim 13, wherein the processing circuitry is further configured to estimate a membrane mass transfer coefficient of the MD module.

15. The system of claim 13, wherein the feed solution temperatures and permeate solution temperatures include boundary temperatures along the membrane boundary layer.

16. The system of claim 13, wherein the estimated temperatures include temperatures corresponding to grid points extending across the feed side and the permeate side of the MD module.

* * * * *